(12) United States Patent
Smullen et al.

(10) Patent No.: US 8,850,328 B2
(45) Date of Patent: Sep. 30, 2014

(54) NETWORKED PROFILING AND MULTIMEDIA CONTENT TARGETING SYSTEM

(75) Inventors: Richard Adam Smullen, New York, NY (US); Laurent Daniel Alhadeff, Johannesburg (ZA); Jeremy Abraham Sterns, New York, NY (US)

(73) Assignee: Genesismedia LLC, New York, NY (US)

( * ) Notice: Subject to any disclaimer, the term of this patent is extended or adjusted under 35 U.S.C. 154(b) by 204 days.

(21) Appl. No.: 13/425,982

(22) Filed: Mar. 21, 2012

(65) Prior Publication Data

US 2013/0080242 A1  Mar. 28, 2013

Related U.S. Application Data

(63) Continuation-in-part of application No. 12/822,526, filed on Jun. 24, 2010, now Pat. No. 8,484,563, which is a continuation-in-part of application No. 12/544,233, filed on Aug. 20, 2009, now Pat. No. 8,607,143.

(60) Provisional application No. 61/454,587, filed on Mar. 21, 2011.

(51) Int. Cl.
*G06F 3/00* (2006.01)
*G06F 3/01* (2006.01)

(52) U.S. Cl.
USPC ........ 715/745; 715/202; 715/760; 705/14.66; 705/14.49; 705/14.73; 705/14.4

(58) Field of Classification Search
USPC ............. 715/202, 745, 760; 705/14.4, 14.49, 705/14.66, 14.73
See application file for complete search history.

(56) References Cited

U.S. PATENT DOCUMENTS

| | | | |
|---|---|---|---|
| 6,954,728 B1 | 10/2005 | Kusumoto et al. | |
| 7,062,510 B1 | 6/2006 | Eldering | |
| 7,158,943 B2 | 1/2007 | van der Riet | |
| 2002/0112035 A1 | 8/2002 | Carey et al. | |
| 2003/0023489 A1* | 1/2003 | McGuire et al. ................ 705/14 |
| 2003/0154126 A1* | 8/2003 | Gehlot et al. ................... 705/14 |
| 2003/0233278 A1* | 12/2003 | Marshall ........................ 705/14 |
| 2006/0015404 A1 | 1/2006 | Tran | |
| 2006/0247972 A1 | 11/2006 | Baron et al. | |

* cited by examiner

*Primary Examiner* — Nicholas Augustine
(74) *Attorney, Agent, or Firm* — Ash Tankha; Lipton, Weinberger & Husick

(57) ABSTRACT

A computer implemented method and system for dynamically profiling users for incentivized targeting of multimedia content to the users in a networked environment is provided. A server creates an advertiser network comprising advertisers and member websites, and creates a user network of users. The advertisers submit the multimedia content, advertising information, and targeting criteria to the server. The server and one or more publisher websites acquire marketing data from the users for creating dynamic user profiles for the users. The server and/or the publisher websites target the multimedia content to the users based on the created dynamic user profiles. The server and/or a client device of each of the users confirm viewing of the multimedia content using a challenge, random in content. The server and/or the publisher websites compensate the users by crediting the users with items of value based on confirmation of the viewing of the multimedia content.

41 Claims, 52 Drawing Sheets

BEEZAG. WATCH. REWARD. SOCIALIZE.                                    WELCOME BACK, SCOTT
                                                                          LOG OUT ›

| MY BEEZAG | REDEEM REWARDS PROFILE › REDEMPTION OPTION › CONFIRM › FINISH |

SCOTT            PREVIOUS TOTAL = $5.00  →  REMAINING TOTAL = $0.00
HARROWER ›
EDIT PROFILE     PLEASE REVIEW THE INFORMATION BELOW. ONCE YOU CLICK "CONFIRM" YOU WILL NOT
CURRENT          BE ABLE TO EDIT THE INFO
POINTS 27
OFFER LOCKER     PROFILE INFORMATION                                      EDIT ›

2/8 EXPIRING     FULL NAME    : SCOTT HARROWER
     SOON        ADDRESS      : 115 29 ST., SUITE 800
VIDEOS                          NEW YORK, NY 10024
                 CELL PHONE   : 1.917.8335703
REDEEM REWARDS   PAYPAL EMAIL : NORMANHARROWER@YAHOO.COM

HOW TO GET POINTS    REDEMPTION OPTION                                    EDIT ›

INVITE A FRIEND      AMOUNT FROM BEEZAG ACCOUNT: $5.00

WHAT I'VE TOLD       YOU WOULD LIKE TO: GET PAID VIA PAYPAL
BEEZAG

HELP & FAQS
                     CANCEL ›                      EVERYTHING LOOKS GOOD    CONTINUE

FIG. 24D

```
#include <iostream>
#include "bzChallengeGenerator.h"

using namespace std;

int main(int argc, char* argv[])
{
        bzChallengeGenerator generator;
        generator.ContentType(bzChallengeGenerator::NUMBERS);  // use
        numbers
        generator.ContentDisplaySize(20); // number will be displayed in a 20x20
        pixel square generator.VideoDisplayHeight(240); // video frame height is 240 pixels
        generator.VideoDisplayWidth(320); // video frame width is 320 pixels
        generator.VideoDuration(30); // video playing time is 30 secs bzChallenge c;
        int begin;
        begin = 0;
        cout << "Let's see how many we can randomly generate in sequence" <<
        endl;
        do
        {
                c = generator.Generate(begin);
                cout << c << endl;
                begin = c.Offset() + c.Duration();
        }
        while (begin <= (int)(generator.VideoDuration() -
bzChallengeGenerator::s_contentDuration));
        cout << "Let's generate a challenge for each 10 sec segment" << endl;
        cout << generator.Generate(0, 10) << endl;
        cout << generator.Generate(10, 20) << endl;
        cout << generator.Generate(20, 30) << endl;
        cout << endl << "Press RETURN to continue...";
        char x;
        cin.get(&x, 1);
        return 0;
}
```

FIG. 27A

```
#include <time.h>
#include "bzChallengeGenerator.h"

const char* bzChallengeGenerator::s_content[] =
{
        "0123456789",
        "ABCDEFGHJKLMNPQRTUVWXYZ",  // letters resembling numbers
omitted: I O S
        "!@#$%^&*+-"
};
bzChallengeGenerator::bzChallengeGenerator(void)
{
        assert(s_contentDuration > 0);

m_contentType = NUMBERS;
        m_contentDisplaySize = 0;

m_videoDisplayWidth = 0;
        m_videoDisplayHeight = 0;
        m_videoDuration = 0;

// seed the rand() random number generator using the time
        time_t t;
        time(&t);
        srand((int)t);
}
bzChallengeGenerator::~bzChallengeGenerator(void)
{
}
```

FIG. 27B

```
bzChallenge bzChallengeGenerator::Generate(int begin, int end) const
{       begin = (begin < 0) ? 0 : begin;
        assert(begin <= (int)m_videoDuration);
        end = (end < 0) ? m_videoDuration : end;
        assert(end <= (int)m_videoDuration);
        int duration = end - begin;
        // validate parameters
        assert(duration >= s_contentDuration);
        assert(m_videoDisplayWidth >= m_contentDisplaySize);
        assert(m_videoDisplayHeight >= m_contentDisplaySize);
        bzChallenge c;
        int contentLen = strlen(s_content[m_contentType]);
        assert(contentLen > 0);
        // randomly select a character within the content type array
        c.m_content = s_content[m_contentType][RangedRand(0, contentLen - 1)];
        // randomly select an offset between begin and end, allowing time to display
the content
        c.m_offset = RangedRand(begin, end - s_contentDuration);
        // save the duration
        c.m_duration = s_contentDuration;
        // randomly select a horizontal position along the video width allowing space
to display the content
        c.m_xPosition = RangedRand(0, m_videoDisplayWidth -
m_contentDisplaySize);
        // randomly select a vertical position along the video width allowing space to
display the content
        c.m_yPosition = RangedRand(0, m_videoDisplayHeight -
m_contentDisplaySize);;
        return c;
}
int bzChallengeGenerator::RangedRand(int from, int to)
{
        return rand() % (to - from + 1) + from;
}
```

FIG. 27C

```
pragma once
#include <assert.h>
#include "bzChallenge.h"
class bzChallengeGenerator
{
public:
        bzChallengeGenerator(void);
        ~bzChallengeGenerator(void);

enum ContentTypeEnum // type of characters to display
        {
                NUMBERS = 0,
                LETTERS = 1,
                SYMBOLS = 2
        };
        // constant duration to display character during challenge (secs)
        static const unsigned int s_contentDuration = 3;

ContentTypeEnum ContentType() const { return m_contentType; }
        void ContentType(ContentTypeEnum c) { m_contentType = c; } unsigned int ContentDisplaySize() const { return m_contentDisplaySize; }
        void ContentDisplaySize(unsigned int n) { assert(n > 0);
m_contentDisplaySize = n; } unsigned int VideoDisplayWidth() const { return m_videoDisplayWidth; }
        void VideoDisplayWidth(unsigned int n) { assert(n > 0);
m_videoDisplayWidth = n; } unsigned int VideoDisplayHeight() const { return m_videoDisplayHeight; }
        void VideoDisplayHeight(unsigned int n) { assert(n > 0);
m_videoDisplayHeight = n; } unsigned int VideoDuration() const { return m_videoDuration; }
        void VideoDuration(unsigned int n) { assert(n > 0); m_videoDuration = n; }
        // this static method returns a random integer in the close interval [from, to]
        static int RangedRand(int from, int to);
```

FIG. 27D

```
        // this method generates a random challenge given the properties specified
        bzChallenge Generate(int begin = -1, int end = -1) const;
private:
        // content type arrays
        static const char* s_content[];

// type of content to select character from
        ContentTypeEnum m_contentType; // type of characters to display in video
as challenge
        // character display area to be overlaid on image; square in pixels
        unsigned int m_contentDisplaySize; // display area (square) within video
frame to display char, in pixels
        // width of video display area
        unsigned int m_videoDisplayWidth;
        // height of video display area
        unsigned int m_videoDisplayHeight;
        // video's playing time
        unsigned int m_videoDuration;
};
```

FIG. 27E

```
#include "bzChallenge.h"

using namespace std;

std::ostream& operator<<(std::ostream& os, const bzChallenge& c)
{
        os << "Display '" << c.Content() << "' at offset " << c.Offset() << " secs for " << c.Duration() << " secs ";
        os << "at location (" << c.XPosition() << ", " << c.YPosition() << ")";

return os;
} bzChallenge::bzChallenge(void)
{
        m_content = 0;
        m_contentDisplaySize = 0;
        m_offset = 0;
        m_duration = 0;
        m_xPosition = 0;
        m_yPosition = 0;
} bzChallenge::~bzChallenge(void)
{
}
```

FIG. 27F

```
pragma once include <iostream>
//
// This class represents the challenge result returned by the Challenge Generator
//
class bzChallenge
{
friend class bzChallengeGenerator; // only this class can poke values public:
        bzChallenge(void);
        ~bzChallenge(void);

char Content() const { return m_content; }
        unsigned int Offset() const { return m_offset; }
        unsigned int ContentDisplaySize() const { return m_contentDisplaySize;
}
        unsigned int Duration() const { return m_duration; }
        unsigned int XPosition() const { return m_xPosition; }
        unsigned int YPosition() const { return m_yPosition; } private:
        char m_content;   // content character to display
        unsigned int m_contentDisplaySize; // char display area in pixels
(square)
        unsigned int m_offset; // offset in secs into video when to display
        unsigned int m_duration;  // how long to display char
        unsigned int m_xPosition; // pixel position along width
        unsigned int m_yPosition; // pixel position along height
};

std::ostream& operator<<(std::ostream& os, const bzChallenge& c);
```

FIG. 27G

RUN #1

LET'S SEE HOW MANY WE CAN RANDOMLY GENERATE IN SEQUENCE
DISPLAY "3" AT OFFSET 19 SECS FOR 3 SECS AT LOCATION (233, 8)
DISPLAY "2" AT OFFSET 26 SECS FOR 3 SECS AT LOCATION (29, 134)
LET'S GENERATE A CHALLENGE FOR EACH 10 SEC SEGMENT
DISPLAY "7" AT OFFSET 0 SECS FOR 3 SECS AT LOCATION (89, 16)
DISPLAY "2" AT OFFSET 15 SECS FOR 3 SECS AT LOCATION (58, 171)
DISPLAY "9" AT OFFSET 26 SECS FOR 3 SECS AT LOCATION (151, 109)

RUN #2

LET'S SEE HOW MANY WE CAN RANDOMLY GENERATE IN SEQUENCE
DISPLAY "6" AT OFFSET 10 SECS FOR 3 SECS AT LOCATION (60, 90)
DISPLAY "5" AT OFFSET 21 SECS FOR 3 SECS AT LOCATION (108, 116)
DISPLAY "3" AT OFFSET 26 SECS FOR 3 SECS AT LOCATION (274, 215)
LET'S GENERATE A CHALLENGE FOR EACH 10 SEC SEGMENT
DISPLAY "5" AT OFFSET 6 SECS FOR 3 SECS AT LOCATION (36, 119)
DISPLAY "6" AT OFFSET 10 SECS FOR 3 SECS AT LOCATION (150, 220)
DISPLAY "1" AT OFFSET 20 SECS FOR 3 SECS AT LOCATION (11, 43)

FIG. 28

NETWORKED PROFILING AND MULTIMEDIA CONTENT TARGETING SYSTEM

CROSS REFERENCE TO RELATED APPLICATIONS

This application is a continuation-in-part application of patent application Ser. No. 12/822,526 titled "View Confirmation For On-demand Multimedia Content" filed on Jun. 24, 2010 in the United States Patent and Trademark Office now U.S. Pat. No. 8,484,563, which is a continuation-in-part application of the continuation-in-part application Ser. No. 12/544,233 titled "Multimedia Content Viewing Confirmation" filed on Aug. 20, 2009 in the United States Patent and Trademark Office now U.S. Pat. No. 8,607,143. This application also claims the benefit of provisional patent application No. 61/454,587 titled "Networked Profiling And Multimedia Content Targeting System", filed on Mar. 21, 2011 in the United States Patent and Trademark Office.

The specifications of the above referenced patent applications are incorporated herein by reference in their entirety.

BACKGROUND

The computer implemented method and system disclosed herein, in general, relates to a viewer response system. More particularly, the computer implemented method and system disclosed herein relates to dynamically profiling users, targeting multimedia content to client devices of the users, confirming that the entire multimedia content has been viewed by the users, and compensating the users for viewing the entire multimedia content.

Media service providers can reach users of their media services through a wide spectrum of technologies and devices such as general packet radio service (GPRS), 3G or other internet enabled cellular phones, computers with connection to the internet, televisions with digital set top boxes, etc. Using this outreach, media service providers earn revenue from product and service companies seeking to advertise their products and services through the media services. However, the efforts of the media service providers to advertise products and services may not achieve optimum results as the users may not view or may not be interested in viewing the multimedia content, for example, a video of the advertised products or services. This in turn reduces the outreach of companies seeking to advertise their products and services to potential customers through media services, and may lead to reduced revenue for both the companies that advertise their services through the media service providers, and for the media service providers. In addition, product and service companies cannot confirm whether the users viewed the advertisements, since the advertisements are delivered to remote devices. Current viewer measurement systems only provide passive viewer measurement based on whether the advertisement is played on the devices or not, but not based on whether the users have attentively viewed the advertisement.

Furthermore, traditional advertising platforms provide an advertiser controlled environment, where the media service providers control which advertisements are distributed to the users, at what time, and in what way. Although these advertisements reach out to a wide consumer base, the advertisements are typically irrelevant to the requirements of the user. These advertising platforms provide the user with little or no options to select the content of the advertisements. Moreover, there is no mechanism to confirm whether the user has viewed the advertisements. Traditional advertisements occur in passive form in which user interaction with the advertisements is absent. Hence, the user may choose to ignore the advertisements or not pay attention to the advertisements. Furthermore, after viewing an advertisement, there is a need for providing the user with a means of purchasing a product or service that was advertised.

Typical product promoting websites utilize a combination of single website cookie identification and general topics of web publication to target advertisements to users, which may result in targeting of irrelevant advertisements to users. These users may tend to ignore the presented advertisement, surf over to other websites while the targeted advertisement is playing, etc., resulting in decreased viewership of the presented advertisement.

Hence, there is a long felt but unresolved need for a computer implemented method and system that dynamically profiles users for incentivized targeting of relevant multimedia content such as advertisements, enables media service providers to confirm that the users viewed the targeted multimedia content on client devices, and encourages the users to provide a confirmation of the viewing that in turn reflects the interest of the users in the advertisements. Moreover, there is a need for allowing users to select the multimedia content to be viewed based on their preferences and for providing incentives for viewing the selected multimedia content. Furthermore, there is a need for enabling users to purchase a product or a service by viewing the multimedia content.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above stated needs for dynamically profiling users for incentivized targeting of relevant multimedia content such as advertisements to the users in a networked environment. As used herein, "incentivized targeting of multimedia content" refers to targeting of multimedia content to users, where the users are compensated with incentives or items of value on confirming viewing of the targeted multimedia content. Also, as used herein, the term "multimedia content" refers to content in different combined and individual formats, for example, text, audio, video, audiovisual, still images, animations, and rich content formats. The multimedia content for viewing is, for example, available as streaming content or downloaded content and comprises content on demand. The computer implemented method and system disclosed herein also addresses the above stated need for confirming that the users viewed the entire targeted multimedia content on their client devices, and for providing incentives to the users to view the entire multimedia content. As used herein, the term "client device" is, for example, an internet enabled mobile device, a computer with a web browser, a smart phone, a tablet computing device, a set top box capable of delivering interactive multimedia content, an internet protocol enabled device on an internet connection, etc.

The client device is capable of receiving the multimedia content in different multimedia content formats, for example, hypertext markup language 5 (HTML5) format, Windows® audio video format and other proprietary and non-proprietary formats. The computer implemented method and system can be used for confirming that the user viewed the entire multimedia content that is, for example, commercial, educational, or entertaining in nature. The computer implemented method and system disclosed herein encourages the users to provide confirmation that the users viewed the multimedia content, which in turn increases the probability of the users purchasing the company's products or services.

The computer implemented method and system disclosed herein provides a server comprising at least one processor configured to manage the dynamic profiling of users for the incentivized targeting of the multimedia content to the users. The server is accessible, for example, through a wide spectrum of technologies and devices such as general packet radio service (GPRS), 3G or other internet enabled cellular phones and tablet computing devices, smart phones, computers with connection to the internet, televisions with digital set top boxes, etc. The server creates an advertiser network comprising multiple advertisers and multiple member websites. The advertisers submit the multimedia content, advertising information, and targeting criteria to the server via a communication link. The server receives the multimedia content, advertising information, and targeting criteria submitted by each of the advertisers via the communication link. The server provides access to the multimedia content for incentivized targeting across multiple publisher websites in the networked environment. The publisher websites comprise, for example, the member websites and multiple non-member websites.

In an embodiment, the server associates the non-member websites among the publisher websites with the server via one or more third party advertiser networks associated with the server. The third party advertiser networks source the multimedia content from the server into the non-member websites via the communication link for the targeting of the multimedia content to the users in the user network. In an embodiment, the third party advertiser networks associated with the non-member websites detect a user identifier stored on a client device of a user by the server and/or one or more of the member websites via the communication link. As used herein, the term "user identifier" refers to an identifier that determines a user's identity for tracking the user's behavior and activities on the publisher websites. The third party advertiser networks associated with the non-member websites establish a connection with the server via the communication link for sourcing the multimedia content from the server to the users on the non-member websites via the third party advertiser networks using the detected user identifier.

In an embodiment, the server creates an advertiser profile for each of the advertisers in the advertiser network based on the multimedia content, the advertising information, and the targeting criteria submitted to the server by each of the advertisers. The server creates a user network comprising multiple users that are registered on the server and/or recruited from one or more of the publisher websites in the networked environment. In an embodiment, the server automatically recruits a non-member user into the user network when the non-member user registers with one or more of the publisher websites.

The server and/or one or more of the publisher websites acquire marketing data from the users in the user network via the communication link for creating dynamic user profiles for the users in the user network. In an embodiment, the server and/or the publisher websites monitor activities and detect interactions of the users in the user network across the publisher websites in the networked environment for the creation of the dynamic user profiles for the users in the user network.

The server and/or the publisher websites target the multimedia content to the users in the user network via the communication link based on the created dynamic user profiles of the users in the user network. The multimedia content is sourced from the server to the users in the user network via one or more of the publisher websites. In an embodiment, the server matches the created dynamic user profile of each of the users with the created advertiser profile of each of the advertisers for targeting the multimedia content to the users in the user network based on the matching. In an embodiment, the server generates a ranking score for each match of the created dynamic user profile with the created advertiser profile found during the matching of the created dynamic user profile of each of the users with the created advertiser profile of each of the advertisers. The server and/or the publisher websites then target the multimedia content to one or more of the users based on the ranking score. In an embodiment, the server facilitates bidding among the advertisers in the advertiser network for targeting the multimedia content of one of the advertisers to one or more of the users in the user network. In an embodiment, one or more social networking platforms are integrated with the server via the communication link for targeting the multimedia content to the users in the user network via the social networking platforms.

In an embodiment, the server acquires ratings from the advertisers in the advertiser network via the communication link for each match of the created dynamic user profile with the created advertiser profile found during the matching of the created dynamic user profile of each of the users with the created advertiser profile of each of the advertisers. The server determines common characteristics among the users in the user network based on the ratings and updates the targeting criteria using the ratings and the common characteristics for enhanced targeting of the multimedia content to the users in the user network.

In an embodiment, the server stores a user identifier associated with each of the users in the user network on the client device of each of the users in the user network for determining whether a user is a member of the user network. The user identifier is detectable by the publisher websites and one or more third party advertiser networks via the communication link for retrieving a corresponding dynamic user profile of the user for targeting the multimedia content to the user. In another embodiment, the server registers a user identifier associated with the client device of each of the users in the user network in an information database. The registered user identifier is detectable and retrievable by the publisher websites and the third party advertiser networks via the communication link for determining whether a user is a member of the user network. The publisher websites and the third party advertiser networks retrieve a corresponding dynamic user profile of the user from the server using the registered user identifier for targeting the multimedia content to the user.

In an embodiment, the server transmits a list of the targeted multimedia content and viewing parameters to the client device of each of the users in the user network for selection. The viewing parameters comprise, for example, a schedule, an order of playing the targeted multimedia content selected by each of the users, etc. The server acquires selections of one or more of the viewing parameters and one or more of the targeted multimedia content from the list of targeted multimedia content from the users. The client device of each of the users in the user network receives and plays the selected multimedia content based on the selected viewing parameters. The client device of the user receives the multimedia content, for example, an advertisement, a commercial message, an educational clip, an entertainment clip, etc., from the server and plays the multimedia content on a display screen of the client device, for example, in an audiovisual format.

In an embodiment, the server and/or the publisher websites modify content displayed on the publisher websites for each of the users in the user network based on the marketing data acquired from each of the users in the user network. In an embodiment, the server integrates marketing data acquired from the users in the user network into one or more recommendation engines employed by the publisher websites and one or more third party advertiser networks for generating recommendations related to one or more products and/or services of the publisher websites and the third party advertiser networks.

The server and/or the client device of each of the users confirms whether the users in the user network viewed the targeted multimedia content on one or more of the server and across the publisher websites in the networked environment using a challenge, random in content. The challenge, random in content, is one or more of unrelated to the targeted multimedia content, presented at random times during play of the targeted multimedia content, after the play of the targeted multimedia content, and/or a combination thereof, and presented at random physical locations on the targeted multimedia content. The challenge, random in content, comprises, for example, one or more of a random number, a random icon, a random shape, a product logo, a service logo, a random color, a random mathematical equation, and a random target on the display screen of the client device for the user to interact therewith using touch or a pointing device. The challenge, random in content, changes for each viewing of the multimedia content.

The computer implemented method and system disclosed herein comprises a view confirmation module disposed in the server and/or the client device of each of the users. In an embodiment, the view confirmation module presents the challenge, random in content, to the users by overlaying the challenge, random in content, on the targeted multimedia content or by interrupting play of the targeted multimedia content after an interrupt time period. The server invokes a response from each of the users for the presented challenge, random in content. The response determines whether each of the users have viewed the targeted multimedia content.

The view confirmation module disposed in the server and/or the client device of each of the users comprises a challenge generator, a challenge-response module, and a report generation module. In an embodiment, the challenge generator generates a challenge stream comprising multiple challenges, where the content of each of the challenges in the challenge stream is random. The challenge-response module integrates, that is, combines the challenge stream and a stream of targeted multimedia content in real time to generate the challenge, random in content, in real time for the targeted multimedia content. The challenge is random in content each time the same targeted multimedia content is played on the client device of each of the users. Each time the same multimedia content is played sequentially or simultaneously on one or more client devices, the challenge generator in the client device generates a new challenge, random in content, and presents the new challenge, random in content, to the user on the client device.

The challenge-response module presents the challenge, random in content, to the users to confirm that the users viewed the targeted multimedia content played on a display screen of each corresponding client device, by displaying the challenge, random in content, as an overlay on the targeted multimedia content. The challenge-response module invokes a response from each of the users for the presented challenge, random in content. The challenge-response module confirms viewing of the targeted multimedia content by each of the users if the response entered by each of the users in a corresponding client device for the presented challenge, random in content, indicates, for example, a correct response.

One or more responses are invoked from each user for one or more presented challenges, random in content. The client device may locally determine whether the response(s) entered by the user for the presented challenge(s) is correct. If one or more of the responses entered by the user in the client device for the presented challenges, random in content, are correct, the responses confirm that the multimedia content was viewed by the user. The challenge-response interaction with the user is repeated using a new challenge, the content of which is random, if the response from the user to the presented challenge is incorrect. That is, if the user enters an incorrect response to a challenge, random in content, presented to the user, the user can replay the multimedia content that is presented with a new challenge, the content of which is random. A response report is generated based on the response from the user. The generated response report is transmitted to the server for confirming that the multimedia content was viewed. In an embodiment, the response report is generated on the server.

In an embodiment, the challenge, random in content, is presented to each user by interrupting the play of the targeted multimedia content after an interrupt time period. The interrupt time period is less than duration of the targeted multimedia content. A timer is provided to begin counting the interrupt time period at the start of the play of the multimedia content. When the timer reaches the interrupt time period, the play of the multimedia content is interrupted to present the challenge, random in content, to the user. The challenge-response module invokes a response from each of the users for the presented challenge, random in content. The challenge-response module then confirms viewing of the targeted multimedia content by each of the users if the response is entered by each of the corresponding users, in the corresponding client device for the presented challenge, random in content.

In an embodiment, the challenge-response module presents one or more challenges, random in content, at one or more times during and/or after the play of the multimedia content on the user's client device. The duration of play of the multimedia content is determined and the challenge, random in content, is presented during and/or after the duration of play of the multimedia content. In an embodiment, the challenge-response module transfers a response to each of the challenges, random in content, from each of the users to one or more random locations on a display screen of the client device of each of the users or a multimedia player frame within the display screen of the client device, during the play of the targeted multimedia content. The challenge-response module automatically registers each response of each of the users on the display screen of the corresponding client device or the multimedia player frame within the display screen of the client device at the end of the play of the targeted multimedia content.

In another embodiment, the challenge, random in content, appears randomly on the multimedia player frame within the display screen of the client device. For example, the challenge, random in content, appears randomly on any four corners of the multimedia player frame. The challenge, random in content, also appears at a number of unique positions within the multimedia player frame based on physical coordinates selected within the multimedia player frame. The challenge, random in content, may also appear immediately outside a boundary of the multimedia player frame and scrolls in an upward direction or a downward direction on either side of the multimedia player frame. The challenge, random in content, also scrolls in a rightward direction or a leftward direction above or below the multimedia player frame.

The challenge, random in content, is presented in different forms such as a visual overlay on the multimedia content, or a child window cascading with the content rendering window, or parent window. For example, the challenge, random in content, comprises one or more random numbers presented at different points in time when the multimedia content is being played. The correct response in this example comprises reproduction of the random numbers by entering the random numbers into the client device. In an embodiment, the challenge comprises, for example, a random pair of geometrical shapes, a random mathematical equation, a random icon, a product logo or a service logo, a color, a target on a touch screen, etc., overlaid at random physical positions on the multimedia content. The correct response comprises, for example, a selection of an option representing a pair of geometrical shapes from an options list, entering the result of the mathematical equation into the client device, selection of an option representing an icon from an options list, selection of an option representing a product logo or a service logo from an options list, selection of an option representing a color from an options list, selection of or interaction with a target or response region on a touch screen, etc., respectively. In another embodiment, one or more challenges, random in content, are presented at different time intervals during the play of the multimedia content or at the conclusion of the play of the multimedia content.

A response for a challenge, random in content, is deemed correct, that is, viewing of the multimedia content is confirmed if the user provides the response within a response time-out period after the challenge, random in content, is presented. For example, a timer is provided to determine the time lapsed between the presentation of the challenge, random in content, and the submission of the response on the client device.

The response for a challenge, random in content, is invoked at any time during and/or after the multimedia content is played. For example, the user may be prompted to enter a response to the challenge, random in content, during the play of the multimedia content, or during and also at the end of the play of the multimedia content, or after the multimedia content is played.

In an embodiment, the client device downloads and stores the selected multimedia content when the client device is connected to the server. In this embodiment, when the connection to the server is inactive, the client device renders the downloaded multimedia content in an off-line mode, performs a challenge-response interaction with the user, and generates and stores the response report. The off-line mode is triggered when the connection to the server is inactive. When a connection to the server is established via, for example, satellite, a wireless network, the internet, etc., the response report is transmitted to the server over the connection. In another embodiment, the client device renders the multimedia content transmitted by the server as streaming multimedia content. In this embodiment, when the connection to the server is active, the client device renders the multimedia content in an online mode and performs a challenge-response interaction with the user. The response report generated after completing the challenge-response interaction is transmitted to the server over the active connection.

The server and/or the publisher websites compensate the users in the user network by crediting the users in the user network with one or more items of value based on the confirmation of the viewing of the targeted multimedia content. The items of value comprise, for example, one or more of points, points redeemable for cash, points redeemable for an item of value, scores, scores redeemable for cash, scores redeemable for an item of value, cash, access to premium multimedia content, viewing of premium content, units of virtual currency, cash payment, bill credit, coupons, special discounts on products or services, etc., and any combination thereof. In an embodiment, the server routes the items of value to predetermined organizations specified by the users via the communication link. In another embodiment, the server enables the users to redeem the items of value across the server, the advertiser network, and external websites in the networked environment.

In an embodiment, the user is credited with an item of value, for example, cash, if the response report confirms the multimedia content was viewed by the user, and a multimedia content owner, for example, an advertiser, is debited a fee. When the user successfully responds to one or more of the challenges, random in content, the correct or partially correct response to the challenge, random in content, indicates a confirmation that the multimedia content has been viewed. In an embodiment, the user is eligible for an item of value even when one or more responses entered by the user are incorrect. In another embodiment, the user is eligible for an item of value for each correct response to a challenge, random in content, presented. Offering an item of value for a confirmed view provides an incentive to the user to view the entire multimedia content and respond to the challenge, random in content, presented during and/or after the play of the multimedia content. In another embodiment, the incentive is in the form of a redeemable credit score accumulated by the user over time. The credit score is redeemed, for example, with money, gifts, or any other item of value. The server is configured to receive the response report sent by the client device, and directs a payment module to credit a user account, for example, with a predetermined amount of money for a confirmed viewing of the multimedia content.

In another embodiment, the user is provided with an electronic wallet (e-wallet) associated with the user account for accruing the items of value over a period of time. The user is compensated by depositing the items of value into the e-wallet and debiting a fee from, for example, the advertiser, if the response report confirms that the selected multimedia content was viewed by the user. In an embodiment, the server provides the user with an option of triggering playback of premium multimedia content in exchange for the items of value accrued in the electronic wallet and allows the premium multimedia content to play. In an embodiment, the user can purchase products and services on an electronic commerce (e-commerce) platform using the items of value accrued in the e-wallet.

In another embodiment, the server inserts an interactive promotional segment within the multimedia content. The interactive promotional segment directs the user to an e-commerce platform for enabling the user to purchase products and services on the e-commerce platform. The server may also promote viewing of the multimedia content.

The computer implemented method and system disclosed herein notifies users about new content, for example, via a text message or an electronic mail, and after they view the multimedia content, for example, an advertisement video on demand and in its entirety via their client devices, an advertiser can offer a variety of incentives, ranging from product discounts and virtual goods to social gaming and invitations or promotions to offline events. Since the users opt into the user network, the server enables the advertisers to target users who are more likely to know and want their brand. The computer implemented method and system disclosed herein allows brand awareness to remain after the multimedia content is consumed by the users, because the users chose to watch the multimedia content and the advertiser can follow with rewards or another call to action.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIGS. 21A-21E exemplarily illustrate screenshots for registering a viewer with the server.

FIGS. 22A-22B exemplarily illustrate screenshots for creating a profile by the viewer on the server.

FIGS. 24A-24E exemplarily illustrate screenshots of compensations accumulated and redeemed by the viewer.

FIGS. 27A-27G exemplarily illustrate a C++ implementation of a challenge generator.

FIG. 28 exemplarily illustrates a sample output after executing test cases established for the challenge generator.

DETAILED DESCRIPTION OF THE INVENTION

Figure 1:
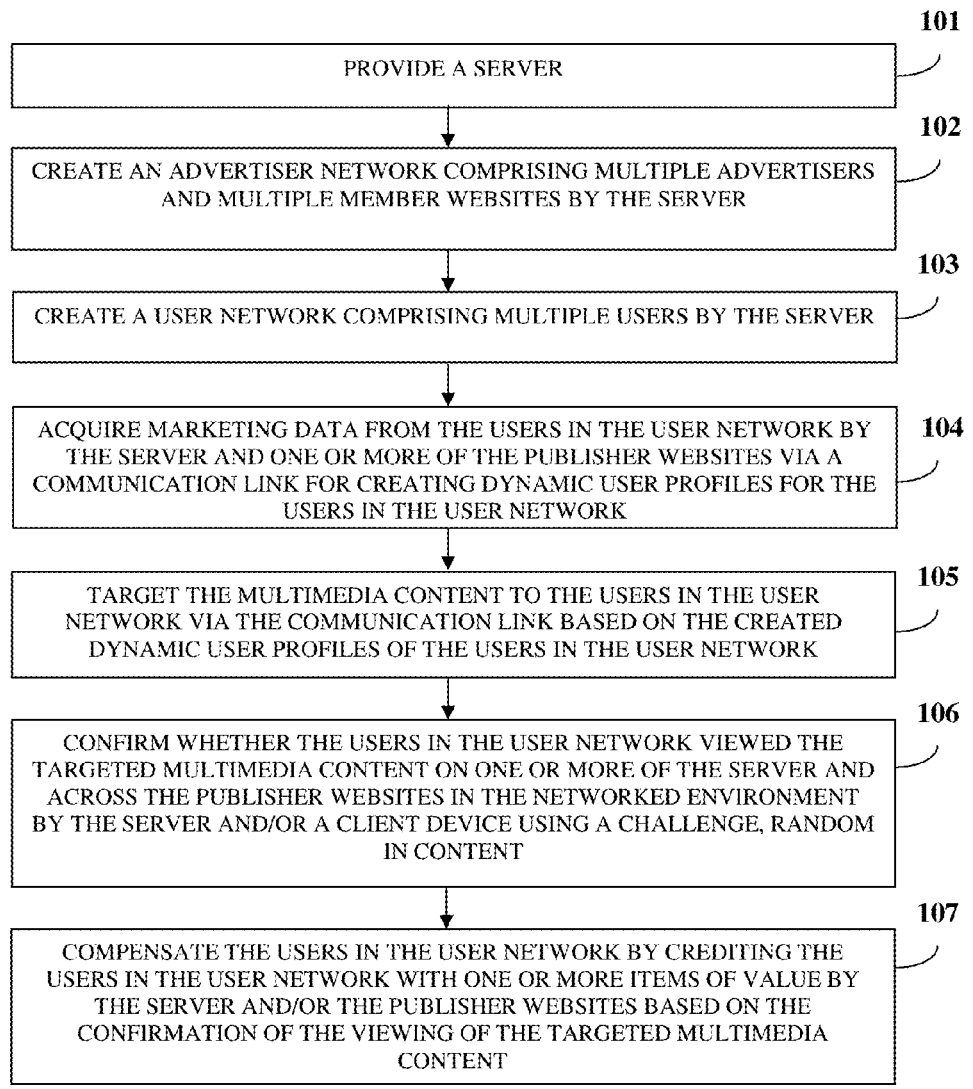
FIG. 1 illustrates a computer implemented method for dynamically profiling users for incentivized targeting of multimedia content to the users in a networked environment.
Figure 2:
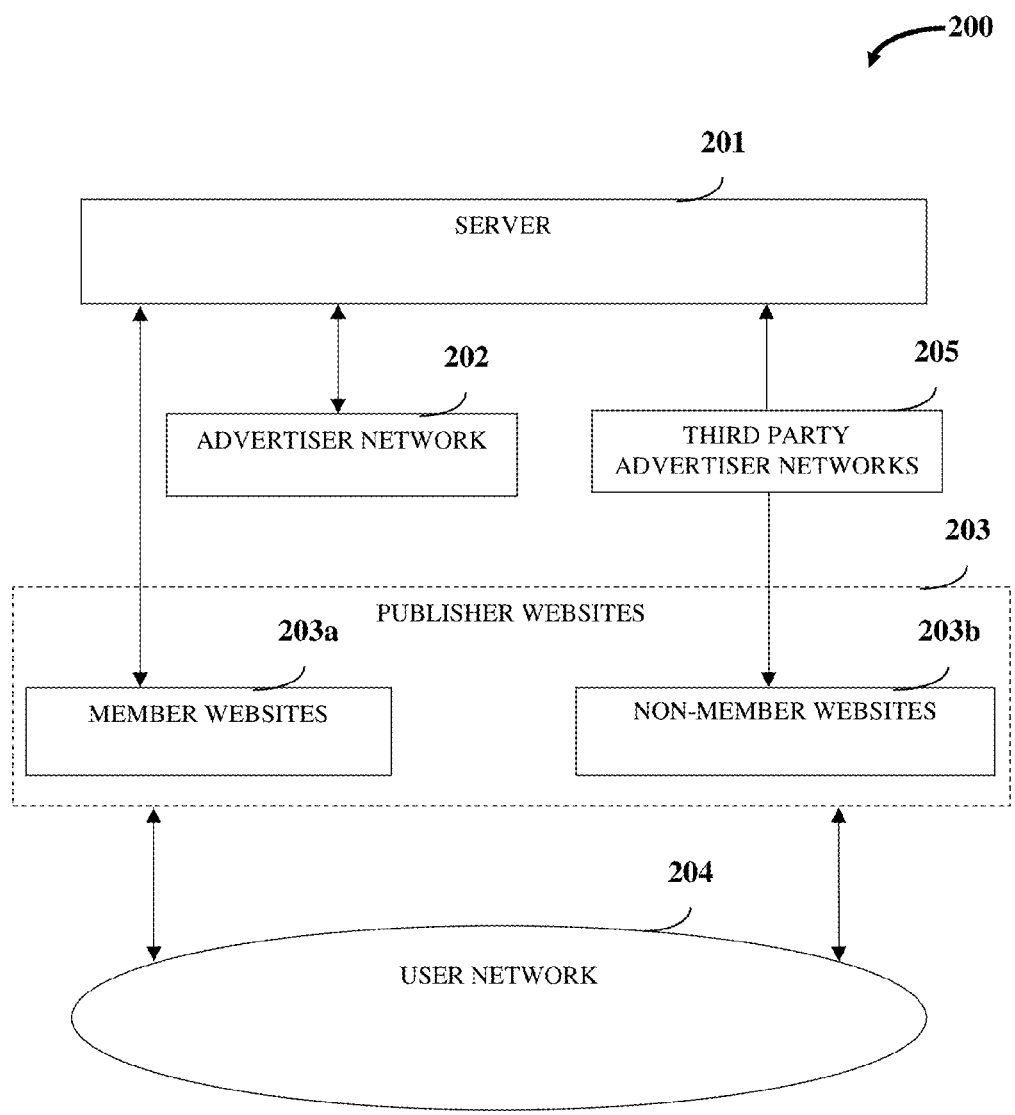
FIG. 2 exemplarily illustrates communication between a server, an advertiser network, publisher websites, and a user network in a networked environment according to the computer implemented method disclosed herein.

FIG. 1 illustrates a computer implemented method for dynamically profiling users for incentivized targeting of multimedia content to the users in a networked environment 200 exemplarily illustrated in FIG. 2. As used herein, "incentivized targeting of multimedia content" refers to targeting of multimedia content to users, where the users are compensated with incentives or items of value on confirming viewing of the targeted multimedia content. Also, as used herein, the term "multimedia content" refers to content in different combined and individual formats, for example, text, audio, video, audio-visual formats, still images, animations, and rich content formats. The multimedia content is, for example, an advertisement comprising video, audio, animation, a specific application that is downloadable onto a user's client device 1301, exemplarily illustrated in FIG. 13, and interacted with by the user, a commercial message, an educational clip, an entertainment clip, etc. As used herein, the term "client device" is, for example, an internet enabled mobile device, a computer with a web browser, a smart phone, a tablet computing device, a set top box capable of delivering interactive multimedia content, an internet protocol enabled device on an internet connection, etc. The client device 1301 is capable of receiving the multimedia content in different multimedia content formats, for example, hypertext markup language 5 (HTML5) format, Windows® audio video format, and other proprietary and non-proprietary formats.

Figure 13:
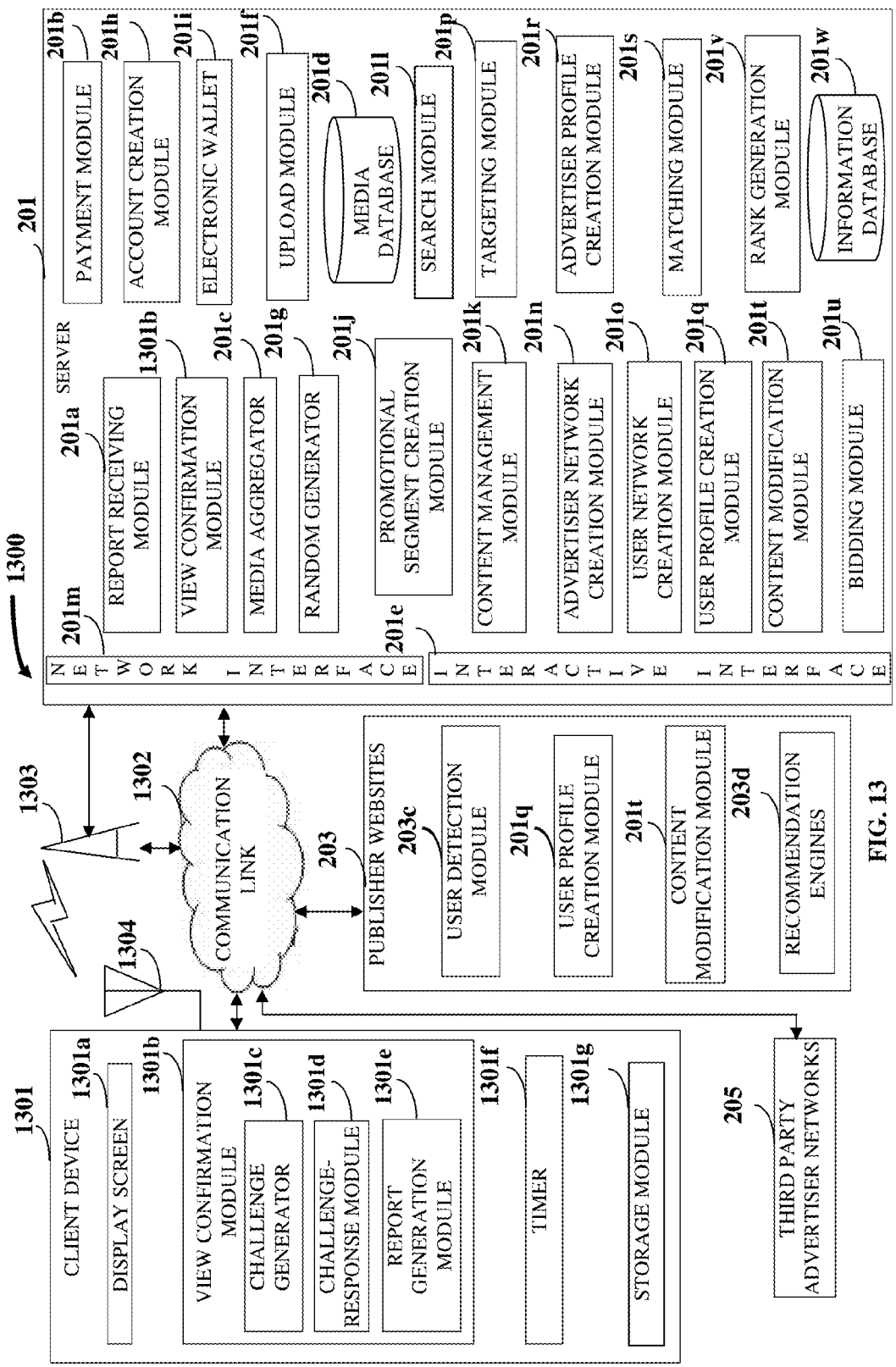
FIG. 13 illustrates a computer implemented system for dynamically profiling users for incentivized targeting of multimedia content to the users in a networked environment.

The computer implemented method disclosed herein provides 101 a server 201 exemplarily illustrated in FIG. 2 and FIG. 13 comprising at least one processor configured to manage dynamic profiling of multiple users for incentivized targeting of the multimedia content to the users. As used herein, the term "user" refers to a person who accesses the server 201 or publisher websites 203, as exemplarily illustrated in FIG. 2, for performing one or more activities, for example, registering with the server 201, searching for products and/or services, providing marketing data, viewing multimedia content, receiving items of value for confirming viewing of the multimedia content, etc. The multimedia content for viewing is available, for example, as streaming content or downloaded content and comprises content on demand. In an embodiment, the multimedia content is an application that is downloaded onto a mobile client device 1301 and interacted with by a user. The server 201 is, for example, a computing platform comprising hardware architecture and a software framework that allows software to run on the computing platform.

The server 201 creates 102 an advertiser network 202 comprising multiple advertisers and multiple member websites 203a as exemplarily illustrated in FIG. 2. As used herein, the term "advertisers" refers to entities that seek to generate increased consumption of their products and/or services through branding using the server 201. The advertisers are, for example, multimedia content owners, manufacturers of products, service providers, websites advertising products or services, etc. The advertisers submit multimedia content, advertising information, and targeting criteria to the server 201 via a communication link 1302 exemplarily illustrated in FIG. 13. The communication link 1302 is a network established, for example, via the internet, an intranet, a local area network, a wide area network, a wireless network, a mobile communication network, etc. The wireless network is implemented, for example, via a Bluetooth® protocol, a Wi-Fi® protocol of the Wireless Ethernet Compatibility Alliance, Inc., etc. The mobile communication network is, for example, a global system for mobile communications (GSM) network, a general packet radio service (GPRS) network, etc. The server 201 receives and stores the submitted multimedia content, advertising information, and targeting criteria. The advertising information comprises, for example, information about a product and/or a service marketed by an advertiser, brand value, specification of the product and/or the service, characteristics of the product and/or the service, etc. The targeting criteria define a set of characteristics of users to whom the advertisers wish to target the multimedia content. The targeting criteria comprises, for example, age, gender, financial status, interests, hobbies, location, etc., of the users. Each of the advertisers within the advertiser network 202 specifies characteristics and the targeting criteria for the users in the user network 204 created by the server 201, that the advertisers want to target. The server 201 then applies the targeting criteria on the users in the user network 204 created by the server 201, when the users access different publisher websites 203 and targets the multimedia content appropriately.

The server 201 provides access to the multimedia content for the incentivized targeting across multiple publisher websites 203 in the networked environment 200. The multimedia content provided by the advertisers is therefore available for targeting across multiple publisher websites 203. The publisher websites 203 comprise, for example, the member websites 203a and multiple non-member websites 203b as exemplarily illustrated in FIG. 2. As used herein, the term "member websites", also known as "direct websites", refers to websites that join the advertiser network 202 by registering with the server 201. Also, as used herein, the term "non-member websites" also known as "indirect websites" refers to websites that are not registered with the server 201 but may participate in the advertiser network 202 via the member websites 203a and one or more third party advertiser networks 205 exemplarily illustrated in FIG. 2. As used herein, the term "third party advertiser networks" refers to advertiser networks that are external to the advertiser network 202 created by the server 201.

The non-member websites 203b are associated with the server 201 via one or more third party advertiser networks 205 associated with the server 201. The third party advertiser networks 205 source the multimedia content from the server 201 into the non-member websites 203b via the communication link 1302 for targeting of the multimedia content to the users in the user network 204. Therefore, the advertiser network 202 is extended via the member websites 203a and the third party advertiser networks 205. In an embodiment, the third party advertiser networks 205 associated with the non-member websites 203b detect a user identifier stored on a user's client device 1301 exemplarily illustrated in FIG. 13, by the server 201 and/or the member websites 203a, via the communication link 1302. The third party advertiser networks 205 associated with the non-member websites 203b then establish a connection with the server 201 via the communication link 1302 for sourcing the multimedia content from the server 201 to the user on the non-member websites 203b via the third party advertiser networks 205 using the detected user identifier. As used herein, the term "user identifier" refers to an identifier that determines a user's identity for tracking the user's behavior and activities on the publisher websites 203. The user identifier is, for example, a web cookie, a browser cookie, a hypertext transfer protocol (HTTP) cookie, etc. The cookie refers to a message or information transmitted to a browser application of the client device 1301 of each of the users in the user network 204 created by the server 201 and/or the member websites 203a, for example, for identification of the user, the user's session, the user's preferences, etc. The user identifier may also be a device identifier that identifies the user's client device 1301. As used herein, the term "device identifier" refers to an identifier that is unique to the client device 1301 of the user. The device identifier for a mobile client device 1301, for example, a mobile phone, a smart phone, etc., is an international mobile equipment identity (IMEI) number of the mobile client device 1301 or another unique identifier provided by a mobile carrier. The unique device identifier is shared with third party advertising networks 205 to identify users who are members of the user network 204.

The server 201 creates 103 a user network 204, for example, a consumer base comprising multiple users that are registered on the server 201 and/or recruited from one or more of the publisher websites 203 in the networked environment 200. The user network 204 is, for example, a network of web users that belong to a common network of websites. The server 201 communicates with the users in the user network 204, the advertisers in the advertiser network 202, and the publisher websites 203 in the networked environment 200 as disclosed in the detailed description of FIG. 2. The user network 204 is made accessible to the advertiser network 202, the non-member websites 203b, and the third party advertiser networks 205 in the networked environment 200. The users who join the user network 204 by registering with the server 201 become part of the user network 204. A user who is part of the user network 204 and accesses a non-member website 203b is also targeted multimedia content from the server 201 via a third party advertiser network 205 exemplarily illustrated in FIG. 2.

The users in the user network 204 interact with the advertisers through one or more websites. The users join the user network 204 by a registration process and/or an opt-in process with the server 201. However, not all users who access member websites 203a of the advertiser network 202 are part of the user network 204. In an embodiment, the server 201 automatically recruits a non-member user into the user network 204 when the non-member user registers with one or more of the publisher websites 203. For example, the server 201 automatically recruits non-member users who register with a member website 203a such as Fiber Optic Service Cable that belongs to the advertiser network 202 created by the server 201 into the user network 204. Therefore, the users may be auto-joined to the user network 204 via their affiliation with another website. The server 201 extends the user network 204 via the non-member websites 203b who participate in the advertiser network 202 via the member websites 203a or the third party advertiser networks 205. In an embodiment, the server 201 enables a user who registers or enrolls with a member website 203a to extend membership across the publisher websites 203 in the advertiser network 202. For example, if a user has an interactive television membership, the server 201 makes available the user's membership information and marketing data across the web, mobile and other publishing technologies and social networks in the networked environment 200, for extending the membership.

The member websites 203a directly participate in the advertiser network 202. The member websites 203a use the server 201 as an advertising platform for targeting the multimedia content to the users in the user network 204. The third party advertiser networks 205 source the multimedia content from the server 201 into the non-member websites 203b for targeting the multimedia content to the users in the user network 204. The third party advertiser networks 205 may be members of the advertiser network 202 created by the server 201 and can therefore source multimedia content from the server 201 into the non-member websites 203b for targeting the multimedia content to the users in the user network 204. In an embodiment, the server 201 integrates multiple existing commercial advertiser networks into the advertiser network 202 and sources multimedia content into the integrated commercial advertiser network. In an embodiment, the server 201 recruits publisher websites 203, external websites, etc., into the advertiser network 202 by signing a direct deal with the publisher websites 203, external websites, etc.

Consider an example where a user in the user network 204 interacts with a member website 203a. The member website 203a places a cookie on a client device 1301 of the user. When the user, using the same client device 1301 interacts with a non-member website 203b that participates in the advertiser network 202 via a third party advertiser network 205, the third party advertiser network 205 detects the cookie on the user's client device 1301 and establishes a connection with the server 201. That is, the third party advertiser network 205 communicates the presence of a member of the user network 204 on the non-member website 203b to the server 201. The multimedia content is then sourced from the server 201 to the user on the non-member website 203b via the third party advertiser network 205.

Consider another example where a user registers with the user network 204 of the server 201. The server 201 associates a user identifier, for example, a cookie with the user's client device 1301. When the user, using the same client device 1301 interacts with a non-member website 203b that participates in the advertiser network 202 via a third party advertiser network 205, the third party advertiser network 205 detects the cookie on the user's client device 1301 and establishes a connection with the server 201. The server 201 sources the appropriate multimedia content to the user on the non-member website 203b via the third party advertiser network 205.

In an embodiment, the server 201 recruits users into the user network 204 via one or more of the third party advertiser networks 205 in a white labeled manner. The creation of the user network 204 can be branded or white labeled. As used herein, "white labeled" creation of the user network 204 refers to rebranding the user networks of the publisher websites 203, the external websites, and the third party advertiser networks 205 in association with the server 201 to incorporate their user networks into the user network 204 of the server 201. The users can be recruited from the third party advertiser networks 205 to join the user network 204 via the advertiser network 202 that extends beyond the publisher websites 203. In an embodiment, the users can join specific publisher websites' 203 networks and therefore be "white labeled". The publisher websites 203, for example, recruit the users into their networks in a single website or under multiple websites that are affiliated to the publisher websites 203. The user can be recruited to join the user network 204 via a member website 203a or a non-member website 203b that is affiliated with other advertiser networks that are part of the advertiser network 202 created by the server 201. The user network 204 is made accessible to other member websites 203a of the other advertiser network under the brand of the third party advertiser network 205. In an embodiment, a publisher website 203 white labels the created user network 204 and allows the server 201 to tailor the targeting of multimedia content and subsequent compensation for confirming viewing of the multimedia content in the form of items of value or rewards more to the types of users that have been recruited to the user network 204 via the publishing website 203. In this manner, the users engage with advertisements for compensation at multiple websites under another website or advertiser network's 202 brand. The user and/or the advertisers access the server 201 using one or more electronic client devices, for example, web televisions, interactive televisions, mobile smart phones, tablet devices such as the iPad® of Apple Inc., etc.

Consider an example of a publisher website 203 such as Turner® Broadcasting Systems, Inc., that is a member website 203a of the advertiser network 202 created by the server 201. Turner® Broadcasting Systems, Inc., also owns a number of websites, for example, Cable News Network® (CNN), Turner Network Television® (TNT), Turner Sports®, etc., and has a "white labeled" user network 204. A user registered on one of the websites of Turner® Broadcasting Systems, Inc., is recruited into the user network 204 created by the server 201, which is made accessible to the other member websites 203a as well as the publisher website Turner® Broadcasting Systems, Inc., for targeting multimedia content sourced from the server 201 to the user. Consider another example of a single publisher website 203 such as the New Jersey newspaper website, NJ.com which is a member website 203a of the advertiser network 202 created by the server 201. In this example, the single publisher website 203 has a single website and a single white labeled user network. The server 201 extends the user network 204 by recruiting users of the single newspaper website, NJ.com.

The server 201 and/or the publisher websites 203 acquire 104 marketing data from the users in the user network 204 via the communication link 1302 for creating dynamic user profiles for the users in the user network 204. As used herein, the term "marketing data" refers to selected population characteristics as used in marketing research, opinion research, etc. The marketing data is, for example, race, age, income, disabilities, mobility in terms of travel time to work or number of vehicles available, type of vehicle, vacation preferences, educational attainment, home ownership, employment status, geographical location, etc. The marketing data comprises, for example, demographic data, psychographic data, behavioral data, etc. The demographic data comprises, for example, age, sex, race, income, disabilities, mobility in terms of travel time to work or number of vehicles available, home ownership, educational attainment, employment status, geographical location, etc. The psychographic data comprises, for example, attributes relating to personality, values, attitudes, desires, interests, preferences, lifestyles, activities, opinions, characteristics, etc., of the user. The behavioral data comprises, for example, user activities such as purchase actions, clicking on coupons, web activities, etc. The behavioral data is based on actual observed user actions, for example, clicking on coupons, clicking on specific offers, purchase, and browsing patterns, web activities, etc. The marketing data of the users in the user network 204 is made available across the networked environment 200.

The server 201, the publisher websites 203, the external websites, the third party advertiser networks 205, etc., acquire the marketing data from the users in the user network 204. For example, during registration with the server 201, the users agree to be profiled through a series of marketing questions before, during or after each session with the advertiser network 202. In an embodiment, the server 201 and/or the publisher websites 203 monitor activities and detect interactions of the users in the user network 204 across the publisher websites 203 in the networked environment 200 for creation of the dynamic user profiles for the users in the user network 204.

In an embodiment, the server 201 and/or the publisher websites 203 modify content displayed on the publisher websites 203 for each of the users in the user network 204 based on the marketing data acquired from each of the users in the user network 204. In this embodiment, when a user in the user network 204 accesses a publisher website 203, the content offered to the user in the user network 204 is customized based on the marketing data and information provided by the server 201 to the publisher website 203. For example, if a sports website is aware that the user is a football fan, then they may choose to highlight football content to the specific user. In another embodiment, the server 201 enables the publisher websites 203, the external websites, and the third party advertiser networks 205 that source multimedia content from the server 201 to influence, modify, and alter the multimedia content prior to display at their respective websites. The publisher websites 203 use the acquired marketing data and other information provided by the server 201 to modify or alter content of the publisher websites 203 for a specific user network 204 made accessible by the server 201.

In another embodiment, the server 201 integrates the marketing data acquired from the users in the user network 204 into one or more recommendation engines 203*d* exemplarily illustrated in FIG. 13, employed by the publisher websites 203, the external websites, and the third party advertiser networks 205 for generating recommendations related to one or more products and services of the publisher websites 203 and the third party advertiser networks 205. For example, the server 201 integrates the acquired marketing data into the recommendation engines 203*d* employed, for example, by music sites, electronic commerce websites, electronics sites, car buying sites, etc. The integration of the acquired marketing data into the recommendation engines 203*d* increases the accuracy of the recommendation engines 203*d* and relevancy for targeting the multimedia content to the users in the user network 204.

The server 201 targets 105 the multimedia content to the users in the user network 204 via the communication link 1302 based on the created dynamic user profiles of the users in the user network 204. The multimedia content is sourced from the server 201 to the users in the user network 204 via one or more publisher websites 203 or the third party advertiser networks 205. For example, a website that is not part of the created advertiser network 202 publishes advertisements sourced from the server 201 via participating websites, member websites 203*a*, and third party advertiser networks 205. In an embodiment, the user in the user network 204 downloads the targeted multimedia content to a client device 1301 of the user. The server 201 targets the multimedia content to the users in the user network 204, for example, by sending electronic mail (email) alerts identifying offers and opportunities at the member websites 203*a* of the publisher websites 203, sending text message alerts identifying offers on both traditional web services and mobile web services, using geolocation information services from a mobile client device 1301, etc.

The multimedia content that is targeted is, for example, advertising multimedia content. For example, the advertising multimedia content is a branded application car racing game sponsored by Ford® Inc. The user in the user network 204 may have to achieve a certain level or score in the branded application car racing game in order to be compensated or rewarded. The user may download the branded application car racing game on a client device 1301, for example, a personal computer, a Macintosh® (MAC) computer, a mobile device or a smart phone such as the iPhone® of Apple Inc., an android phone, and a Blackberry® mobile device of Research in Motion Limited, a tablet computer such as the iPad® of Apple Inc., or a widget or game on an interactive television.

In an embodiment, the server 201 stores a user identifier associated with each of the users in the user network 204 on a client device 1301 of each of the users in the user network 204 for determining whether a user is a member of the user network 204. The user identifier is detectable by the publisher websites 203 and one or more third party advertiser networks 205 via the communication link 1302 for retrieving a corresponding dynamic user profile of the user for targeting the multimedia content to the user. When the users of the user network 204 are tracked between websites and they are found to be accessing a non-member website 203*b*, but that non-member website 203*b* uses a participating third party advertiser network 205, then the users can still engage with the multimedia content in the networked environment 200. For example, when a user in the user network 204 is using a non-member website 203*b* of the publisher websites 203, the server 201 uses a participating website, for example, a participating third party advertiser network 205 to source the multimedia content for targeting to the user in the user network 204.

In another embodiment, the server 201 registers a user identifier, for example, a device identifier, associated with the client device 1301 of each of the users in the user network 204 in an information database 201*w* exemplarily illustrated in FIG. 13. The user identifier is detectable and retrievable by the publisher websites 203 and the third party advertiser networks 205 via the communication link 1302 for determining whether a user is a member of the user network 204. In this embodiment, the client device 1301 is, for example, a mobile client device 1301, and the user identifier is the device identifier of the mobile client device 1301. The mobile client device 1301 is, for example, a mobile phone, a smart phone such as an iPhone® of Apple Inc., an Android® device, etc. In an embodiment, the publisher websites 203 and the third party advertiser networks 205 retrieve a corresponding dynamic user profile of the user from the server 201 using the device identifier for targeting of the multimedia content to the user.

Consider an example where a user interacts with a member website 203*a* which is a mobile enabled website or a mobile application via a smart phone. The member website 203*a* detects the user's device identifier and transmits the user's device identifier to the server 201 via the communication link 1302. The server 201 checks whether the transmitted device identifier is stored in the information database 201w exemplarily illustrated in FIG. 13. If the transmitted device identifier is stored in the information database 201w, the server 201 detects that the user is a member of the user network 204. The member website 203a retrieves the user's dynamic user profile from the server 201 using the device identifier for targeting the multimedia content to the user. In an embodiment, the member website 203a sources multimedia content relevant to the user's dynamic user profile from the server 201 via the communication link 1302 and targets the multimedia content to the user.

Consider another example where a user interacts with a non-member website 203b which is a mobile enabled website or a mobile application via a smart phone, where the user is a member of the user network 204 and the server 201 stores the user's device identifier in the information database 201w. Further, the server 201 shares the device identifier with the third party advertiser networks 205 for identifying users who are members of the user network 204. If the non-member website 203b is served by a third party advertiser network 205 associated with the server 201, the third party advertiser network 205 detects and retrieves the user's device identifier from the user's smart phone. The third party advertiser network 205 transmits the device identifier to the server 201. The server 201 checks whether the transmitted device identifier is present in the information database 201w. If the transmitted device identifier is present in the information database 201w, the server 201 detects that the user is a member of the user network 204. The third party advertiser network 205 sources the multimedia content from the server 201 for targeting the multimedia content to the user on the non-member website 203b.

Consider an example where a user belongs to the user network 204 created by the server 201 and interacts with a non-member website 203b such as the CBS Broadcasting® Inc. website. The CBS Broadcasting® Inc. website is not part of the created advertiser network 202, but is affiliated with multiple other third party advertiser networks 205. One of the other advertiser networks 205, for example, the "24/7 media" advertiser network is a member by being a participating advertiser network 205 of the advertiser network 202 created by the server 201. Therefore, when the "24/7 media" advertiser network sources advertisements into the CBS Broadcasting® Inc. website, the "24/7 media" advertiser network also pulls advertisements sourced from the server 201 into the CBS Broadcasting® Inc. website. Hence, the server 201 targets multimedia content to the user in the user network 204 on the CBS Broadcasting® Inc. website via the "24/7 media" advertiser network. This example illustrates the method of targeting multimedia content to the user in the user network 204 via a non-member website 203b. The user in the user network 204 is targeted an advertisement from the server 201 because the "24/7 media" advertiser network is a member by being a participating advertiser network of the advertiser network 202 created by the server 201. The "24/7 real media" advertiser network detects that the user is a member of the user network 204, for example, by detecting cookies stored on the user's client device 1301 and then targets the advertisement to the user.

Figure 8:
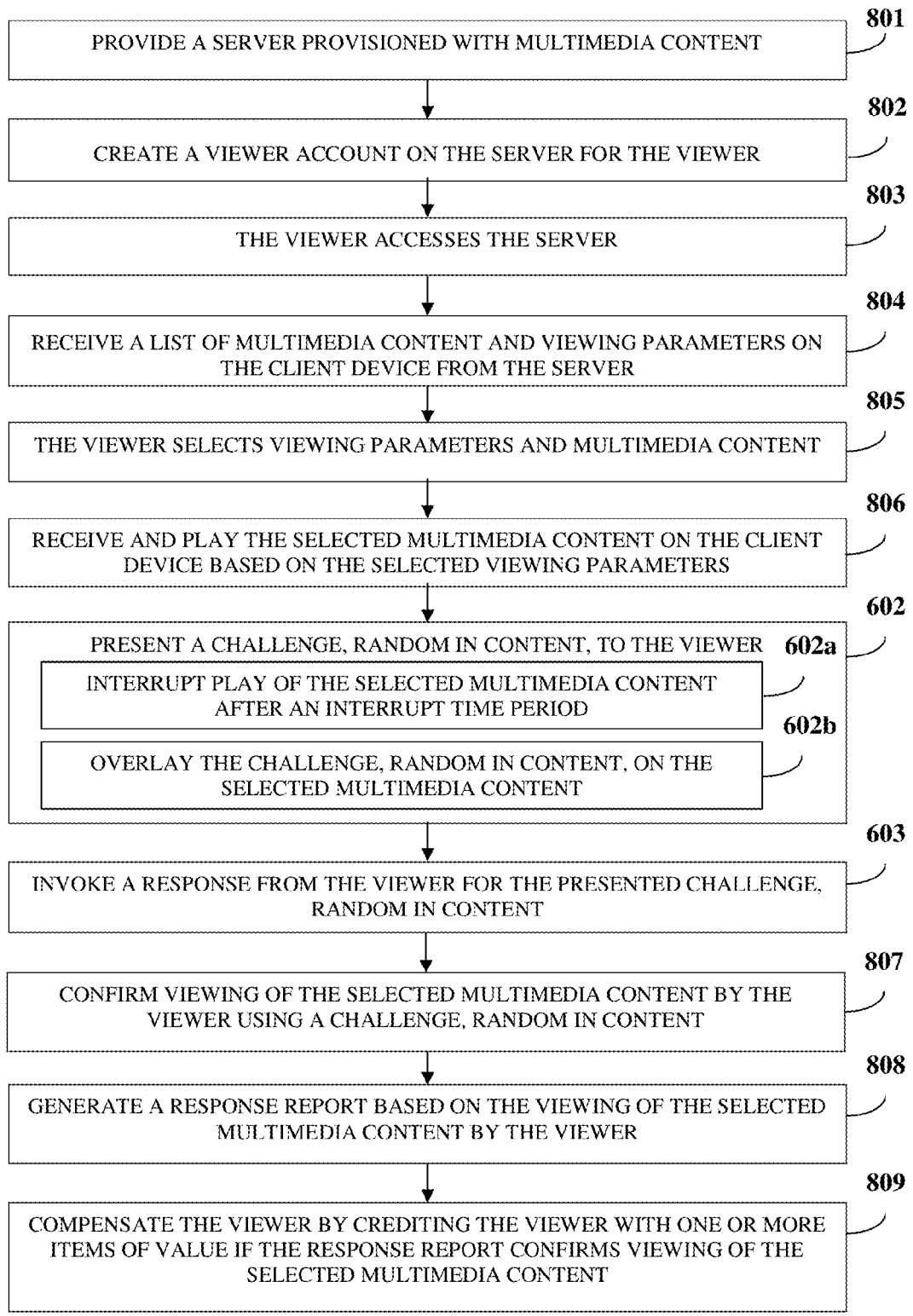
FIG. 8 illustrates a third embodiment of the computer implemented method for confirming that a viewer viewed multimedia content on a client device.
Figure 9:
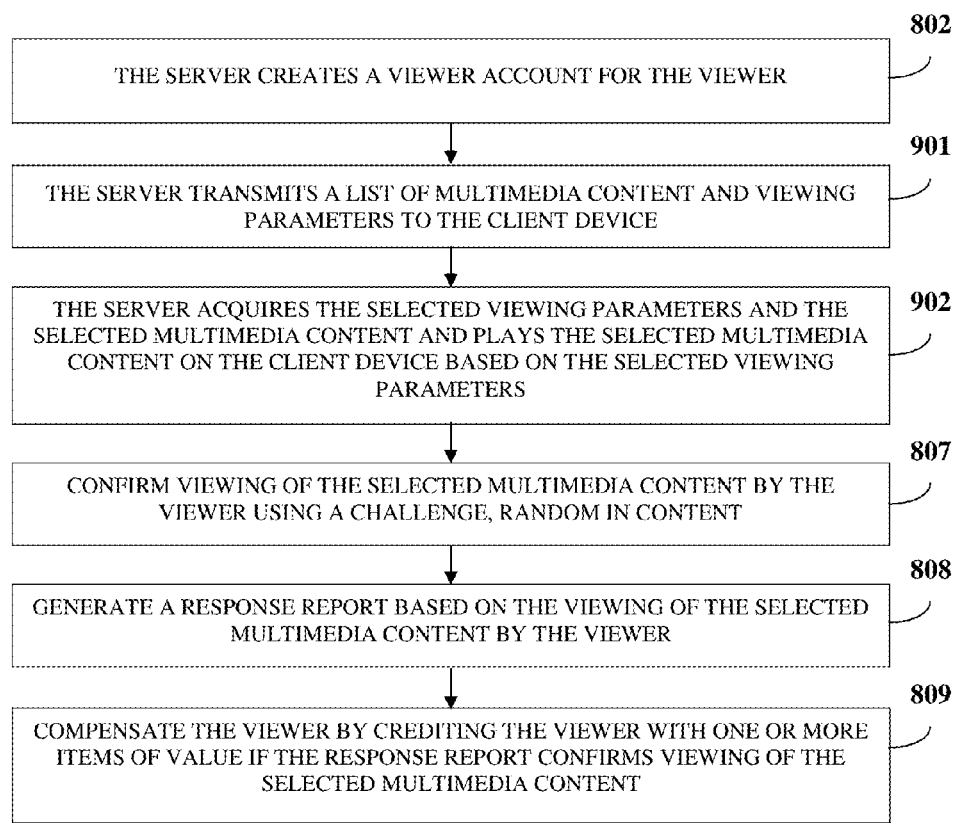
FIG. 9 illustrates the steps performed by a server for confirming that a viewer viewed multimedia content on a client device.

In an embodiment, the server 201 transmits a list of the targeted multimedia content and viewing parameters to a client device 1301 of each of the users in the user network 204 for selection as disclosed in the detailed description of FIGS. 8-9. The users can select one or more of the viewing parameters, for example, a schedule, an order of playing the targeted multimedia content selected by each of the users, etc. The server 201 acquires selections of one or more of the viewing parameters and one or more of the targeted multimedia content from the list of targeted multimedia content from the users. The client device 1301 of each of the users receives and plays the selected multimedia content based on the selected viewing parameters.

In another embodiment, the server 201 makes available the acquired marketing data of the users in the user network 204 to entities outside of the advertiser network 202 created by the server 201. The server 201 discloses the compiled marketing data and targeting information acquired from each of the users in the created user network 204 to the entities, for example, web advertisers and other third party websites for targeting the multimedia content to the users in the user network 204. In this embodiment, the multimedia content is targeted to the users in the user network 204 by the third party websites instead of the server 201. Furthermore, the exposed marketing data can be utilized for targeting other multimedia content that is external to the multimedia content of the server 201.

In an embodiment, the server 201 enables the users in the user network 204 to rate the targeted multimedia content for relevancy of the targeted multimedia content to the corresponding dynamic user profiles. The server 201 dynamically updates the targeting criteria based on the ratings provided by the users in the user network 204. In an example, the server 201 targets a user with an advertisement for a tablet computer such as iPad® of Apple Inc. The server 201 then presents a post advertisement survey to the user for rating the targeted advertisement for relevancy of the advertisement to the user. The server 201 stores the user's response to questions in the post advertisement survey in the information database 201w. The server 201 updates the user's dynamic user profile based on the response of the user to the questions in the post advertisement survey for enhancing future targeting of advertisements to the user. For example, if the user responds positively to the iPad® advertisement in the post advertisement survey, the server 201 targets advertisements related to consumer electronics with a high frequency to that user.

A view confirmation module 1301b disposed in the server 201 and/or the client device 1301 confirms 106 whether the users in the user network 204 viewed the targeted multimedia content on one or more of the server 201 and across the publisher websites 203 in the networked environment 200, for example, using a challenge, random in content. The challenge, random in content, is, for example, one or more of unrelated to the targeted multimedia content, presented at random times during and/or after play of the targeted multimedia content, and presented at random physical locations on the targeted multimedia content. The user is presented with a challenge, random in content, from the server 201 via the publisher websites 203, the external websites, etc. In an embodiment, the view confirmation module 1301b confirms whether the users in the user network 204 viewed the targeted multimedia content on the server 201 and/or across the publisher websites 203 in the networked environment 200 by presenting the challenge, random in content, to the users by overlaying the challenge, random in content, on the targeted multimedia content, or by interrupting the play of the targeted multimedia content after an interrupt time period. The view confirmation module 1301b then invokes a response from each of the users for the presented challenge, random in content, where the response determines whether each of the users have viewed the targeted multimedia content. The view confirmation module 1301b interprets the response as a correct response or an incorrect response. The correct response corresponds to confirming viewing of the multimedia content by the user. The incorrect response from the user causes the view confirmation module 1301b to repeat the presentation of the multimedia content by presenting a new challenge, random in content and unrelated to the multimedia content, to the user. In another embodiment, the view confirmation module 1301b generates the challenge, random in content, in real time, by integrating a challenge stream and a stream of the targeted multimedia content in real time as disclosed in the detailed description of FIGS. 10-11.

The server 201 and/or the publisher websites 203 compensate 107 the users in the user network 204 by crediting the users in the user network 204 with one or more items of value based on the confirmation of the viewing of the targeted multimedia content. The items of value comprise, for example, one or more of points, points redeemable for cash, points redeemable for additional items of value, scores, scores redeemable for cash, scores redeemable for additional items of value, cash, discounts, access to premium multimedia content, units of virtual currency, cash payment, bill credit, coupons, special discounts on products or services, access to desired multimedia content from the server 201, and any combination thereof.

In an embodiment, the server 201 routes one or more items of value to predetermined organizations, for example, charitable organizations, non-profit organizations, etc., specified by the users via the communication link 1302. The server 201 routes a percentage of the compensation as specified by the users in the user network 204 to one or more non-profit organizations. For example, the server 201 routes the compensation accumulated by the user in the user network 204 to benefit non-profit organizations, for example, charity organizations such as United Way of America®, local church groups, food banks, etc. In another embodiment, the server 201 enables the users to redeem the items of value across the server 201, the advertiser network 202, or external websites in the networked environment 200.

In another embodiment, the server 201 provides a percentage of the purchases made by the user in the user network 204 using the items of value to the predetermined organizations, for example, charity organizations. In another embodiment, the server 201 recruits users into the user network 204 and automatically allocates the compensation earned by the users, for example, to a specific cause. For example, the server 201 associated with a company recruits local parents to purchase school supplies with the company's store and donates a percentage of the revenue directly to specific schools and/or charity organizations. The compensation of the user in the user network 204 can therefore be of direct benefit to the user or the direct benefit of the predetermined organization.

In an embodiment, the server 201 debits a fee from, for example, the advertisers and the publisher websites 203 for compensating the users in the user network 204. For example, the advertisers pay an advertising fee during registration with the advertiser network 202. A part of the advertising fee funds the compensation to be provided to the users for viewing the multimedia content, a part compensates the publisher websites 203, and the remainder is profit for the server 201 hosting the advertiser network 202. In an example, an advertiser belonging to the advertiser network 202 specifies the targeting criteria for users that the advertiser wants to target. The server 201 applies the targeting criteria to the users in the user network 204 as the users enter various publisher websites 203 and targets the multimedia content to the users in the user network 204. The server 201 compensates the users in the user network 204 after confirming viewing of the targeted multimedia content by the users, compensates the publisher websites 203 for sourcing the multimedia content from the server 201 to the users in the user network 204, and retains the remaining fees.

Based on the users' responses to surveys and other targeting methodologies disclosed in the co-pending application Ser. No. 12/844,177 titled "Targeting Multimedia Content Based On Authenticity Of Marketing Data", the user is shown a targeted video advertisement with the challenge-response mechanism. The user is rewarded, for example, with virtual currency that can be used at the server 201, the publisher websites 203, other network websites, etc.

In another embodiment, the server 201 integrates one or more social networking platforms with the server 201 via the communication link 1302 for targeting the multimedia content to the users in the user network 204 via the social networking platforms. In this embodiment, the server 201 exposes the acquired marketing data to the social networking platforms, for example, facebook.com of Facebook® Inc., Twitter.com of Twitter® Inc., to target multimedia content to the users in the user network 204. The marketing data is used to recommend, for example, groups, friends or brands to the users of the social networking platforms and to recruit more users into the created user network 204.

The acquired marketing data, the monitored activities of the users in the user network 204 across the publisher websites 203 in the networked environment 200, interactions of the users in the user network 204 with the publisher websites 203, and the compensation earned by the users in the user network 204 travel with the users in the user network 204 as the users in the user network 204 interact with other publisher websites 203, the external websites, and the third party advertiser networks 205. Furthermore, the users in the user network 204 view targeted multimedia content within the publisher websites 203, the external websites, and the third party advertiser networks 205. The users in the user network 204 view the targeted multimedia content sourced from the server 201. In an embodiment, the publisher websites 203 host, for example, an iframe interface or a banner for the advertisers belonging to the advertiser network 202. In this embodiment, the users in the user network 204 are targeted with a much richer set of targeted multimedia content, for example, relevant advertisements than is possible through a single website. The users are also part of a larger user network 204. Furthermore, the server 201 provides a list of member websites 203a to the users in the user network 204, thus driving traffic to the member websites 203a of the advertiser network 202. The computer implemented method and system disclosed herein therefore guarantees viewership of the multimedia content targeted across the publisher websites 203, the external websites, and the third party advertiser networks 205 in the networked environment 200.

FIG. 2 exemplarily illustrates communication between the server 201, an advertiser network 202, publisher websites 203, and a user network 204 in a networked environment 200 according to the computer implemented method disclosed herein. The server 201 creates the advertiser network 202 comprising multiple advertisers and member websites 203a as disclosed in the detailed description of FIG. 1. The server 201 further creates the user network 204 comprising users that are registered with the server 201 or recruited from the publisher websites 203 as disclosed in the detailed description of FIG. 1. The publisher websites 203 comprising the member websites 203a and the non-member websites 203b that participate via third party advertiser networks 205, source the multimedia content submitted by the advertisers from the server 201. The publisher websites 203 then make available the multimedia content to the users in the user network 204 in the networked environment 200.

Figure 3:
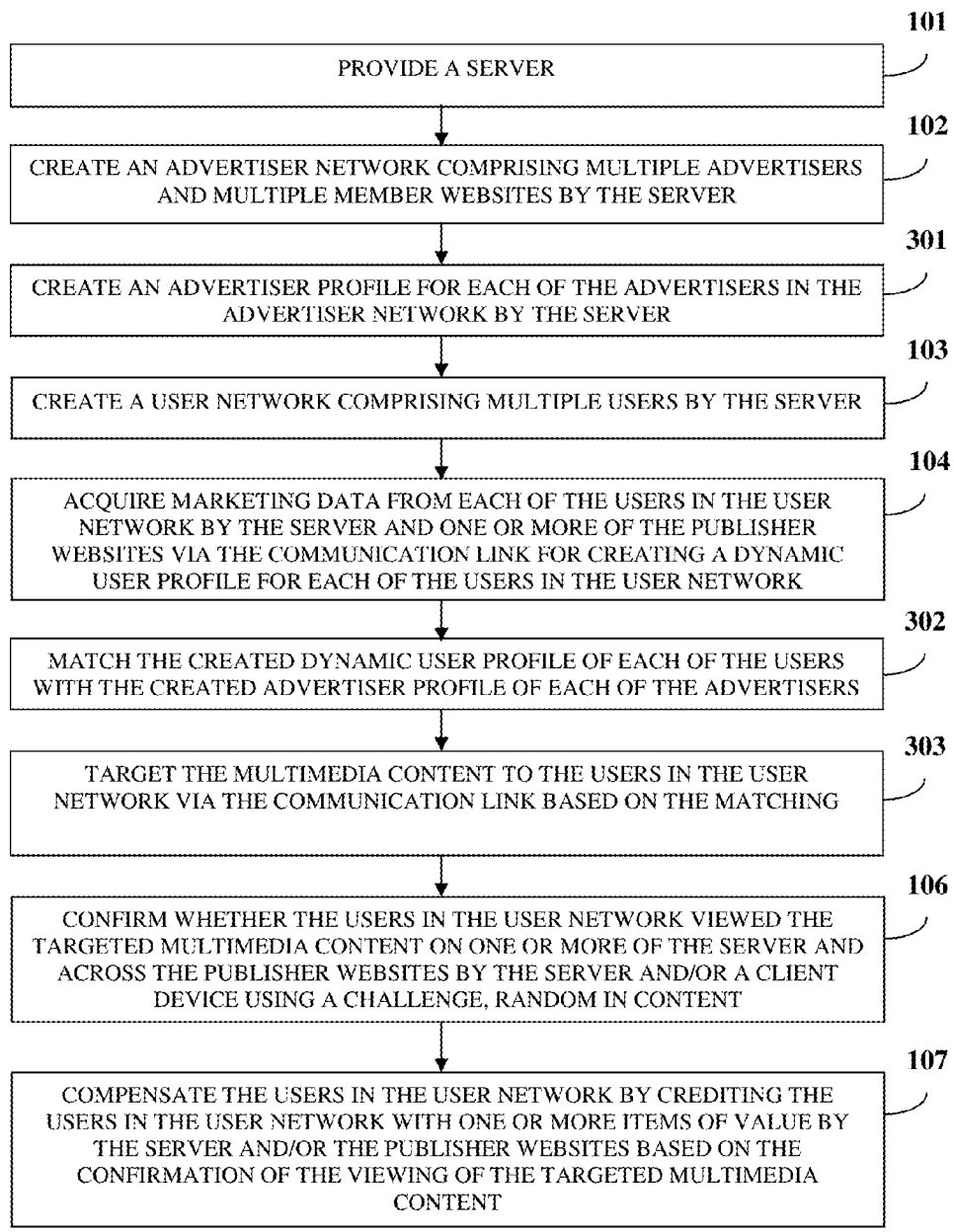
FIG. 3 illustrates an embodiment of the computer implemented method for dynamically profiling users for incentivized targeting of multimedia content to the users in the networked environment.

FIG. 3 illustrates an embodiment of the computer implemented method for dynamically profiling users for incentivized targeting of multimedia content to the users in the networked environment 200. The computer implemented method disclosed herein provides 101 the server 201 and creates 102 the advertiser network 202 as disclosed in the detailed description of FIG. 1. The server 201 creates 301 an advertiser profile for each of the advertisers in the advertiser network 202 based the multimedia content, advertising information, and targeting criteria submitted to the server 201 by each of the advertisers via the communication link 1302. The server 201 further creates 103 a user network 204 and acquires 104 marketing data from each of the users in the user network 204 for creating a dynamic user profile for each of the users in the user network 204 as disclosed in the detailed description of FIG. 1. The server 201 matches 302 the created dynamic user profile of each of the users with the created advertiser profile of each of the advertisers. The server 201 transmits a notification to each of the matched users, for example, via electronic mail, a short message service (SMS) message, a social network, etc., to inform them that their dynamic user profiles matched with one or more advertiser profiles. The server 201 targets 303 the multimedia content to the users in the user network 204 via the communication link 1302 based on the matching of the created dynamic user profile of each of the users with the created advertiser profile of each of the advertisers.

In an embodiment, the server 201 generates a ranking score for each match of the created dynamic user profile with the created advertiser profile found during the matching of the created dynamic user profile of each of the users with the created advertiser profile of each of the advertisers. The multimedia content is targeted to one or more users based on the ranking score. In an example, the server 201 extracts keywords from a created dynamic user profile and the created advertiser profiles of multiple advertisers. The server 201 then matches the keywords extracted from the dynamic user profile with the keywords extracted from the advertiser profiles. The server 201 generates the ranking score, for example, based on the number of keywords matched between the created dynamic user profile and the created advertiser profiles of multiple advertisers. For example, the server 201 generates a high ranking score for an advertiser whose advertiser profile has a large number of keywords matching with the keywords extracted from the created dynamic user profile. The server 201 then targets multimedia content submitted by the advertiser having the high ranking score to the user with the matching dynamic user profile.

Consider an example where the server 201 extracts the keywords—male, sports, football, hockey, and country music from a dynamic user profile of user A. The server 201 extracts the keywords—female, fashion, green, romantic comedy movies, and electronics from a dynamic user profile of user B. Also, in this example, server 201 extracts the keywords—male or female, fashion, and green from an advertiser profile of advertiser C and the keywords—male and country music from the advertiser profile of advertiser D. The server 201, with respect to user A, generates a higher ranking score for advertiser D, and with respect to user B, generates a higher ranking score for advertiser C. Therefore, the server 201 targets the multimedia content of advertiser D to user A and the multimedia content of advertiser C to user B.

In an embodiment, the server 201 facilitates bidding among the advertisers in the advertiser network 202 for targeting the multimedia content of one of the advertisers to one or more of the users in the user network 204. For example, the server 201 initiates bidding between the advertisers who advertise products and/or services, for example, of the same category and who have the same ranking score for a particular user. The server 201 notifies the advertisers about the equal ranking score. If two or more of the advertisers with the same ranking score wish to target the multimedia content to a user, the server 201 provides an option to bid for targeting of their respective multimedia content to the user. The server 201 then allows the advertiser with the highest bid to target the multimedia content to the user.

The server 201 therefore allows advertisers to bid for their multimedia content to be presented to specific targeted demographics. Consider an example where a user Joe enters a member website 203a. Joe registers with the server 201 and fills out a quick 20 question survey on his buying habits and general interests. The survey indicates that Joe likes the latest electronic gear and is a high income consumer. Joes lives in a big city and does not own or need a car. With this information in his dynamic user profile, advertisers such as Bestbuy.com® of Best Buy Concepts, Inc. and Samsung Corporation that provide large screen liquid crystal display (LCD) televisions may bid for Joe to see their advertisements. Clearly, car manufacturers would not be interested in Joe. The server 201 facilitates bidding among the Bestbuy.com® and Samsung Corporation for targeting the multimedia content of Bestbuy.com® or Samsung Corporation to Joe. Assuming, Samsung® registers with the server 201 and joins the advertiser network 202 and provides the highest bid to send Joe an advertisement, the server 201 sends Joe based on his choice an email, an SMS message, or a Facebook alert telling him that he has an advertisement match selected for him. Joe can then open the alert and view the advertisement by Samsung® on his client device 1301. If Joe thinks the advertisement is well targeted at his interests, he will rate the advertisement highly, if not, he will rate the advertisement low. The server 201 charges the confirmed view to the Samsung advertisement account.

In an embodiment, the server 201 enables the advertisers to place fixed bids or real time bids for targeting the multimedia content to one or more users. Real time bidding is a method of bidding that allows online display advertisements to be purchased and served in real time. If two advertisers are bidding to target multimedia content to a user with a dynamic user profile comprising the keywords—male, trucks, and blue collar, the server 201 targets the multimedia content from the advertiser with the higher bid to the user first. The server 201 thus gives higher priority to the advertiser with the highest bid. The server 201 then notifies the advertiser with the lower bid for conveying that the bid is not sufficient to serve the advertiser's multimedia content to the user. The server 201 provides the advertiser with the lower bid an opportunity to increase the bid, thus creating an auction for targeting the multimedia content to any specific user in the user network 204.

Consider an example where advertiser A who advertises P phones and advertiser B who advertises Q phones have the same ranking score based on matching the advertiser profiles of advertiser A and advertiser B with the dynamic user profile of user C. If both the advertisers wish to target the multimedia content to user C, the server 201 initiates bidding between advertiser A and advertiser B. The server 201 acquires a first bid of, for example, $100 from advertiser A and $120 from advertiser B for targeting the multimedia content to user C. The server 201 communicates the bid placed by advertiser B to advertiser A. The server 201 requests advertiser A to place a second bid. For example, advertiser A now bids $150 for targeting the multimedia content to user C. The server 201 communicates the second bid placed by advertiser A to advertiser B. If advertiser B opts not bid any further, the server 201 enables advertiser A to target multimedia content of P phones to user C.

The targeted multimedia content is received and played on the client devices 1301 of the users in the user network 204. The server 201 and/or the client device 1301 confirm 106 whether the users viewed the multimedia content on the server 201 or across the publisher websites 203 in the networked environment 200 and compensates 107 the users in the user network 204 on confirming that the users viewed the multimedia content as disclosed in the detailed description of FIG. 1. In an embodiment, the server 201 enables the users to rate a degree of matching of the targeted multimedia content with the users' preferences for assessing effectiveness of the matching. The users' preferences are indicated, for example, in the acquired marketing data. In an example, a user can rate a targeted advertisement on a scale of 1 to 10, where a rating of "1" indicates that the targeted advertisement is irrelevant to the user and a rating of "10" indicates that the targeted multimedia content matches the user's preferences.

Consider an example where a user indicates specific products and/or services that the user wishes to be alerted in the future via the marketing data acquired by the server 201. The server 201 creates a dynamic user profile for the user which indicates that the user is interested in the specified products and/or services. The server 201 matches the dynamic user profile with the advertiser profile of each of the advertisers in the advertiser network 202. When the server 201 finds a match, that is, when the server 201 finds an advertiser profile advertising the products and/or services specified by the user, the server 201 alerts the user by transmitting the multimedia content related to the specified products and/or service, for example, via an electronic mail (email), a short message service (SMS), a Facebook® message, etc., or when the user visits a member website 203a or a non-member website 203b that is served by a participating third party advertiser network 205.

Consider another example where a user wishes to purchase a printer. The user provides the marketing data to the server 201 during registration with the server 201. The user, via the acquired marketing data indicates preferences for a printer model 4500 and wishes to be proactively alerted about the printer model 4500. In this example, an advertiser Best Buy for electronics products is advertising the printer model 4500. The server 201 alerts the user, for example, via email that Best Buy is advertising the printer model 4500. Moreover, when the user visits a member website 203a, the server 201 targets the advertisement of the printer model 4500 to the user. The user views the advertisement, proceeds with providing a response to the challenge, random in content, and has the opportunity to receive items of value for purchasing the printer model 4500.

Consider another example where an advertiser wishes to target the multimedia content to a user. In this example, the advertiser is a car manufacturer and the multimedia content is an advertisement of a sports car. The advertiser registers with the server 201 and joins the advertiser network 202 after paying the advertiser fee. The advertiser submits the advertisement of the sports car, information of the sports car, and targeting criteria of the target user to the server 201. For example, the advertiser specifies target users aged between 20 years to 40 years in the targeting criteria. The server 201 makes available the advertisement across multiple publisher websites 203, for example, car review websites, gadget websites, technology websites, etc., that are also member websites 203a of the advertiser network 202.

The server 201 creates the user network 204 comprising multiple users. The server 201 dynamically profiles the users in the user network 204 through a series of marketing questions during registration of the users with the server 201, by monitoring activities and detecting interactions of the users across the advertiser network 202, external websites, third party advertiser networks 205, etc., for acquiring marketing data from the users in the user network 204. If the server 201 detects a user on any of the member websites 203a, the publisher websites 203, etc., the server 201 targets the advertisement to the users profiled as aged between 20 years and 40 years.

When the server 201 detects a user Ted profiled as aged between 20 years and 40 years, on a publisher website 203, for example, a car review website, the server 201 targets the advertisement of the sports car to Ted. The server 201 then confirms whether Ted has viewed the advertisement using a challenge, random in content. In this example, the challenge, random in content, where Ted has to identify the new features of the sports car, is presented to Ted after play of the advertisement. The server 201 compensates Ted for a correct response to the challenge, random in content, for example, in the form of a discount on the sports car.

Figure 4:
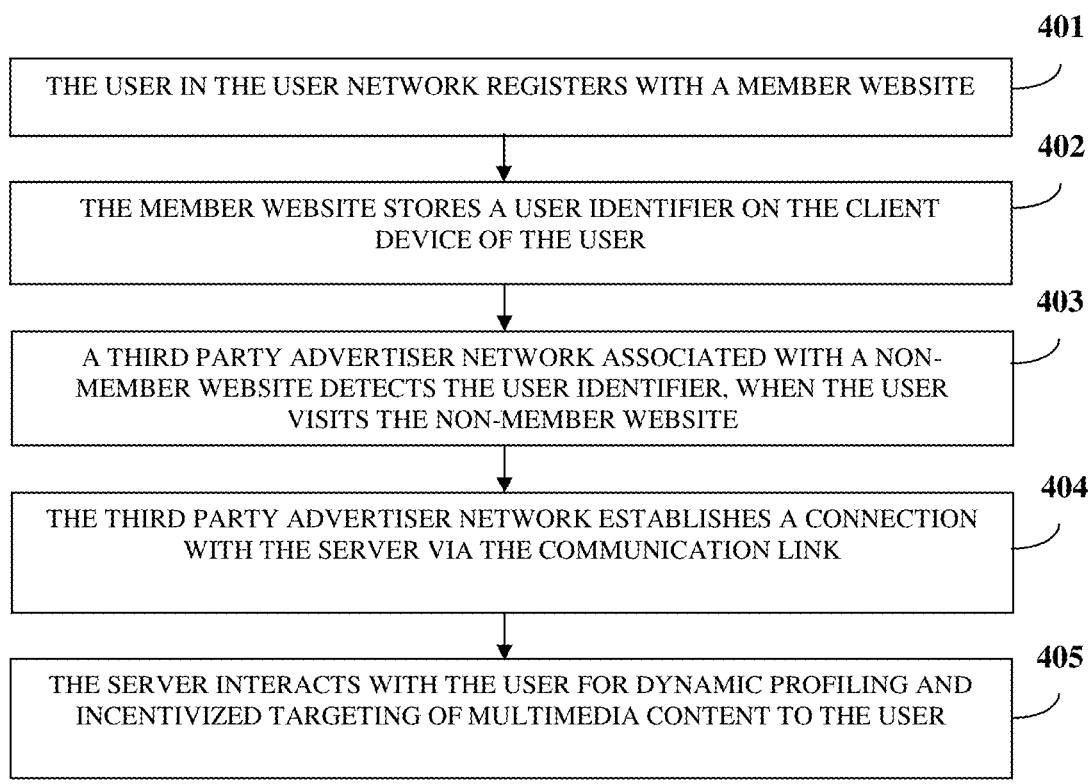
FIG. 4 exemplarily illustrates a flow diagram comprising the steps for dynamically profiling a user for incentivized targeting of multimedia content to the user via a non-member website.

FIG. 4 exemplarily illustrates a flow diagram comprising the steps for dynamically profiling a user for incentivized targeting of multimedia content to the user via a non-member website 203b. In an embodiment, the server 201 associates the non-member websites 203b with the server 201 via the member websites 203a of the advertiser network 202 using user identifiers, for example, cookies associated with the users in the user network 204. When a user in the user network 204 registers with a non-member website 203b, the server 201 detects the non-member website 203b where the user is currently browsing and registers the non-member website 203b to the advertiser network 202, thereby converting the non-member website 203b to a member website 203a of the advertiser network 202. The server 201 detects interactions of the users of the user network 204 in the networked environment 200 and expands the created advertiser network 202 by registering the non-member websites 203b into the advertiser network 202.

The server 201 registers a user with the user network 204 when the user registers 401 with a member website 203a of the advertiser network 202. When the user visits the member website 203a, the member website 203a stores 402 a user identifier, for example, a cookie on the user's client device 1301 exemplarily illustrated in FIG. 13. When the user visits or accesses a non-member website 203b that uses a participating third party advertiser network 205, the third party advertiser network 205 associated with the server 201 and the non-member website 203b detects 403 the user identifier and associates the user with the user network 204 created by the server 201. The third party advertiser network 205 establishes 404 a connection with the server 201 and transmits the user identifier associated with the user to the server 201. In this manner, the third party advertiser network 205 connects the non-member website 203b to the server 201. The server 201 then interacts 405 with the user on the non-member website 203b for dynamic profiling and incentivized targeting of multimedia content to the user. The server 201 can therefore target the multimedia content to a user in the user network 204 who accesses a non-member website 203b via the third party advertiser networks 205.

The server 201 detects one or more of the users in the user network 204 on a non-member website 203b via a third party advertiser network 205. When the users register with the non-member website 203b, the server 201 may register the non-member websites 203b with the advertiser network 202 for converting the non-member websites 203b into a member website 203a of the advertiser network 202. In an embodiment, the server 201 detects interactions of the users in the user network 204 in the networked environment 200 and expands the created advertiser network 202 by registering the non-member websites 203b into the advertiser network 202.

Consider an example of a user Roger who is a thirty five year old male, lives in New York and likes electronics. Roger is on a member website 203a for an electronic superstore such as Bestbuy.com® of Best Buy Concepts, Inc., and views a banner advertisement that has a tagline such as "View Ads, earn Best Buy points!" Roger clicks on the banner advertisement and is transferred to a microsite that enables him to register a username, password, address, age, etc. Roger then proceeds to answer a couple of profiling questions and is targeted a video advertisement for the new Apple iMac® of Apple Inc. Roger answers the challenge response question(s) correctly and is compensated with items of value, for example, eight reward points. Roger can keep the points in an account created on the server 201 or apply them to a specific Bestbuy loyalty program. When Roger returns to the Bestbuy.com® website, the advertiser network 202 created by the server 201 recognizes Roger as a return visitor. The banner advertisement now reads "Welcome back Roger, you have X videos waiting for you!" Roger clicks the banner advertisement and proceeds with a new video advertising session to obtain reward points at the end of the video advertising session. The server 201 can limit the number of reward eligible visits within a specific time period.

In another example, Roger enters a new website such as a website for home improvements, homedepot.com of Home Depot® U.S.A. Inc., for the first time as a user in the user network 204 created by the server 201. Since Roger has a cookie on his personal computer that identifies him as the user in the user network 204, a banner advertisement on the homedepot.com website reads "Welcome Roger, we have X videos waiting for you to claim your rewards!" Roger is pleased to see a reward opportunity on the homedepot.com website and clicks on the banner advertisement. Roger receives profiling questions and then is targeted a video advertisement based on his complete profile. His complete profile is the combination of his original registration information, and the total of all of his profiling information from each member website 203a that he has visited. At the successful completion of his video advertisement session, Roger is compensated with twelve reward points based on the correctness of the responses provided by Roger to the challenges, random in content, provided by the server 201 or generates on Roger's client device 1301. Roger can deposit the reward points in his Home Depot Account or save them for later use elsewhere.

Figure 5:
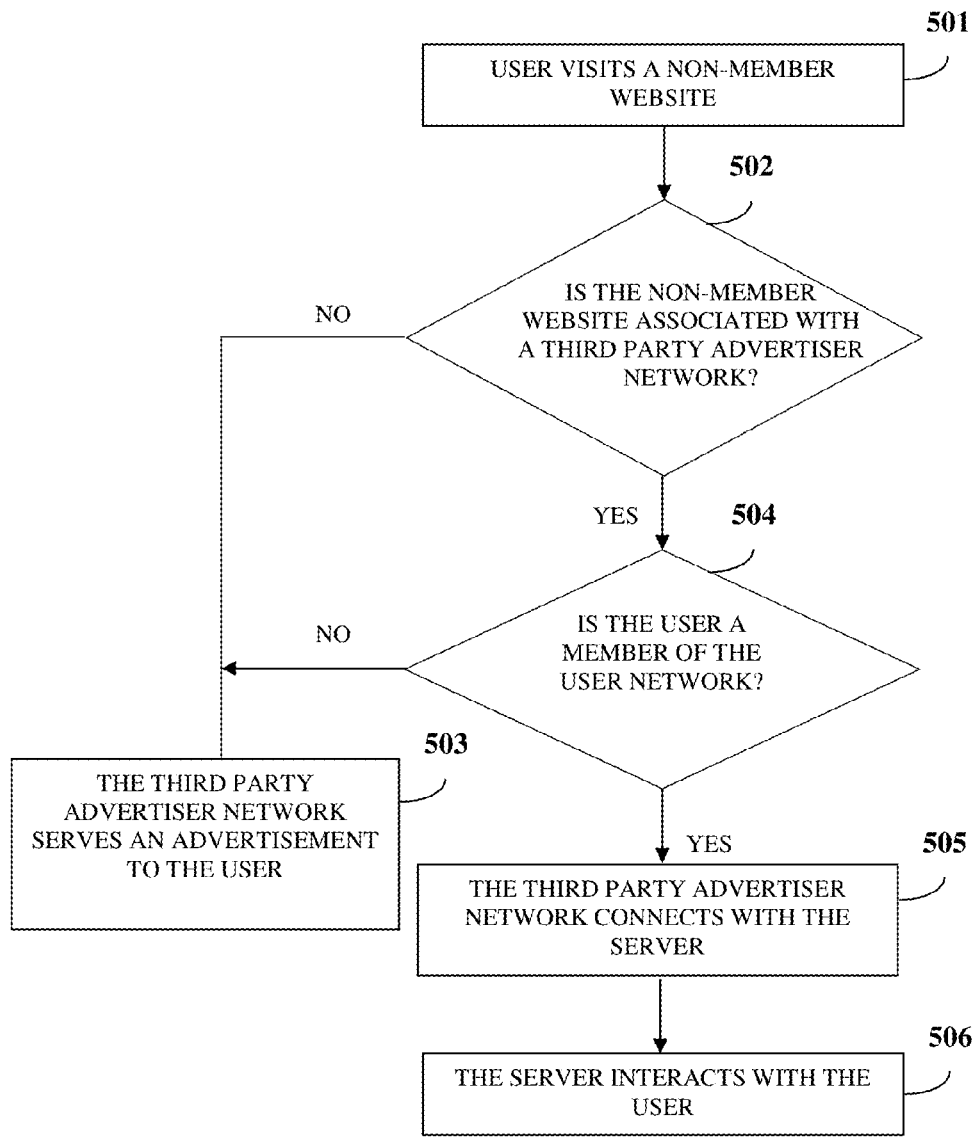
FIG. 5 exemplarily illustrates a flowchart comprising the steps for incentivized targeting of multimedia content to a user according to the computer implemented method disclosed herein.

FIG. 5 exemplarily illustrates a flowchart comprising the steps for incentivized targeting of multimedia content to a user according to the computer implemented method disclosed herein. Consider an example where a user visits 501a non-member website 203b, where the non-member website 203b is associated with a participating third party advertiser network 205 as exemplarily illustrated in FIG. 2. The server 201 checks 502 whether the non-member website 203b is associated with a participating third party advertiser network 205. If the non-member website 203b is not associated with a participating third party advertiser network 205, that is, if the third party advertiser network associated with the non-member website 203b does not have any relationship with the server 201, the third party advertiser network directly serves 503 an advertisement to the user. If the non-member web site 203b is associated with a participating third party advertiser network 205, the server 201 checks 504 whether the user is a member of the user network 204. If the third party advertiser network 205 that serves the non-member website 203b is a participating third party advertiser network 205 and if the user is not a member of the user network 204, the third party advertiser network 205 directly serves 503 an advertisement to the user. If the third party advertiser network 205 that serves the non-member website 203b is a participating third party advertiser network 205 and if the user is a member of the user network 204, the third party advertiser network 205 connects 505 with the server 201 via the communication link 1302. The server 201 then interacts 506 with the user via the communication link 1302, targets multimedia content to the user, confirms viewing of the multimedia content, and compensates the user with items of value based on the confirmation of viewing of the multimedia content.

Figure 6:
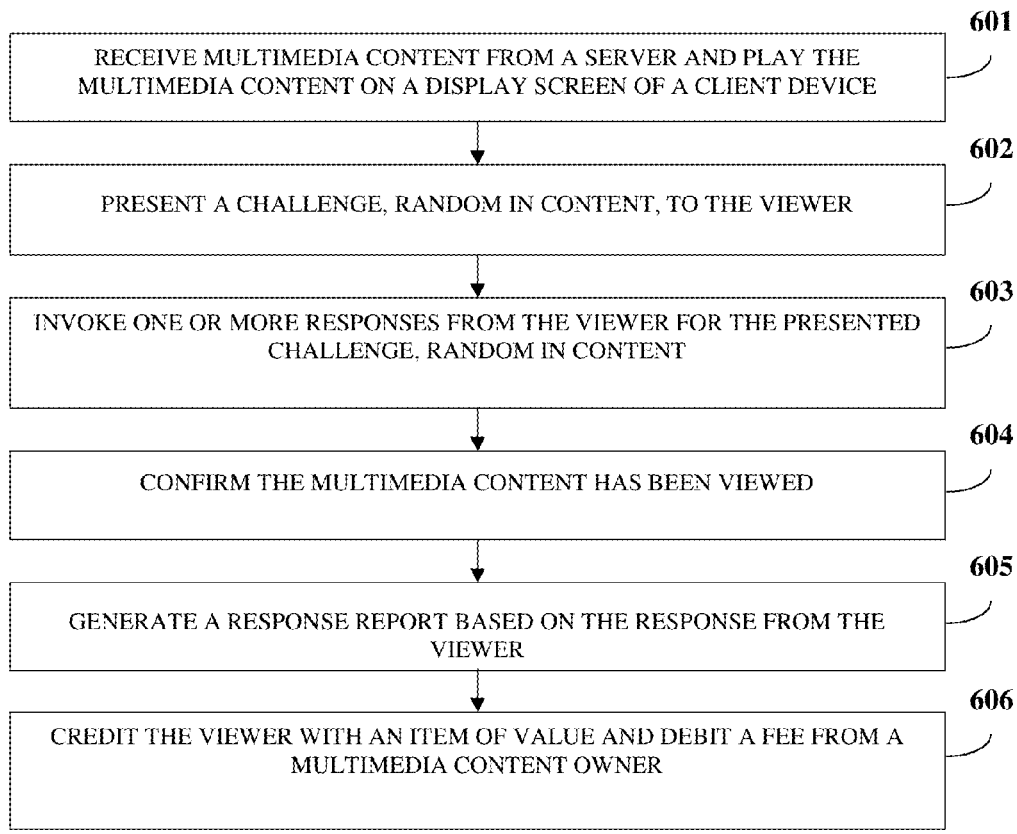
FIG. 6 illustrates a first embodiment of a computer implemented method for confirming that a viewer viewed multimedia content on a client device.

FIG. 6 illustrates a first embodiment of a computer implemented method for confirming that a viewer viewed multimedia content on a client device 1301 exemplarily illustrated in FIG. 13. The multimedia content for viewing is, for example, available as streaming content or downloaded content and comprises content on demand. In an embodiment, the multimedia content is provided from a predetermined list compiled from a media database 201d of the server 201 driven by the preselected preferences of the viewer. As used herein, the term "viewer" refers to any user within or external to the user network 204, who accesses the server 201 using a client device 1301 for registration and for viewing of multimedia content. The computer implemented method and system 1300 disclosed herein is used for promoting the viewing of multimedia content, for example, an advertisement clip of a product by providing an incentive to the viewer to view the multimedia content. The computer implemented system 1300 disclosed herein is exemplarily illustrated in FIG. 13. The computer implemented method and system 1300 can be used, in general, for confirming that the viewer has viewed the multimedia content that is commercial, educational, and entertaining in nature.

In the computer implemented method disclosed herein, viewing of the multimedia content is confirmed using a challenge-response mechanism that requires active input actions from the viewer. The challenge-response is incorporated within the multimedia content available for consumption by the viewer on a client device 1301 capable of connecting to a communication link 1302 and capable of rendering multimedia content formats.

The client device 1301 possessed by the viewer is capable of establishing a client-server relationship with the server 201 via the communication link 1302 as exemplarily illustrated in FIG. 13. The client device 1301 may also download a client software module, for example, a view confirmation module 1301b over the communication link 1302 for making service requests to the server 201, while the server 201 addresses the service requests. The communication link 1302 is, for example, a cellular communication network 1303, the internet, a local area network, or any other network established using available networking protocols.

A multimedia content owner, for example, an advertiser, uploads multimedia content, for example, an advertisement, a commercial message, an educational clip, an entertainment clip, etc., on the server 201 of a media service provider. As used herein, "multimedia content owner" refers to an entity that generates multimedia content. Also, as used herein, "media service provider" refers to a service entity that provides the service of confirming that a viewer has viewed multimedia content uploaded or referenced by the multimedia content owner on the server 201. The client device 1301 of the viewer receives 601 the multimedia content from the server 201 and plays the multimedia content on a display screen 1301a of the client device 1301, for example, in an audiovisual format. A challenge, random in content, is presented 602 to the viewer by overlaying the challenge, random in content, on the multimedia content. The challenge, random in content, comprises, for example, one or more of a random number, a random icon, a random shape, a product logo, a service logo, a random color, a random mathematical equation, and a random target on the display screen 1301a of the client device 1301 for the viewer to interact therewith using touch or a pointing device. The challenge, random in content, is overlaid at different positions on the multimedia content. The challenge, random in content, is overlaid using technologies, for example, hypertext markup language (HTML5), Adobe® Flash or other video creation standards. The streams comprising the challenge, random in content, and the multimedia content are integrated at either the server 201 or combined at a web browser on the client device 1301 of the viewer. The challenge, random in content, and the multimedia content may arrive at the client device 1301 of the viewer as a single integrated stream or as two independent streams that are combined in real time at the client device 1301.

The content of the challenge, random in content, is, for example, numbers, letters, shapes, phrases, etc., from a predefined set. The challenge, random in content, is one or more of random in content, presented at random times during and/or after the play of the multimedia content, and presented at random physical locations on the multimedia content. In an embodiment, the challenge, random in content, content is unrelated to the multimedia content. In another embodiment, the multimedia content is transmitted independently of the challenge, random in content, that is, a multimedia content file may not be accompanied by a particular challenge, random in content. In this case, the challenge, random in content, may be randomly selected from a set of challenge, random in content, files and then overlaid on the multimedia content. Moreover, the same challenge, random in content, can be reused with different multimedia content files. Furthermore, the challenge, random in content, and the multimedia content may be interchangeably used with other multimedia content and challenges, random in content, respectively.

In an embodiment, the challenge is a pseudorandom challenge. A pseudorandom challenge, involves the random selection of a limited set of challenge icons from a fixed data set, displayed at random times with certain defined boundaries, and at random physical placements within a display screen 1301a. For example, the pseudorandom challenge, involves a random selection of a number between 0 and 9; a random selection of a shape among, for example, a circle, a square, a triangle; a random selection of a letter within the alphabet, etc. Furthermore, the pseudorandom challenge comprises random placement of the randomly selected content, both in terms of time and space within the multimedia content. The pseudorandom placement of the challenge can define time boundaries. For example, a first challenge occurs between second "X" and second "Y" of the multimedia content selected for play, while a second challenge occurs within 10 seconds of the end of the play. The two-dimensional space defined by the display screen 1301a within which the challenge occurs can also be pseudorandom within fixed parameters. For example, the pseudorandom challenge appears in one of the four corners of the display screen 1301a, each time a pseudorandom challenge is displayed, at a pseudorandom time.

In an embodiment, the randomness of the challenge content for space is implemented as follows. The placement of the challenge is made random by overlaying the challenge content at different locations in or around the multimedia content. The purpose of randomizing the placement of the challenge content is to prevent, for example, "ad blindness". "Ad blindness" as used herein results when the viewer focuses on a single physical spot within a multimedia player frame 2002 exemplarily illustrated in FIG. 20. As used herein, the multimedia player frame 2002 is a graphical output component of any media player application that plays the multimedia content in a defined region within the display screen 1301a of the client device 1301 as exemplarily illustrated in FIG. 13. The challenge, random in content, appears randomly on the multimedia player frame 2002 within the display screen 1301a of the client device 1301. In an example, a challenge icon flashes randomly within one of the four corners of the multimedia player frame 2002 when a video is played. The viewer is encouraged to watch the entire video and not focus solely on a single physical spot within the video, since the location of the challenge icon is random. This allows the viewer to more completely view the content of the video to absorb the content of the video being played amidst the challenge-response interaction.

Figure 20:
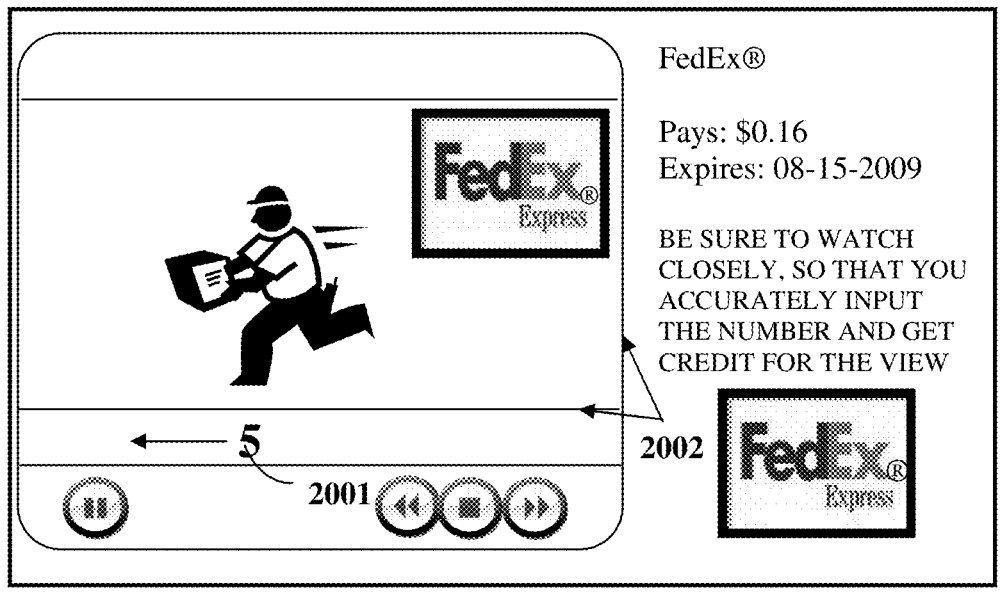
FIG. 20 exemplarily illustrates a screenshot for a scrolling challenge, random in content.

In another example, the challenge, random in content, appears immediately outside a boundary of the multimedia player frame 2002. The challenge icon, for example, scrolls in an upward direction or a downward direction on either side of the video immediately outside the boundary of the actual multimedia player frame 2002, or scrolls in a rightward direction or a leftward direction of the multimedia player frame 2002 in a region above or below the video, as exemplarily illustrated in FIG. 20. FIG. 20 exemplarily illustrates a screenshot for a scrolling challenge, random in content, icon, for example, the numeral "5" 2001 moving in a leftward direction below the video. The directions in which the challenge icon scrolls as well as the position of the challenge icon relative to the multimedia player frame 2002 are random. For example, the challenge icon scrolls vertically up or vertically down in a region immediately left of the multimedia player frame 2002. In another example, the challenge icon scrolls horizontally right or left in a region immediately above the multimedia player frame 2002. The viewer is therefore required to watch the entire multimedia player frame 2002 in order to respond to the challenge icon. In another embodiment, the challenge icon scrolls diagonally within the multimedia player frame 2002 from one corner to the other.

In another example, the challenge icon is randomly displayed at any location within the multimedia player frame 2002. Physical coordinates, for example, X and Y coordinates for display of the challenge icon within the multimedia player frame 2002 are randomly selected by a challenge generator 1301c of the view confirmation module 1301b. In this manner, the challenge icon can appear at a number of unique positions in the multimedia player frame 2002 depending on the possible combinations of the X and Y coordinates selected within the multimedia player frame 2002.

In an embodiment, the client device 1301 receives a list of multimedia content from the server 201 for selection by the viewer. The multimedia content selected by the viewer is rendered on the display screen 1301a of the client device 1301, and the duration of play of the selected multimedia content is determined. A challenge, random in content, may be randomly selected from a set of challenge, random in content, files stored in the media database 201*d* and then presented at one or more points in time by overlaying the challenge, random in content, on the selected multimedia content. For example, the challenge, random in content, is presented for N seconds, after L seconds elapse with an audio-video clip of duration M seconds, wherein L is less than M. The challenge, random in content, is presented at one or more times during and/or after the multimedia content is played. The challenge, random in content, changes for each multimedia content viewing.

One or more responses are invoked 603 from the viewer for the presented challenge, random in content. A response may be invoked from the viewer during or at the end of play of the multimedia content. The response entered by the viewer determines whether the viewer has viewed the multimedia content. The response is used for confirming 604 the viewing of the multimedia content. The viewer may enter a response to the challenge, random in content, during the play of the multimedia content, and optionally during and after the multimedia play, and optionally after the multimedia play. A response report is generated 605 based on the response from the viewer. The response report verifies the correctness of the response to the challenge, random in content, entered by the viewer and confirms viewing of the multimedia content. The generated response report is transmitted to the server 201 confirming that the multimedia content has been viewed by the viewer. In an embodiment, the response report is generated on the server 201.

In an embodiment, the presentation of the challenge, random in content, to the viewer is repeated if the response from the viewer for the presented challenge, random in content, is incorrect. The steps of rendering the viewer selected multimedia content, presenting a challenge, random in content, invoking a response, and generating a response report may be repeated for other multimedia content in the list depending on the selection of the viewer.

The challenge, random in content, is presented in different forms, for example, a visual overlay on the multimedia content, or a child window cascading with the content rendering window. For example, the challenge, random in content, is presented as a graphical user interface (GUI) widget. In another example, the challenge, random in content, is a short audio message introduced briefly into the visual-only media content. The randomness in the challenges is due to the randomness in visual elements presented in the challenges as well as the responses that the challenges elicit during or after the multimedia content is played. For example, the challenge, random in content, comprises one or more random numbers flashed at different points in time when a multimedia content is being played. The correct response in this example comprises reproduction of the random numbers by entering the random numbers into the client device 1301. The response is verified by comparing the numbers entered by the viewer with the numbers flashed in the multimedia content. The challenge, random in content, further comprises, for example, one or more random geometrical shapes presented at different points in time, a random mathematical equation, a random icon, a product logo or a service logo, a color, a target on a touch-sensitive screen that the viewer has to touch, a target that is pointed at by a pointing device, etc. In these examples, the correct response comprises a selection of an option representing the geometrical shapes from an options list, entering the result of the mathematical equation into the client device 1301, selection of an option representing an icon from an options list, selection of an option representing a product logo or a service logo from an options list, selection of an option representing a color from an option list, selection or interaction with the target on a touch-sensitive screen, etc., respectively.

In an embodiment, one or more challenges, random in content, are presented at one or more times or at different time periods or time intervals, during or after the multimedia content is played. For example, the first challenge is presented half way through the play of a multimedia clip and the second challenge is presented at the end of the multimedia clip. The viewer is requested to provide a response to the challenge, random in content, on the client device 1301 within a predetermined period of time, after the challenge, random in content, is presented. A response for a challenge, random in content, is deemed valid if the viewer provides the correct response within a response time-out period, after the challenge, random in content, is presented. A timer 1301*f* is provided to determine the time lapsed between the presentation of the challenge, random in content, and the submission of the response.

In an embodiment, the viewer is credited 606 with an item of value, for example, cash, if the response report confirms the multimedia content has been viewed by the viewer, while the multimedia content owner is debited a fee for the service provided to the multimedia content owner by the media service provider. Furthermore, the viewer is credited with an item of value if the response report verifies that the response to the challenge, random in content, entered by the viewer is correct. When the viewer's response to the challenge, random in content, is correct or partially correct where more than one challenge, random in content, is presented to the viewer, the correct response to the challenge, random in content, confirms that the multimedia content was viewed. In an embodiment, the viewer is optionally eligible for an item of value even when one or more responses entered by the viewer are incorrect. In an embodiment, where the number of challenges, random in content, presented is more than one, the viewer is eligible for an item of value for each correct response.

Compensating the multimedia content viewer with an item of value for a confirmed view provides an incentive to the viewer to view the entire multimedia content and respond to the challenge, random in content that is presented during or after the play of the multimedia content. For example, offering an incentive to answer the challenge, random in content, presented within an advertisement clip generates interest in a potential buyer to view the entire advertisement clip, thereby promoting the service or product advertised in the multimedia content. In an embodiment, the incentive is in the form of a redeemable credit score accumulated by the viewer over time. The credit score is redeemed with, for example, money, gifts, or any other items. The server 201 is configured to receive the response report sent by the client device 1301, and directs a payment module 201*b* to credit an account of the viewer with an item of value, for example, a predetermined amount of money for the confirmed view. In an embodiment, the response report is generated at the server 201.

The response for a challenge, random in content, is invoked at any random point in time during or after the multimedia content is played. For example, the viewer is prompted to enter a response to the challenge, random in content, at the end of the duration of the multimedia content. The challenge, random in content, may appear once or multiple times when the multimedia content is played on the viewer's client device 1301. The viewer may be prompted to respond to the challenge, random in content, either during or immediately following the completion of the multimedia content. In an example, the multimedia content is an audio-video file with a duration of 20 seconds. During the playing of the video, the numerals 7 and 9 are each flashed for 2 seconds, for example, at the $10^{th}$ and $15^{th}$ second respectively, after the start of the play of the video for the observation of the viewer. At the completion of the audio-video file, an answer box appears prompting the viewer to enter the numbers flashed during the audio-video, in order to register a correct response and therefore a confirmation of the view.

In another example, a video is played to the viewer, during which a pair of geometrical shapes, for example, a circle followed by a square appear in subsequent frames of the video. The geometrical shapes are overlaid at random positions on the video and appear independent of the video, or appear as part of the video. At the completion of the video, a pull down answer menu appears with several shape pairs as options. The viewer selects the correct shape pair from the options in the menu to register a correct response. In another example, a video is played in the primary window of the user interface and a child window appears either cascaded with or alongside the parent window. The companion window displays a mathematical equation, such as (3+3=?), as the challenge. The video is paused momentarily or for a response time-out period within which the viewer is required to enter the correct answer, in this case 6. In an embodiment, the viewer is required to submit the correct response in order to resume playing of the video, or avoid termination of the video. In another example, a color is flashed in the foreground or the background when the video clip is being played. The viewer is required to either enter a description of the color or select the color from an options list to register a correct response.

In an embodiment, the challenge, random in content, comprises a target or a response region that appears on a touch-sensitive screen of, for example, an iPhone® or an iPad® of Apple Inc., an Android implemented device or other touch-sensitive internet connected devices. The target or the response region appears on the touch-sensitive screen during the playing of a video. As used herein, the target or the response region is a viewer selectable area, randomly overlaid during the play of the multimedia content, with which the viewer interacts within a response time out period to register a valid response. The response is invoked in real-time and involves the viewer, for example, touching a region on the touch-sensitive screen where the target or the response region appears. For example, a commercial on baseball is displayed on the touch-sensitive screen. During the play of the commercial, various baseball team logos are randomly displayed, each for 2 to 3 seconds. The viewer can confirm viewing of the commercial by touching the touch-sensitive screen when and where the logos appear. In an embodiment, the challenge and response interactions are implemented using GUI widgets. The challenge presented to the viewer is to pinpoint a position on the parent window where a child window, such as modal window, appears at a random position during the playing of the video in the parent window. A modal window is a child window that requires the viewer to interact with the child window before the viewer can return to the flow of the parent window. The challenge further comprises selecting the pinpointed position within a response time-out period. The selection of the pinpointed position is performed, for example, using a touch stylus on a touch-sensitive screen, or using a pointing device and a corresponding pointer on the display screen 1301a. In this example, the user interface is a touch-sensitive screen or a pointing device in conjunction with a regular screen, respectively. The child window presenting the challenge may comprise a button that has to be selected by the viewer within the response time-out period to register a valid response.

In another example, the viewer is required to complete more than one challenge-response interaction, that is, locate and select more than one random target or response region at different time periods, during the play of a video. For example, during the playing of a video in the parent window, a first button appears for 5 seconds at halfway through the video, while a second button appears for 5 seconds at the end of the video. The viewer is required to locate and select both the buttons within the relevant response time-out periods to register a valid response. If the viewer has not correctly selected either of the targets or both the targets within the relevant response time-out periods, the viewer is prompted to replay the video and complete the challenge. In another example, the targets or the response regions, for example, one or more buttons appear immediately outside the boundary of the multimedia player frame 2002, during the play of a video. The viewer is required to locate and select the buttons within the relevant response time-out periods to register a valid response.

In an embodiment, the challenge, random in content, content is either visual or aural. In case of the challenge, random in content, being aural, the challenge, random in content, content is in a non-visual alphanumeric form. If the challenge, random in content, content is aural in nature, the challenge, random in content, content is, for example, alphanumeric or indicative of a logo, icon, symbol, shape, picture, etc. If the challenge, random in content, content is visual, the challenge, random in content, content is, for example, in the form of a logo, icon, symbol, shape, picture, etc. The response for the challenge, random in content, requires the viewer to enter the challenge, random in content, content, or to select the correct option from the presented options. The response can also be registered manually or orally. For example, the viewer has to perform a manual action such as depressing a button, operating a pointing device or touching a screen, or utter words or sounds to register a response.

Consider an example where the challenge content is visually presented to the viewer. The challenge content, for example, a logo, an icon, a symbol, a shape, a picture, etc., is displayed for 5 seconds within a first child window during the play of an advertisement in a parent window or content rendering window. A second child window displays a message or a prompt such as "Provide the symbol above at the end of the advertisement" or "Select the symbol previously displayed". Consider another example where the challenge content is aurally presented to the viewer during the play of an advertisement. A speech synthesizer provides an audible sound indicative of the challenge content, and also prompts the viewer to remember and submit the challenge content at the end of the advertisement, for example, "Enter the two digits that you heard". The viewer submits the response by selecting the correct option indicative of the challenge content presented. The viewer also submits the response by depressing the appropriate alphanumeric keys of the input means of the client device 1301. In another example, the viewer submits the response by uttering or orally articulating the challenge content, which is processed by suitable voice recognition software in the client device 1301 or the server 201. In an embodiment, the viewer is required to submit the correct response within a time-out period.

In the event that the viewer enters an incorrect response, or enters the response after the elapse of the response time-out period, a challenge-response module 1301d of the view confirmation module 1301b displays an error message or a prompt message, prompting the viewer to restart or replay the multimedia content. For example, the prompt message: "You have not entered the required digits in the time allocated, or you have entered the incorrect digits. Would you like to replay the advertisement?" is displayed, inviting the viewer to select either a "Yes" option or a "No" option. If the viewer chooses to replay the multimedia content, the multimedia content is replayed and the procedure is repeated with another challenge-response sequence. If the viewer chooses not to replay the multimedia content, the response report is generated indicating the incorrect response in the previous attempt, and the play of the multimedia content is terminated.

Figure 7:
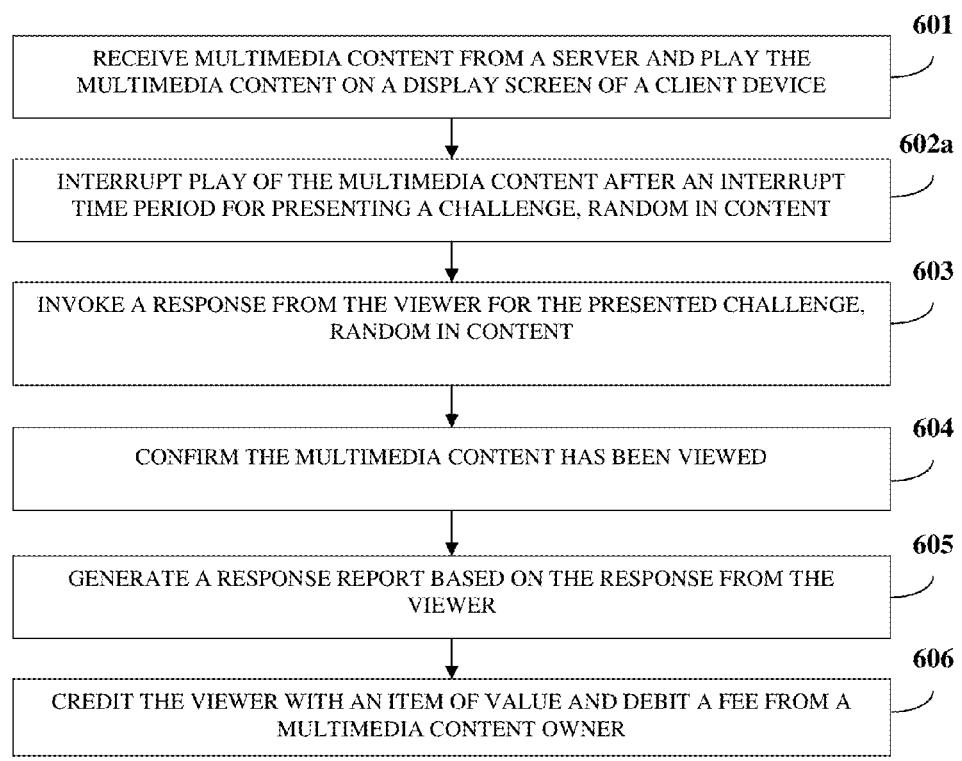
FIG. 7 illustrates a second embodiment of the computer implemented method for confirming that a viewer viewed multimedia content on a client device.

FIG. 7 illustrates a second embodiment of the computer implemented method for confirming that a viewer viewed multimedia content on a client device 1301. One or more multimedia content owners upload multimedia content on the server 201 of the media service provider. In another embodiment, the multimedia content owners upload multimedia content, for example, on a third party content server, a network of servers, servers that belong to the multimedia content owners, etc. In this embodiment, the multimedia content owner transmits, for example, a tag or a reference to the location of the uploaded multimedia content to the media service provider administering the server 201. The media service provider then invokes transmission of the multimedia content to the viewer from the tagged or referenced location, for example, from the third party content server. The media service provided invokes a real time transmission of the multimedia content to the viewer via, for example, the third party content server by delivering browser executable code such as JavaScript code to a web browser on the viewer's client device 1301. The viewer's web browser automatically executes the JavaScript code, fetches the multimedia content from the referenced location, and displays the multimedia content to the viewer.

The client device 1301 of the viewer receives 601 the multimedia content, for example, an advertisement, a commercial message, an educational clip, an entertainment clip, etc., from the server 201 and plays the multimedia content on the display screen 1301a of the client device 1301, for example, in an audiovisual format. The play of the multimedia content is interrupted 602a after an interrupt time period for presenting a challenge, random in content. The interrupt time period is less than the duration of the multimedia content. The challenge, random in content, content is generated and displayed at random on the multimedia content. In another embodiment, the challenge, random in content, is presented to the viewer by overlaying the challenge, random in content, on the multimedia content as the multimedia content is playing on the display screen 1301a of the client device 1301 as disclosed in the detailed description of FIG. 6. In this embodiment, the challenge, random in content, is overlaid or played on the multimedia content or in close proximity to the multimedia content. A response is invoked 603 from the viewer for the presented challenge, random in content. The response entered by the viewer determines whether the viewer has viewed the multimedia content. The response is used for confirming 604 the viewing of the multimedia content. A response report is generated 605 based on the response from the viewer. The response report verifies the correctness of the response to the challenge, random in content, and confirms viewing of the multimedia content by the viewer. The viewer is credited 606 with an item of value, if the response report confirms the multimedia content was viewed by the viewer, while the multimedia content owner is debited a fee. In an embodiment, the viewer is credited only for the correct responses provided by the viewer and verified by the response report.

In an embodiment, the item of value provided to the viewer is the ability to view premium multimedia content, for example, a sports broadcast, a movie, a television show, etc. In this embodiment, the multimedia content owner is debited a fee similar in value to the value of the premium multimedia content. In an embodiment, the amount by which the multimedia content owner's debited fee exceeds the item of value credited to the viewer is retained by the media service provider as profit. In another embodiment, the media service provider administering the server 201 credits the viewer with items of value based on the response report confirming that the viewer provided correct responses to the challenges, random in content.

In an embodiment, the items of value earned by the viewer are a number of units of virtual currency similar to, for example, frequent flyer miles earned in the airline industry. The viewer may exchange the number of units of virtual currency at a future time for rewards such as viewing premium multimedia content, cash, etc. The use of the virtual currency embodiment allows the value earning process and the value redemption process to be separated over time across hours, days, weeks, and so on. In the intervening time, the number of units of virtual currency earned by the viewer is accumulated in an electronic wallet (e-wallet) 201i exemplarily illustrated in FIG. 13, associated with a viewer account on the server 201 or with any other third party trusted by the media service provider and the viewer. The e-wallet 201i associated with the viewer account enables the viewer to accrue the items of value over a period of time. The viewer is compensated by depositing the items of value into the e-wallet 201i and debiting a fee, for example, from the multimedia content owner, if the response report confirms that the selected multimedia content was viewed by the viewer.

If the viewer provides incorrect responses to the server 201 or provides a response after an elapsed response time-out period, the challenge-response module 1301d exemplarily illustrated in FIG. 13, prompts the viewer to restart or replay the multimedia content. If the viewer chooses to replay the multimedia content, the multimedia content is replayed and another challenge, random in content, is presented to the viewer. If the viewer chooses not to replay the multimedia content, the response report is generated indicating the incorrect responses provided by the viewer in the previous attempt, and the play of the multimedia content is terminated. The viewer is compensated for only the correct responses as indicated by the response report confirming viewing of the multimedia content.

In an embodiment, the client device 1301 receives a list of multimedia content from the server 201 for selection by the viewer as disclosed in the detailed description of FIG. 8. The multimedia content selected by the viewer is rendered on the client device 1301 and the duration of the selected multimedia content is determined. The rendering of the multimedia content is interrupted after an interrupt time period for presenting a challenge, random in content. The interrupt time period is less than the duration of the rendered multimedia content. For example, an audio-video clip of duration M seconds is interrupted, L seconds after the audio-video clip commences, for presenting a challenge, random in content. The steps of rendering the viewer selected multimedia content, interrupting the multimedia clip for presenting a challenge, random in content, invoking a response, and generating a response report may be repeated for other multimedia content in the list depending on the selection of the viewer. In an embodiment, the interrupted multimedia content is not resumed until a correct response is submitted for the challenge, random in content, by the viewer.

The interrupt time period is generated using a random generator 201g. A timer, 1301f exemplarily illustrated in FIG. 13 is provided to begin counting the interrupt time period at the start of the play of the multimedia content. When the timer 1301f reaches the interrupt time period, the play of the multimedia content is interrupted at a random time to present the challenge, random in content, to the viewer on the client device 1301.

FIG. 8 illustrates a third embodiment of the computer implemented method for confirming that a viewer viewed multimedia content on a client device 1301. A server 201 provisioned with multimedia content is provided 801. One or more multimedia content owners provision the server 201 with multimedia content by uploading the multimedia content on the server 201 or by providing a reference to the multimedia content uploaded on, for example a third party content server, a network of servers, servers that belong to the multimedia content owners, etc. The server 201 provides the viewer with controlled access to the server 201. The viewer creates 802 a viewer account on the server 201 for generating viewer credentials, for example, a user name, a password, etc. The server 201 acquires information, for example, personal information, marketing data, credit worthiness of the viewer, etc., to create the viewer account for the viewer.

The viewer accesses 803 the server 201 by supplying the viewer credentials. The viewer logs in to the viewer account to use the services and resources on the server 201 by providing, for example, the username, the password, and other viewer credentials. During a login session, the viewer receives 804 a list of multimedia content and viewing parameters on the client device 1301 from the server 201 for selection. The viewing parameters comprise, for example, a schedule, an order of playing the selected multimedia content, etc.

The viewer selects 805 one or more of the multimedia content from the list of multimedia content for on-demand streaming, storing the multimedia content for later viewing, etc. In an embodiment, the viewer may preselect the multimedia content and allow playing of the preselected multimedia content on the client device 1301. The viewer also selects 805 one or more viewing parameters, for example, a schedule and an order of playing the selected multimedia content. In an embodiment, the viewer receives a list of predetermined multimedia content from the server 201 based on preselected preferences of the viewer.

The client device 1301 receives 806 the selected multimedia content, for example, an advertisement, a commercial message, an educational clip, an entertainment clip, etc., from a media service provider via the server 201 and plays 806 the selected multimedia content based on the selected viewing parameters, for example, at a selected schedule and in a selected order of playing. In an embodiment, the server 201 may prompt the viewer to view the multimedia content.

The viewer is presented 602 with a challenge, random in content, for confirming viewing of the selected multimedia content by the viewer. In an embodiment, a challenge, random in content, is overlaid 602b on the selected multimedia content. In another embodiment, the server 201 interrupts 602a the play of the selected multimedia content after an interrupt time period for presenting the challenge, random in content. The interrupt time period is less than duration of the selected multimedia content. The challenge content is generated and displayed at random on the multimedia content. A response is invoked 603 from the viewer for the presented challenge, random in content. The response determines whether the viewer has viewed the multimedia content. Viewing of the selected multimedia content is confirmed 807 using the challenge, random in content as disclosed in the detailed description of FIGS. 6-7 and FIGS. 10-11.

A response report is generated 808 based on the viewing of the selected multimedia content by the viewer. The viewer is compensated 809 by crediting the viewer with one or more items of value if the response report confirms that the viewer has viewed the selected multimedia content. The items of value comprise, for example, one or more of points, points redeemable for cash, points redeemable for additional items of value, scores, scores redeemable for cash, scores redeemable for additional items of value, cash, viewing of premium multimedia content, units of virtual currency, and any combination thereof.

The multimedia content is streamed to the client device 1301 using a network protocol that supports streaming media. For example, the network protocol comprises a user datagram protocol, a real time streaming protocol, a real time transport protocol, and a real time transport control protocol. These network protocols are used for controlling streaming media sessions between the server 201 and the client device 1301. Furthermore, the delivery of the streaming multimedia content is via different modes of transmission, for example, unicast, multicast, or peer to peer transmissions. In an embodiment, the client device 1301 receives the multimedia content from the server 201 as a progressive download. The multimedia content may be cached in segments on an intermediate system, for example, a "store and forward" system. For example, the server 201 transmits the multimedia content to the "store and forward" system that stores the multimedia content and then transmits the stored multimedia content to the client device 1301 at predetermined intervals of time. The "store and forward" system may also send the multimedia content to one or more "store and forward" systems prior to sending the multimedia content to the client device 1301. In another embodiment, the selected multimedia content is downloaded to the client device 1301 and stored for later viewing. In another embodiment, the server 201 sends an encrypted key to the client device 1301 to enable the multimedia content to be viewed at a later time, for example, in an offline mode.

The streams comprising the challenge, random in content, and the multimedia content are either integrated at the server 201 or combined at a web browser on the client device 1301 of a viewer. The challenge, random in content, and the multimedia content may arrive at the client device 1301 of the viewer as a single integrated stream or as two independent streams that are combined in real time at the client device 1301. The challenge, random in content, and the multimedia content may also be stored in the client device 1301 for simultaneous viewing at a time selected by the viewer. In an embodiment, the challenges, random in content, are stored in the media database 201d exemplarily illustrated in FIG. 13. The server 201 retrieves the stored challenges, random in content, and presents the retrieved challenges, random in content, with the multimedia content to the viewer. In another embodiment, a single challenge, random in content, may be used with more than one multimedia content.

In an embodiment, the client device 1301 presents the challenge, random in content, to the viewer for confirming the viewing of the selected multimedia content by the viewer. In this embodiment, the client device 1301 generates the response report based on the viewing of the selected multimedia content by the viewer and stores the generated response report on the client device 1301. The client device 1301 transmits the response report to the server 201 for compensating the viewer with the items of value if the response report confirms the viewing of the selected multimedia content by the viewer. In another embodiment, the server 201 generates the response report.

In an embodiment, the viewer receives the list of multimedia content from the server 201 based on the marketing data acquired from the viewer during the creation of the viewer account. Consider an example where the viewer accesses the server 201 by providing an internet protocol (IP) address, for example, "76.166.144.13". The server 201 resolves location of the viewer to Los Angeles, Calif. The server 201 transmits advertisements of clothing stores, automobiles, etc., in the California region to the viewer. Consider another example where a viewer accesses the server 201 via the internet. The viewer provides marketing data, for example, location "New York", age "35", and favorite food "pizza", during creation of the viewer account. The server 201 transmits a list of advertisements of pizza places, for example, Pizza Hut, Domino's Pizza, etc., located in New York to the viewer's client device 1301. The viewer selects advertisements of Domino's Pizza and selects a schedule and order for playing the advertisements. During playing of the received video advertisement, a challenge, random in content, for example, a mathematical equation based challenge, comprising a random equation (3+4=?) or random numbers such as "6" and "2" is presented to the viewer. When the video advertisement ends, the viewer is presented with an opportunity to submit a solution to the mathematical equation, for example, "What is the sum of the numbers shown during the video?". If the viewer answers the question accurately, the server 201 confirms viewing of the video advertisement. The server 201 compensates the viewer with an item of value, for example, a coupon on confirming viewing of the multimedia content.

In another embodiment, the multimedia content provisioned to the server 201 by, for example, multimedia content owners, is assigned a particular category, for example, education, medicine, sports, etc., by, for example, multimedia content owners during the provisioning process, the server 201, etc. The viewer logging in to the server 201 using the viewer credentials is presented with an option of searching through the available multimedia content through the client device 1301 based on the categories of the multimedia content. The server 201 enables the viewer to select the multimedia content based on the categories. In this embodiment, the categories are further classified into subcategories to provide the viewer with a fine tuned search of the available multimedia content.

The computer implemented method and system 1300 disclosed herein is used for promoting the viewing of multimedia content, for example, an advertisement clip of a product, by generating interest in such viewing. The server 201 also enables promoting viewing of multimedia content by, for example, displaying advertisements alongside of the multimedia content being viewed by the viewer on the client device 1301. In another embodiment, the server 201 enables promoting viewing by raising compensation from multiple viewers or users in the user network 204.

In another embodiment, the server 201 provides the viewer with an electronic wallet (e-wallet) 201*i* associated with the viewer account for accruing the items of value over a period of time. In an embodiment, the multimedia content owner provides the items of value for confirming that the viewer has viewed the multimedia content. The multimedia content owner is debited a pre-agreed upon fee for each confirmation. In another embodiment, the media service provider administering the server 201 provides the items of value for confirming that the viewer has viewed the multimedia content. The media service provider may allow the viewer to view premium grade multimedia content as compensation. The server 201 deposits the items of value into the viewer's e-wallet 201*i* and debits a fee from the multimedia content owner, if the response report confirms the viewing of the selected multimedia content by the viewer. The server 201 enables the viewer to purchase products and services on an electronic commerce (e-commerce) platform using the items of value accrued in the e-wallet 201*i*. The server 201 tracks the purchase behavior of the users, dynamically updates their dynamic user profiles, and further refines the targeting criteria for targeting the multimedia content. In another embodiment, the server 201 provides the viewer with an option of triggering playback of premium multimedia content in exchange for one or more items of value accrued in the e-wallet 201*i* and allows the premium multimedia content to play.

Figure 23A:
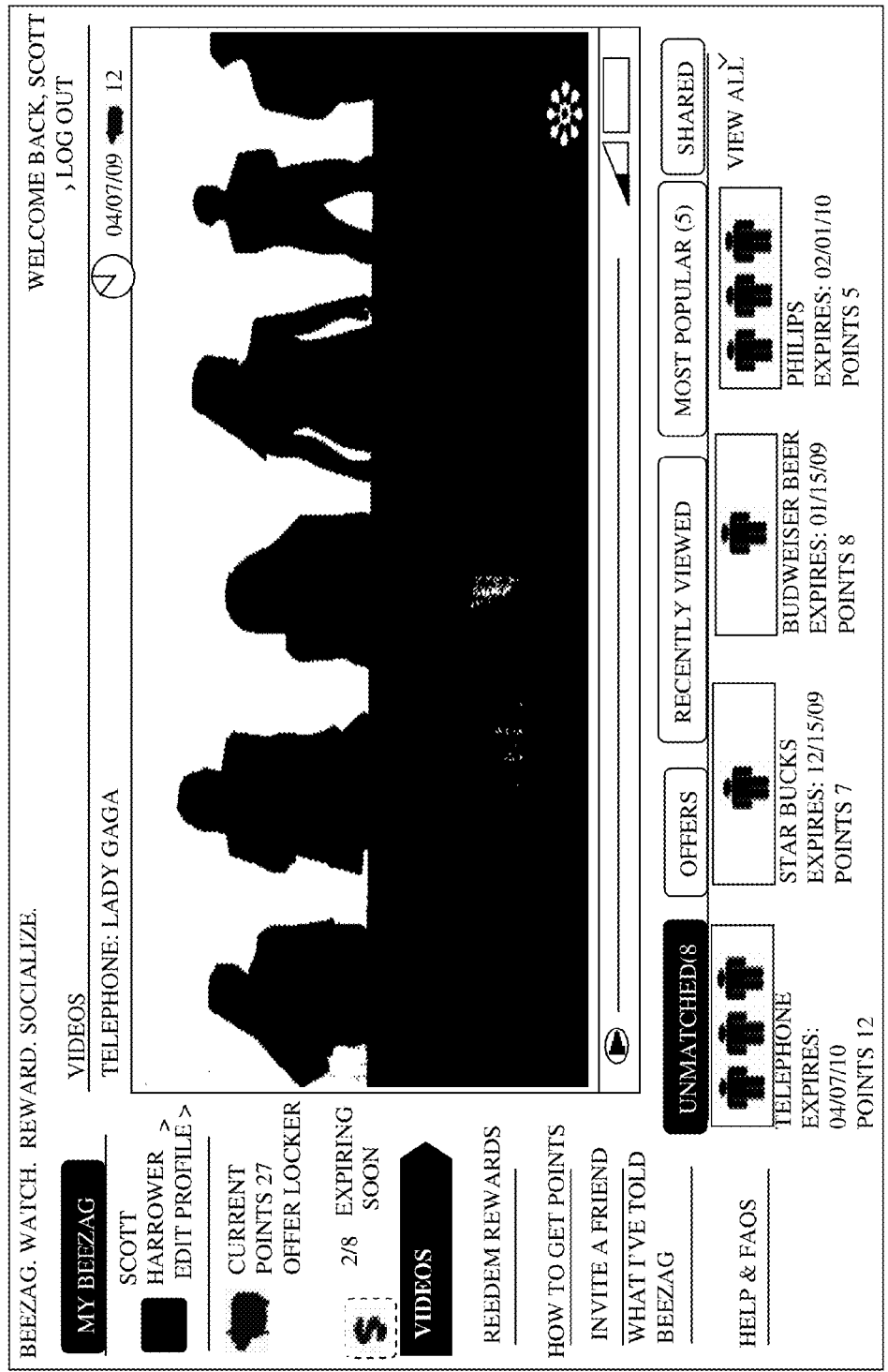
FIGS. 23A-23C exemplarily illustrate screenshots for a viewing a video and confirming viewing of the video using a challenge, random in content.
Figure 23B:
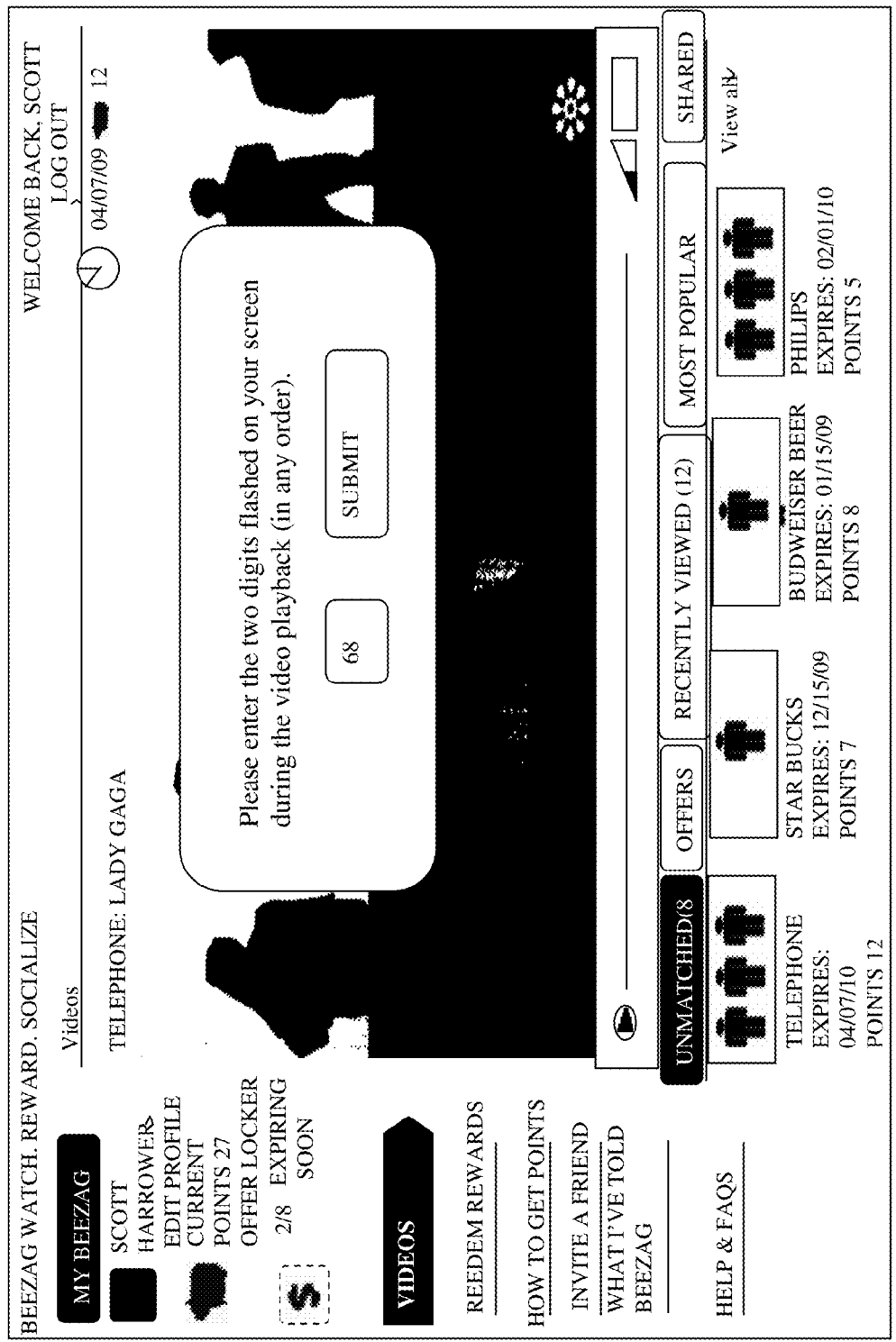
Figure 23C:
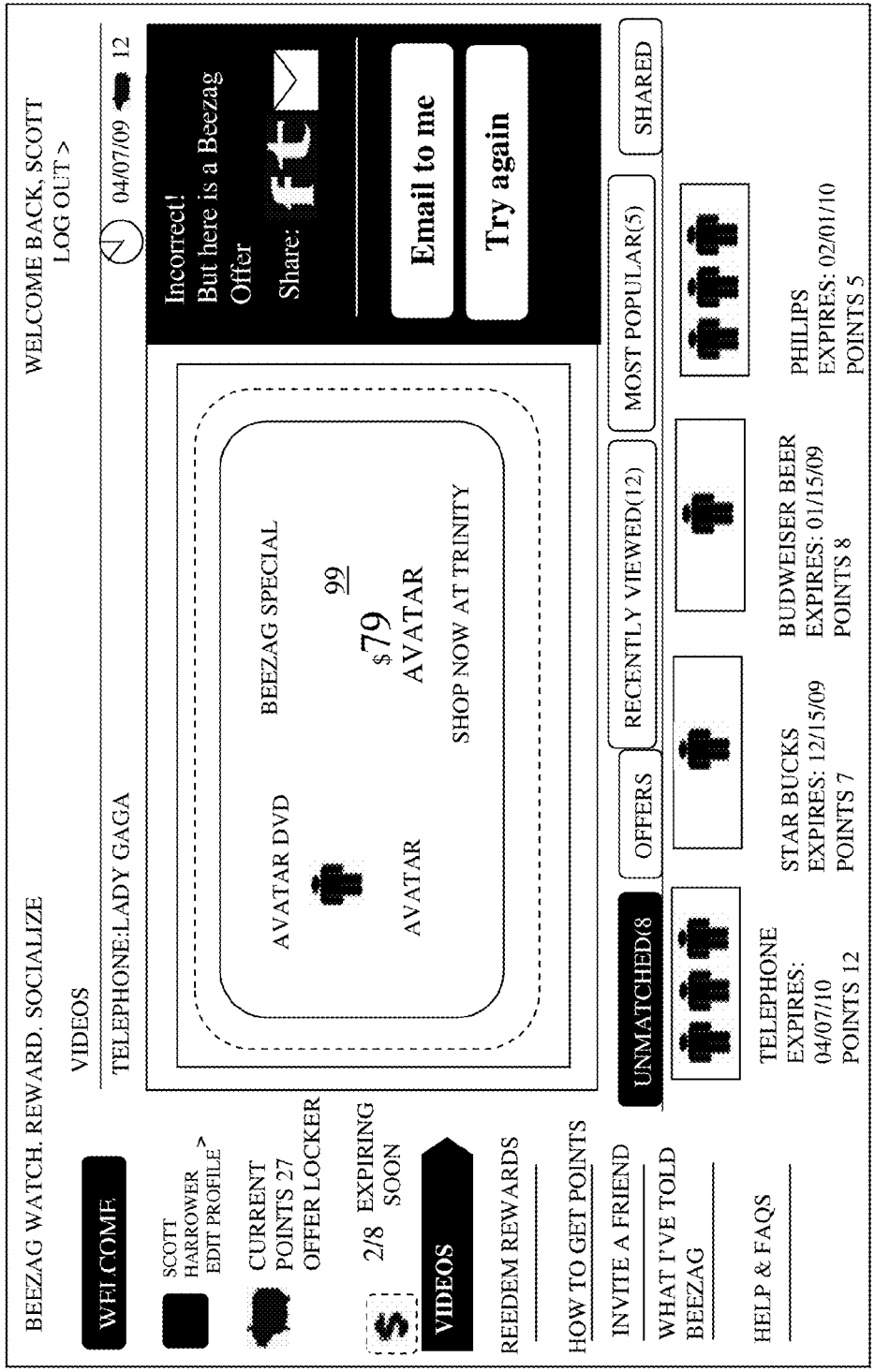
Figure 24A:
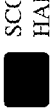
Figure 24B:
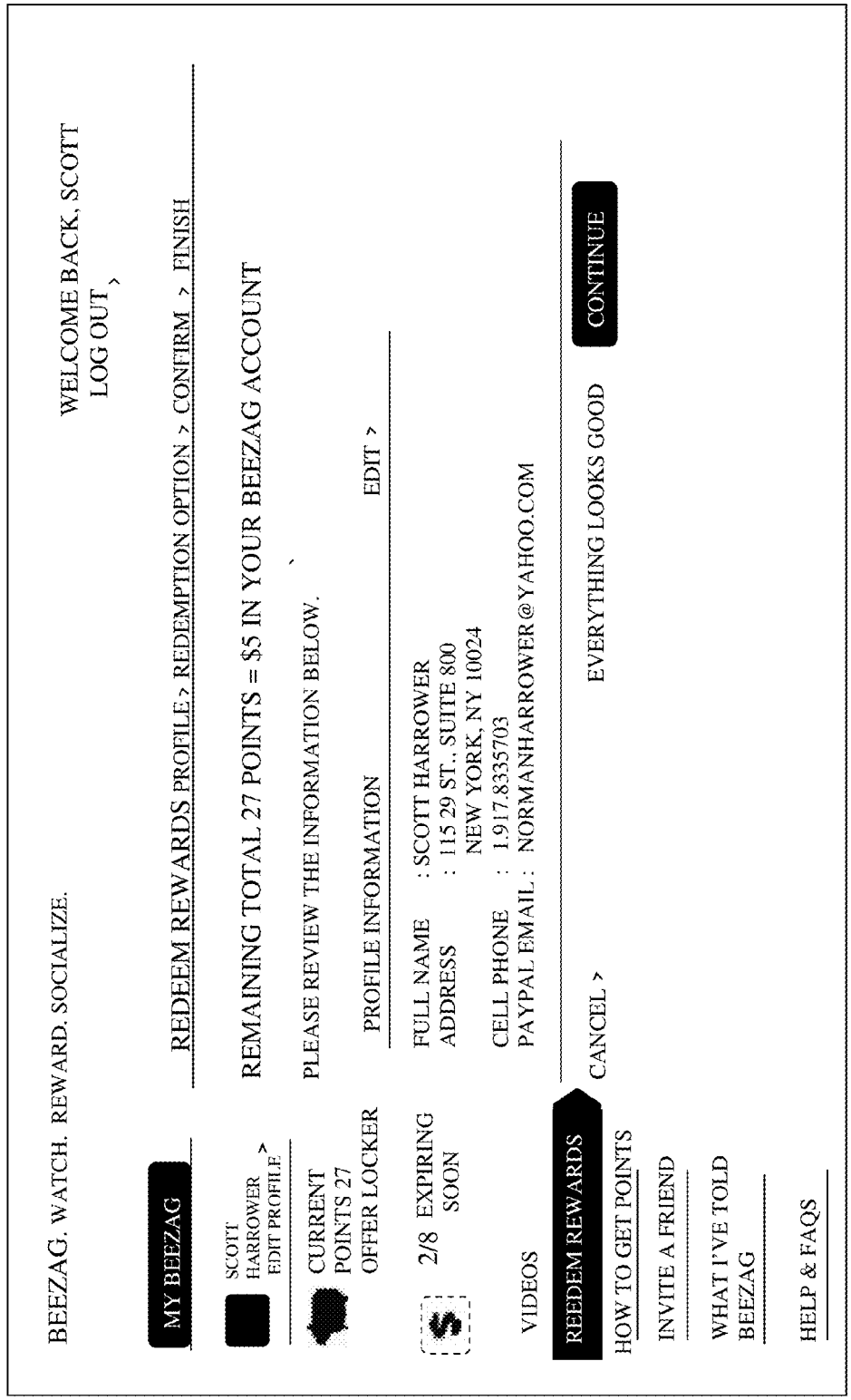
Figure 24C:
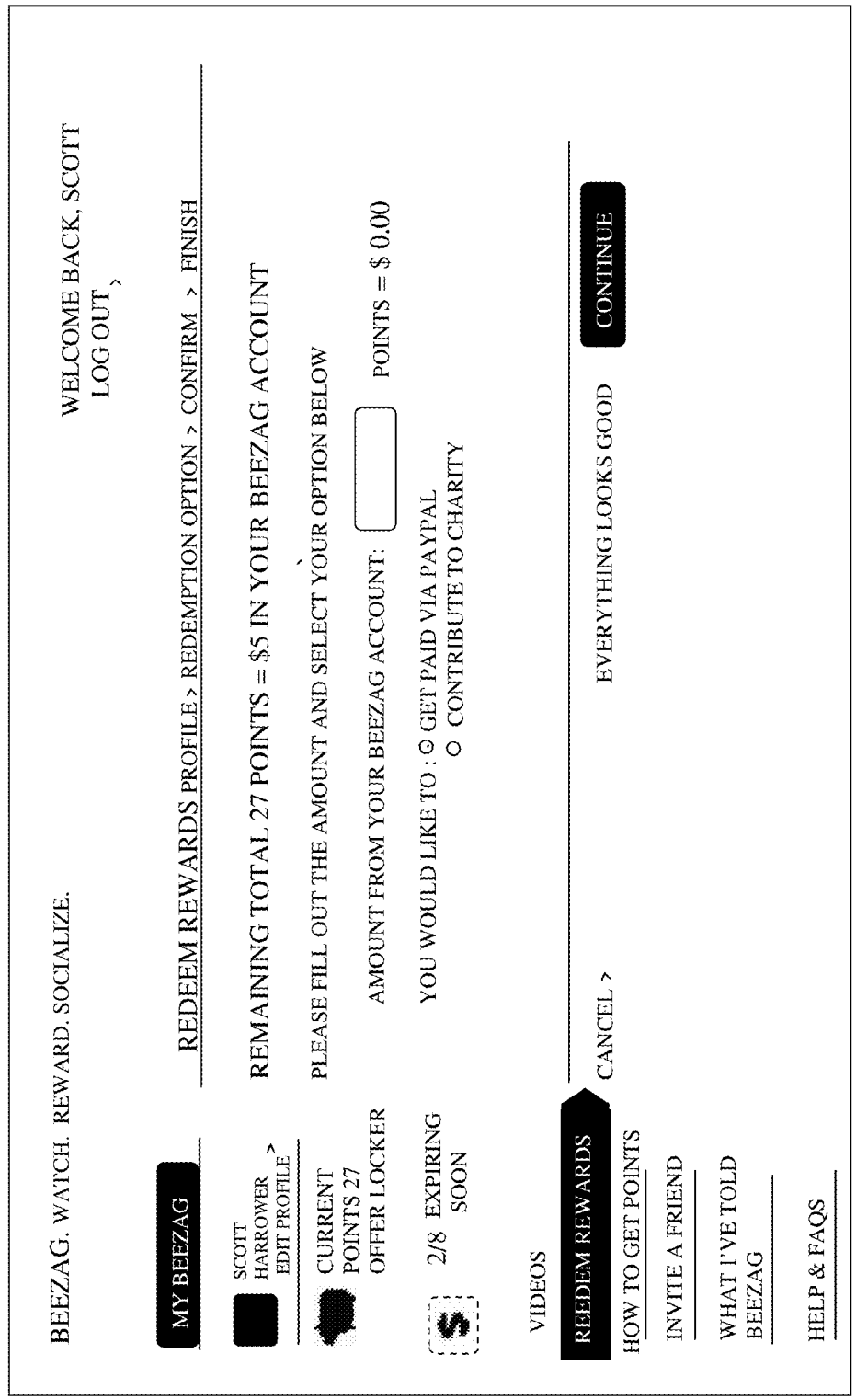
Figure 24E:
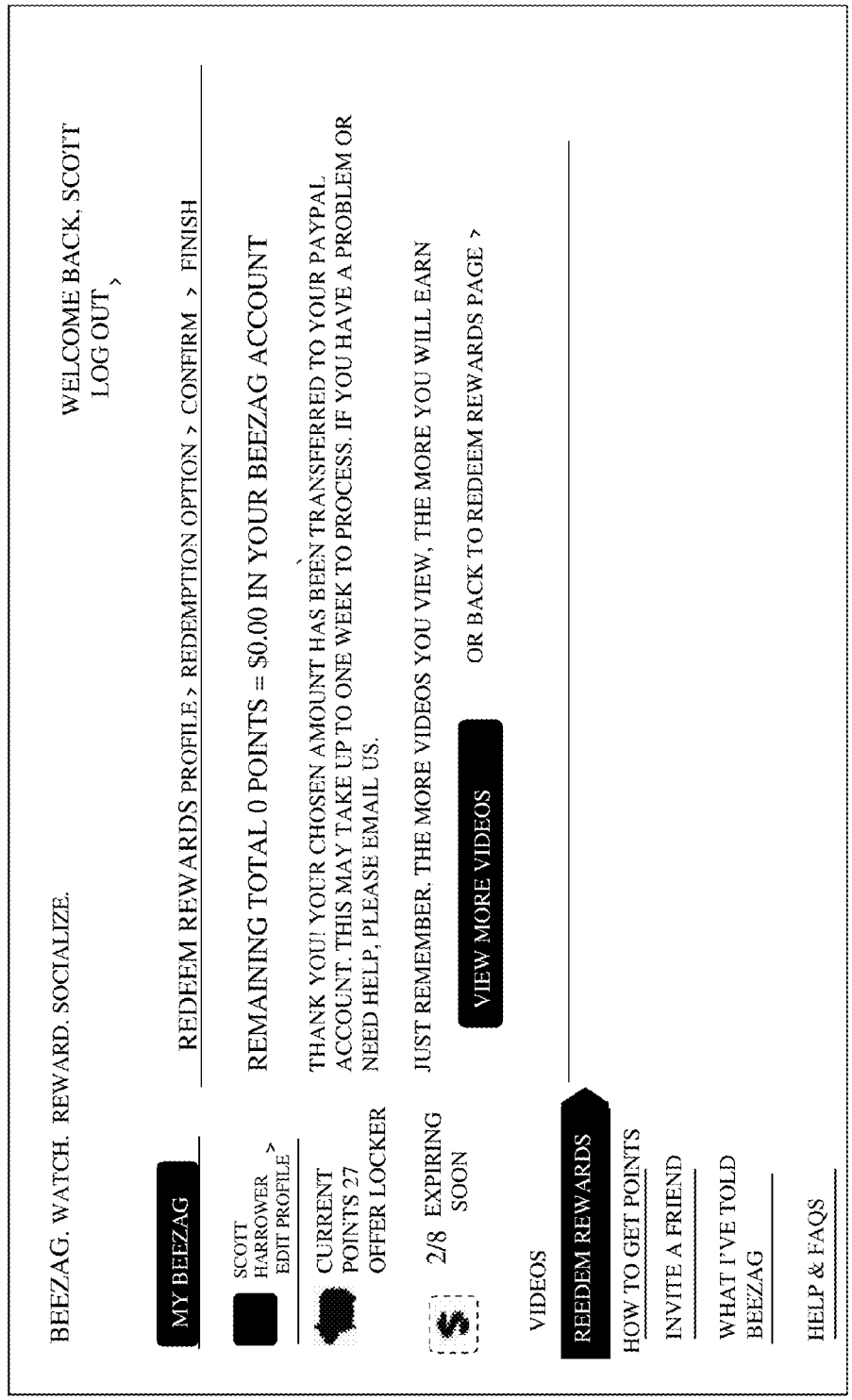

In an embodiment, the multimedia content is an advertisement clip that is streamed to the client device 1301 on demand. The server 201 inserts an interactive promotional segment, for example, a clickable coupon, within the selected multimedia content as exemplarily illustrated in FIG. 23C. The interactive promotional segment directs the viewer to the e-commerce platform for enabling the viewer to purchase products, for example, digital versatile discs (DVDs) and services associated with the selected multimedia content on the e-commerce platform. In an embodiment, the interactive promotional segment directs the viewer to any e-commerce platform for enabling the viewer to purchase other products and services. The viewer may purchase products and services by redeeming the accrued items of value in the e-wallet 201*i*. The e-wallet 201*i* associated with the viewer account determines the value of the accrued items. In an embodiment, the clickable coupon used to direct the viewer to the e-commerce platform is redeemed for special discounts on the purchased products and services, or may allow viewing of premium grade multimedia content.

In another embodiment, the server 201 enables storage of information on a particular product or service to be purchased by the viewer if the compensation reflected in the e-wallet 201*i* is insufficient for purchase of the particular product or service by the viewer. In this embodiment, the server 201 enables the viewer to accrue sufficient compensation for the purchase of the stored product or service by providing a list of multimedia content to be viewed by the viewer, that provides compensation on confirming viewing of the multimedia content related to that particular product or service. The server 201 enables the viewer to accrue compensation over a period of time by confirming viewing of the multimedia content.

FIG. 9 illustrates the steps performed by the server 201 for confirming that a viewer viewed multimedia content on a client device 1301. The server 201 creates 802 a viewer account for the viewer for generating viewer credentials. The server 201 provides the viewer with controlled access to the server 201 when the viewer supplies the generated viewer credentials. The server 201 transmits 901 a list of multimedia content and viewing parameters to the client device 1301 for selection by the viewer. The server 201 may transmit a list of multimedia content preselected by the viewer or based on the preferences of the viewer. The server 201 acquires 902 one or more of the viewing parameters and one or more of the multimedia content from the list of multimedia content selected by the viewer. The server 201 transmits the selected multimedia content to the client device 1301 from the media database 201*d* of the server 201 exemplarily illustrated in FIG. 13, or from a location referenced by a multimedia content owner. The server 201 plays 902 the selected multimedia content on the client device 1301 based on the selected viewing parameters. The server 201 may play the selected multimedia content on the client device 1301 in, for example, real time or at a time selected by the viewer. The server 201 then confirms 807 viewing of the selected multimedia content using a challenge, random in content, and generates 808 a response report based on the viewing of the selected multimedia content by the viewer. The server 201 compensates 809 the viewer by crediting the viewer with one or more items of value if the response report confirms the viewing of the selected multimedia content by the viewer. In an embodiment, the server 201 compensates the viewer by allowing the viewer to view premium multimedia content in exchange for one or more items of value.

Figure 10:
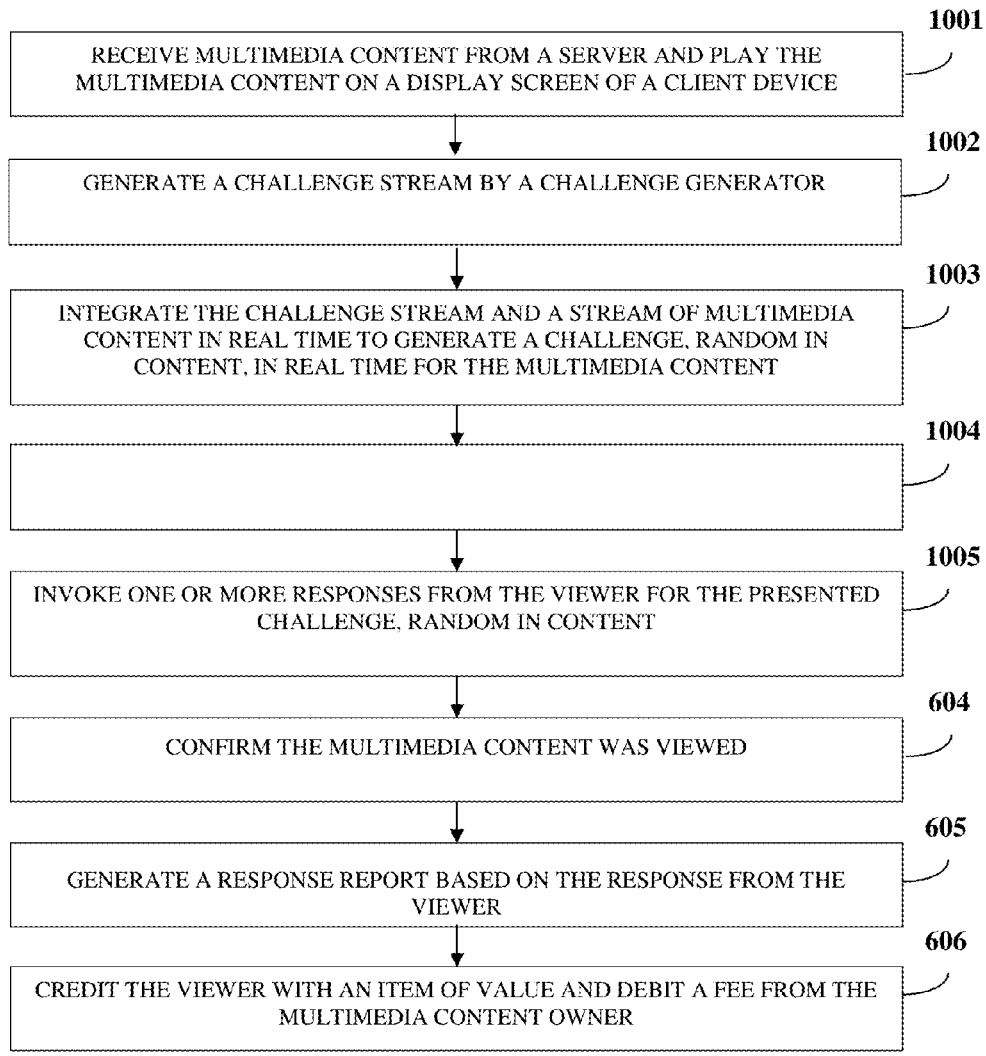
FIG. 10 illustrates a fourth embodiment of the computer implemented method for confirming that a viewer viewed multimedia content on a client device.

FIG. 10 illustrates a fourth embodiment of the computer implemented method for confirming that a viewer viewed multimedia content on a client device 1301. A viewer's client device 1301, exemplarily illustrated in FIG. 13, receives 1001 multimedia content from the server 201 and plays the multimedia content on a display screen 1301a of the client device 1301, for example, in an audiovisual format. The view confirmation module 1301b of the computer implemented system 1300 disclosed herein comprises a challenge generator 1301c, a challenge-response module 1301d, and a report generation module 1301e as exemplarily illustrated in FIG. 13. The challenge generator 1301c generates 1002 a challenge stream comprising multiple challenges. The content of each challenge in the challenge stream is random. The challenge generator 1301c can generate a theoretically infinite number of new challenges, random in content, based on permutation and combination of the input to the challenge generator 1301c and a challenge generation algorithm. The challenge stream and the stream of targeted multimedia content are integrated 1003, that is, combined in real time to generate a challenge, random in content, in real time for each play of the targeted multimedia content. View confirmation using a challenge, random in content, generated by integrating the challenge stream and the stream of multimedia content is disclosed in the co-pending application Ser. No. 13/216,256, which is incorporated herein by reference in its entirety. In an embodiment, the challenge-response module 1301d of the client device 1301 can select one or more challenges from the challenge stream to display with the multimedia content stream on the client device 1301. The generated challenge is random in content each time the same multimedia content is played on one or more client devices 1301. The challenge, random in content, is generated from the combined stream and presented 1004 to the viewer to confirm that the viewer viewed the targeted multimedia content played on the display screen 1301a of the client device 1301.

In an embodiment, the challenge-response module 1301d uses the challenge stream to generate challenges within one or more challenge sets. For example, the challenge sets comprise numbers, letters, symbols, shapes, etc. The elements within the challenge sets are, for example, numbers such as 0-9, letters such as a-z, symbols such as %, &, #, etc., and shapes such as a circle, a square, a triangle, etc. The client device 1301 may limit the selection of a challenge set based on its input capability. For example, the challenge set may constitute only numbers for client devices 1301 that are optimized only for numerical input. Other client devices 1301 with enhanced input capabilities may have a combination of challenge sets within the challenge stream.

The challenge stream in the client device 1301 is randomly generated by one of multiple methods that are known in the art using computational algorithms with a random seed that is solely determined by the client device 1301. Examples of seeds comprise time of video stream commencement, exact random access memory available at the time of video stream commencement, etc.

Based on the challenge generator 1301c, a stream of challenge elements is created from the available challenge sets. The challenge elements can be presented before, during and/or after play of the multimedia content, for example, a video and may comprise a single element or multiple elements. The timing of the challenges presented during the video is random. In an embodiment, the challenge generated by the client device 1301 is different for each viewing of a video, regardless of the video content. In another embodiment, the challenge for the same video is different for each client device 1301.

In an example, the challenge, random in content, is displayed as an overlay on the multimedia content. The challenges are integrated with the multimedia content by several techniques. For example, the challenge is integrated within an Adobe®Flash® or a shockwave flash (SWF) file and is presented as an overlay within the multimedia content. Another technique for integrating the challenge is to present the challenge, random in content, immediately outside the boundary of the multimedia player frame 2002, for example, above, below, to the left or to the right of the multimedia player frame 2002. The challenge is characterized, for example, by being one or more of unrelated to the multimedia content, presented at random times during and/or after play of the multimedia content, and presented at random physical locations on the multimedia content.

One or more responses are invoked 1005 from the viewer for the presented challenge, random in content. A response may be invoked from the viewer during or at the end of play of the multimedia content. In an embodiment, if the viewer enters a response to the presented challenge, the response confirms 604 that the multimedia content has been viewed by the viewer. In another embodiment, if the viewer enters a correct response to the presented challenge in the client device 1301, the response confirms that the multimedia content was viewed by the viewer. A response report is generated 605 based on the response from the viewer, and transmitted to the server 201 for confirming that the multimedia content was viewed by the viewer. The viewer is credited 606 with an item of value, for example, cash, if the response report confirms the multimedia content was viewed by the viewer, while the multimedia content owner is debited a fee.

The response for a challenge, random in content, is invoked at any random point in time during or after the multimedia content is played. For example, the viewer is prompted to enter a response to the challenge, random in content, at the end of the duration of the multimedia content. The challenge, random in content, may appear once or multiple times when the multimedia content is played on the viewer's client device 1301. The viewer may be prompted to respond to the challenge, random in content, either during or immediately following the completion of the multimedia content. In an example, the multimedia content is an audio-video file with a duration of 20 seconds. During the playing of the video, the numerals 7 and 9 are each flashed for 2 seconds, for example, at the $10^{th}$ and $15^{th}$ second respectively, after the start of the play of the video for the observation of the viewer. At the completion of the audio-video file, an answer box appears prompting the viewer to enter the numbers flashed during the audio-video, in order to register a correct response and therefore a confirmation of the view.

In another example, a video is played to the viewer, during which a pair of geometrical shapes, for example, a circle followed by a square appear in subsequent frames of the video. The geometrical shapes are overlaid at random positions on the video and appear independent of the video, or appear as part of the video. At the completion of the video, a pull down answer menu appears with several shape pairs as options. The viewer selects the correct shape pairs from the options in the menu to register a correct response. In another example, a video is played in the primary window of the user interface and a child window appears either cascaded with or alongside the parent window. The companion window displays a mathematical equation, such as (3+3=?), as the challenge. The video is paused momentarily, or for a response time-out period within which the viewer is required to enter the correct response, in this case 6. In an embodiment, the viewer is required to submit the correct response in order to resume playing of the video, or avoid termination of the video. In another example, a color is flashed in the foreground or the background when the video clip is being played. The viewer is required to either enter a description of the color or select the color from an options list to register a correct response.

In an embodiment, the challenge, random in content, comprises a target or a response region that appears on a touch-sensitive screen of, for example, an iPhone® of Apple Inc., or other touch-sensitive internet connected devices. The target or the response region appears on the touch-sensitive screen during the playing of a video. As used herein, the target or the response region is a viewer selectable area, randomly overlaid during the play of the multimedia content, with which the viewer interacts within a response time out period to register a valid response. The response is invoked in real time and involves the viewer, for example, touching a region on the touch-sensitive screen where the target or the response region appears. For example, a commercial on baseball is displayed on the touch-sensitive screen. During the play of the commercial, various baseball team logos are randomly displayed, each for 2 to 3 seconds. The viewer can confirm viewing of the commercial by touching the touch-sensitive screen when and where the logos appear. In an embodiment, the challenge and response interactions are implemented using GUI widgets. The challenge presented to the viewer is to pinpoint a position on the parent window where a child window, such as modal window, appears at a random position during the playing of the video in the parent window. A modal window is a child window that requires the viewer to interact with the child window before the viewer can return to the flow of the parent window. The challenge further comprises selecting the pinpointed position within a response time-out period. The selection of the pinpointed position is performed, for example, using a touch stylus on a touch-sensitive screen, or using a pointing device and a corresponding pointer on the display screen 1301*a*. In this example, the user interface is a touch-sensitive screen or a pointing device in conjunction with a regular screen, respectively. The child window presenting the challenge may comprise a button that has to be selected by the viewer within the response time-out period to register a valid response.

In another example, the viewer is required to complete more than one challenge-response interaction, that is, locate and select more than one random target or response region at different time periods, during the play of a video. For example, during the playing of a video in the parent window, a first button appears for 5 seconds at half-way through the video, while a second button appears for 5 seconds at the end of the video. The viewer is required to locate and select both the buttons within the relevant response time-out periods to register a valid response. If the viewer has not correctly selected either of the targets or both the targets within the relevant response time-out periods, the viewer is prompted to replay the video and complete the challenge. In another example, the targets or the response regions, for example, one or more buttons appear immediately outside the boundary of the multimedia player frame 2002 as exemplarily illustrated in FIG. 20, during the play of a video. The viewer is required to locate and select the buttons within the relevant response time-out periods to register a valid response.

In an embodiment, one or more challenges, random in content, are presented at one or more times during and/or after the play of the multimedia content. In an embodiment, a response to each of the challenges, random in content, from the viewer is transferred to and presented on one or more random locations on the display screen 1301*a* of the client device 1301 or the multimedia player frame 2002 during the play of the multimedia content. Each response of the viewer is automatically registered on the display screen 1301*a* of the client device 1301 or the multimedia player frame 2002 at the end of play of the multimedia content. That is, the transferred responses are used for automatically registering responses to a challenge, random in content. For example, when a video of a long duration is played, a viewer can enter a response to a challenge, random in content, as soon as the challenge, random in content, travels across the display screen 1301*a* or the multimedia player frame 2002. As soon as the responses to each of the challenges, random in content, are entered by the viewer, the responses are transferred, for example, to the sides of the viewer's display screen 1301*a*, or at the boundary of the multimedia player frame 2002, where they reside until the end of the video. At the completion of the video, the viewer's responses are automatically populated, for example, in an answer box displayed on the viewer's display screen 1301*a* or the multimedia player frame 2002, thereby automatically registering the response for confirmation of the view.

In an embodiment, the viewer is prompted to verify the automatically populated responses in the answer box prior to registering the responses. The responses to the challenges, random in content, from the viewer are transferred to and presented on one or more random locations on the display screen 1301*a* or the multimedia player frame 2002 during the play of the multimedia content using various technologies. For example, Adobe® Flash® or shockwave flash (SWF) technology can accept individual responses while a video is playing and display the individual responses at random locations on the display screen 1301*a* or the multimedia player frame 2002 for later transfer and registration as a complete response, for example, in an answer box displayed on the viewer's display screen 1301*a* or the multimedia player frame 2002 at the end of play of the video.

Consider an example where a viewer watches a four-minute long advertisement. When a first random number, for example, 9 scrolls across the multimedia player frame 2002, the viewer immediately enters 9. A "9" then appears at the side of the multimedia player frame 2002. When a second random number, for example, 2 scrolls across the multimedia player frame 2002, the viewer immediately enters 2. A "2" joins the previously entered "9" at the side of the multimedia player frame 2002. At the end of the four-minute long video, an answer box with a text field automatically populated with "92" is displayed on the multimedia player frame 2002 for automatic submission. The viewer may also edit the numbers in the text field prior to submission.

In an embodiment, the challenge content is either visual or aural. In the latter case, the challenge content is in a non-visual alphanumeric form. If the challenge content is aural in nature, the challenge content is, for example, alphanumeric or indicative of a logo, icon, symbol, shape, picture, etc. If the challenge content is visual, the challenge content is, for example, in the form of a logo, icon, symbol, shape, picture, etc. The response for the challenge, random in content, requires the viewer to enter the challenge content, or to select the correct option from the presented options. The response is also manually or orally registered. For example, the viewer has to perform a manual action such as depressing a button, operating a pointing device or touching a screen, or utter words or sounds to register a response.

Consider an example where the challenge content is visually presented to the viewer. The challenge content, for example, a logo, an icon, a symbol, a shape, a picture, etc., is displayed for 5 seconds within a first child window during the play of an advertisement in a parent window or content rendering window. A second child window displays a message or a prompt such as "Provide the symbol above at the end of the advertisement", or "Select the symbol previously displayed". Consider another example where the challenge content is aurally presented to the viewer during the play of an advertisement. A speech synthesizer provides an audible sound indicative of the challenge content, and also prompts the viewer to remember and submit the challenge content at the end of the advertisement, for example, "Enter the two digits that you heard". The viewer submits the response by selecting the correct option indicative of the challenge content presented. The viewer also submits the response by depressing the appropriate alphanumeric keys of the input means of the client device 1301. In another example, the viewer submits the response by uttering or orally articulating the challenge content, which is processed by suitable voice recognition software in the client device 1301 or the server 201. In an embodiment, the viewer is required to submit the correct response within a time-out period.

In the event that the viewer enters an incorrect response, or enters the response after the elapse of the response time-out period, the challenge-response module 1301d displays an error message or a prompt message, prompting the viewer to restart or replay the multimedia content. For example, the prompt message: "You have not entered the required digits in the time allocated, or you have entered the incorrect digits. Would you like to replay the advertisement?" is displayed, inviting the viewer to select either a "Yes" option, or a "No" option. If the viewer chooses to replay the multimedia content, the multimedia content is replayed and the procedure is repeated with a new challenge, random in content. The challenge generator 1301c located in the client device 1301 generates a new challenge, random in content, each time the same multimedia content is played on the client device 1301. If the viewer chooses not to replay the multimedia content, the response report is generated indicating the incorrect response in the previous attempt, and the play of the multimedia content is terminated.

Figure 11:
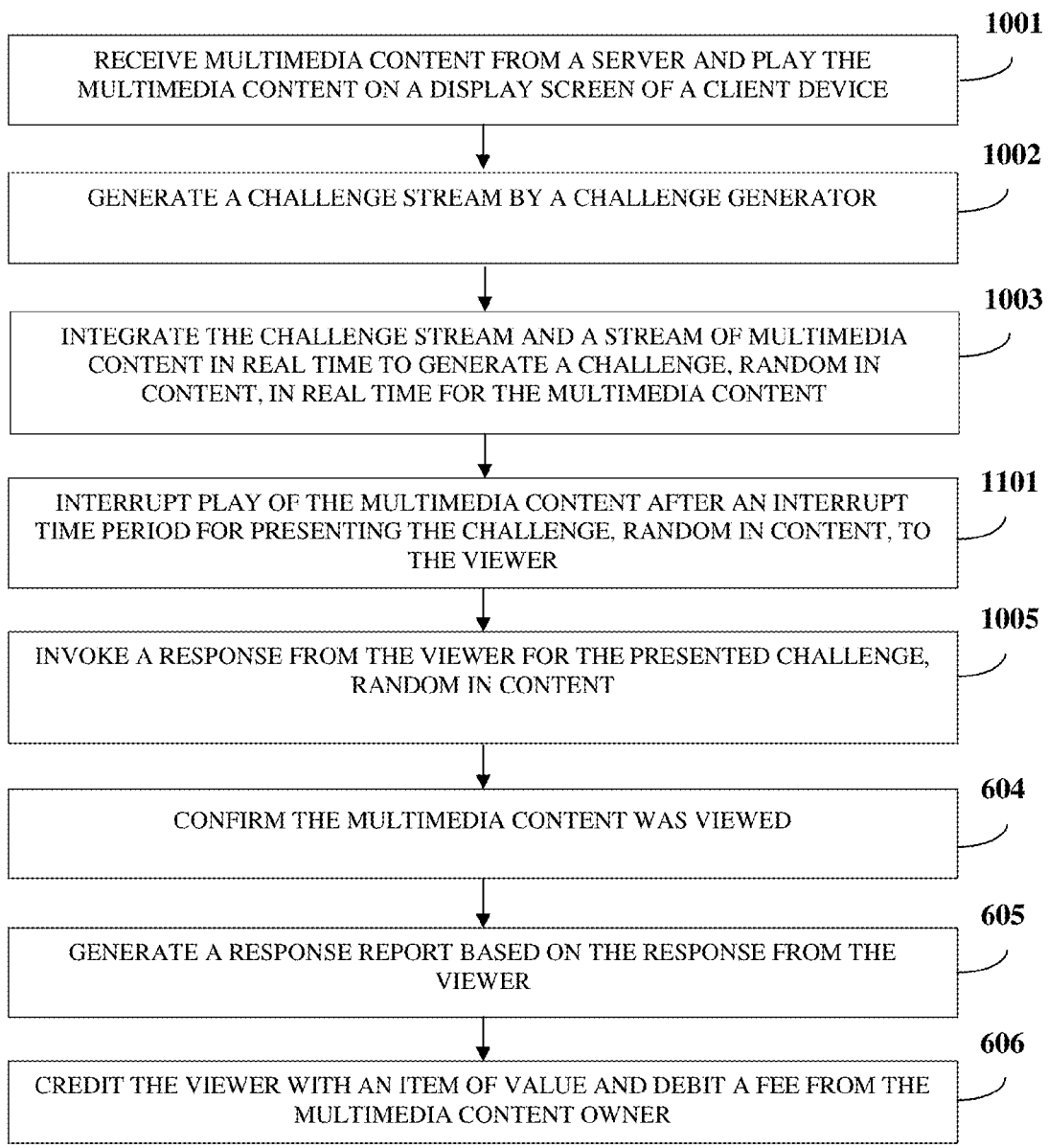
FIG. 11 illustrates a fifth embodiment of the computer implemented method for confirming that a viewer viewed multimedia content on a client device.

FIG. 11 illustrates a fifth embodiment of the computer implemented method for confirming that a viewer viewed multimedia content on a client device 1301 exemplarily illustrated in FIG. 13. One or more multimedia content owners upload multimedia content on the server 201 of the media service provider. The client device 1301 of a viewer receives 1001 the multimedia content, for example, an advertisement, a commercial message, an educational clip, an entertainment clip, etc., from the server 201 and plays the multimedia content on a display screen 1301a of the client device 1301, for example, in an audiovisual format. The challenge generator 1301c of the view confirmation module 1301b exemplarily illustrated in FIG. 13, generates 1002 a challenge stream comprising multiple challenges, wherein the content of each challenge in the challenge stream is random in content. The challenge stream and a stream of the multimedia content are integrated 1003 in real time to generate a challenge, random in content, in real time for the multimedia content, where the challenge is random in content each time the same multimedia content is played on one or more client devices 1301.

The play of the multimedia content is interrupted 1101 after an interrupt time period for presenting the challenge, random in content generated by the challenge generator 1301c in the client device 1301 and displayed on the display screen 1301a of the client device 1301 to the viewer. The interrupt time period is less than the duration of the multimedia content. The challenge content is generated and displayed at random on the multimedia content. The challenge, random in content, is presented to the viewer, for example, by overlaying the challenge, random in content, on the multimedia content. A response is invoked 1005 from the viewer for the presented challenge, random in content. If the viewer enters the response to the presented challenge, random in content, the response confirms 604 that the multimedia content was viewed by the viewer. A response report is generated 605 based on the response from the viewer. The viewer is credited 606 with an item of value, if the response report confirms the multimedia content was viewed by the viewer, while the multimedia content owner is debited a fee.

In an embodiment, the client device 1301 receives a list of multimedia content from the server 201 for selection by the viewer as disclosed in the detailed description of FIG. 8. The multimedia content selected by the viewer is rendered on the client device 1301 and the duration of the selected multimedia content is determined. The rendering of the multimedia content is interrupted after an interrupt time period for presenting a challenge, random in content. The interrupt time period is less than the duration of the rendered multimedia content. For example, an audio-video clip of duration M seconds is interrupted, L seconds after the audio-video clip commences, for presenting a challenge, random in content. The steps of rendering the viewer selected multimedia content, interrupting the multimedia clip for presenting a challenge, random in content, invoking a response, and generating a response report may be repeated for other multimedia content in the list depending on the selection of the viewer. In an embodiment, the interrupted multimedia content is not resumed until a correct response is submitted for the challenge, random in content, by the viewer.

In an embodiment, the interrupt time period is generated using a random generator 201g exemplarily illustrated in FIG. 13. A timer 1301f, exemplarily illustrated in FIG. 13, is provided to begin counting the interrupt time period at the start of the play of the multimedia content. When the timer 1301f reaches the interrupt time period, the play of the multimedia content is interrupted at a random time to present the challenge, random in content, to the viewer on the client device 1301.

Figure 12A:
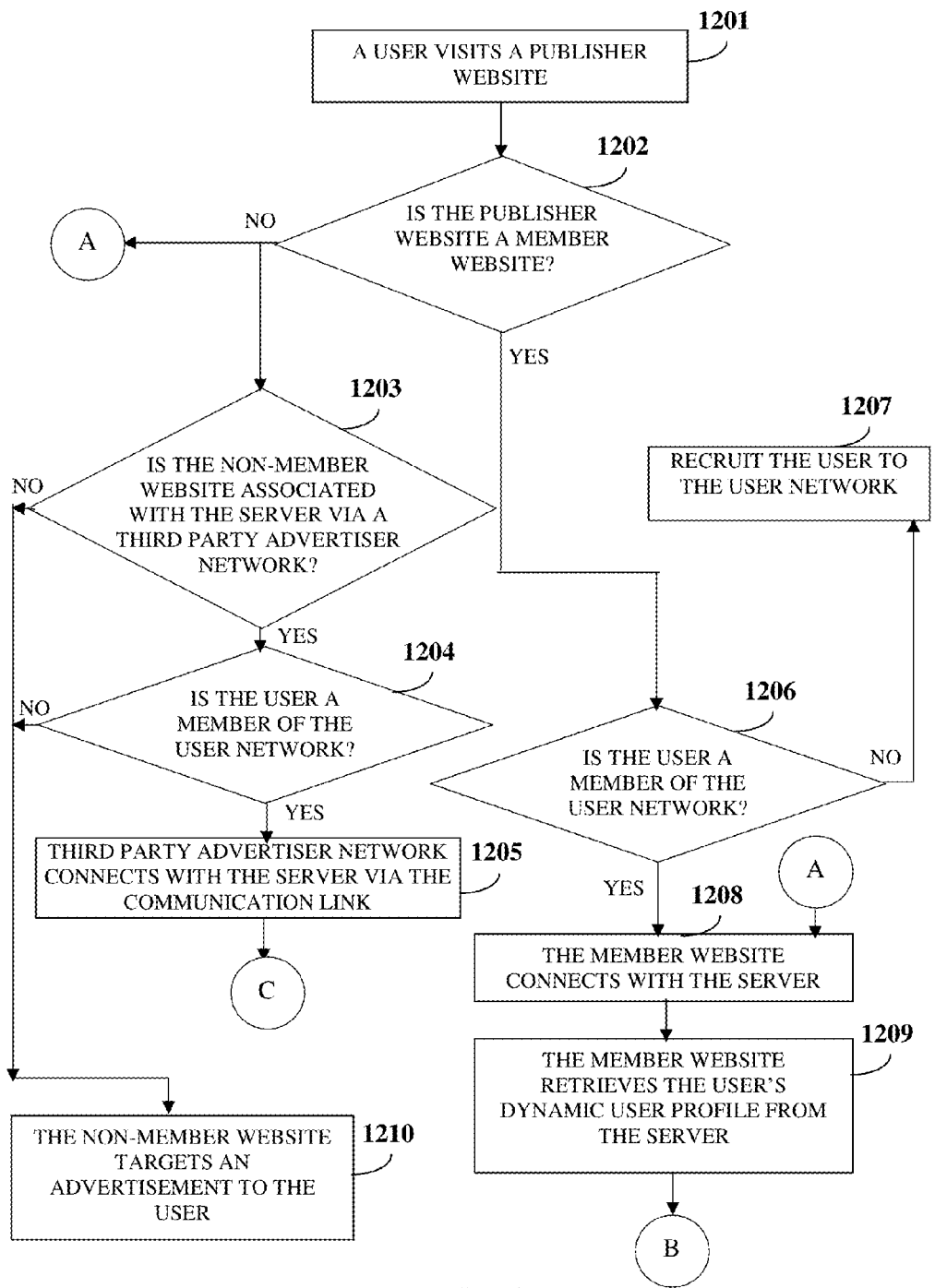
FIGS. 12A-12C exemplarily illustrates a flowchart comprising the steps for dynamically profiling users for incentivized targeting of multimedia content to the users in a networked environment.
Figure 12B:
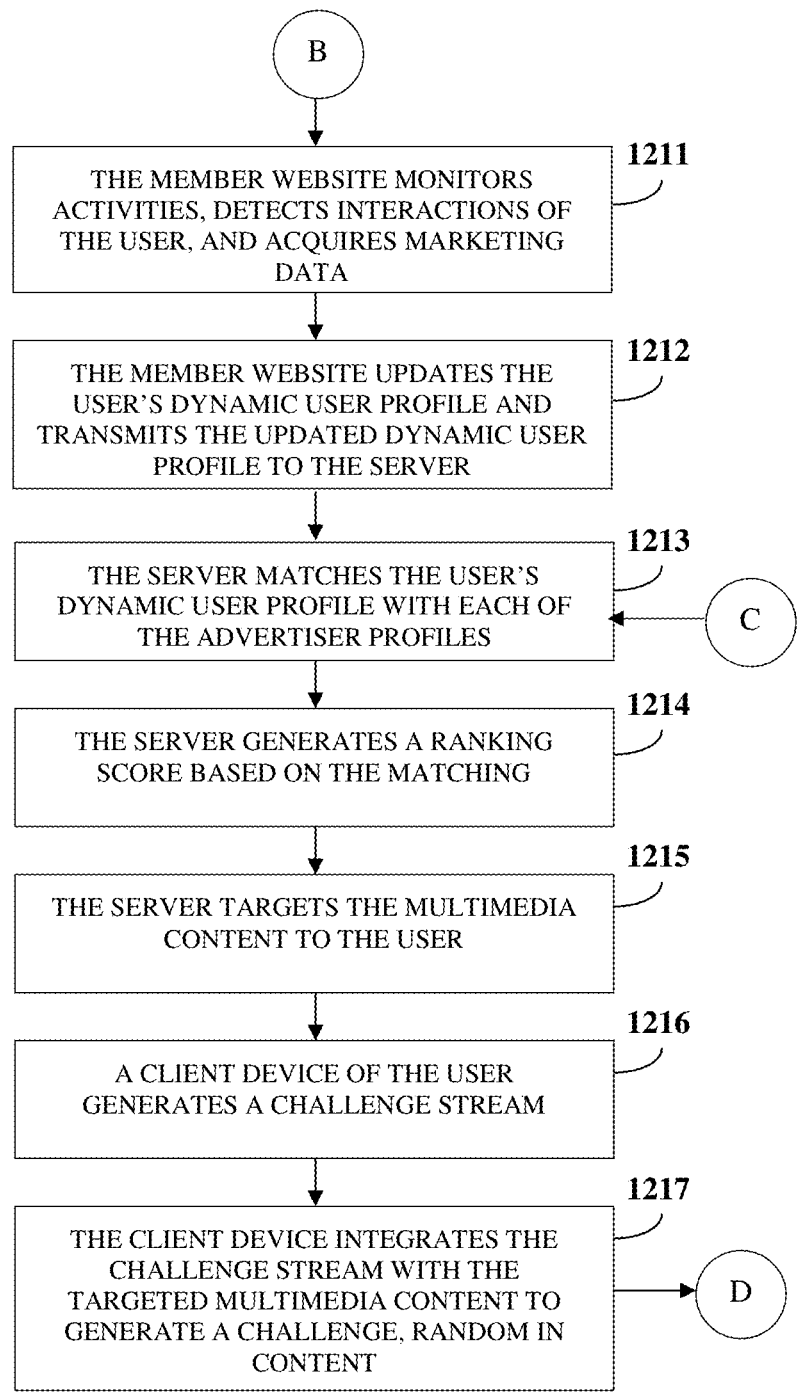
Figure 12C:
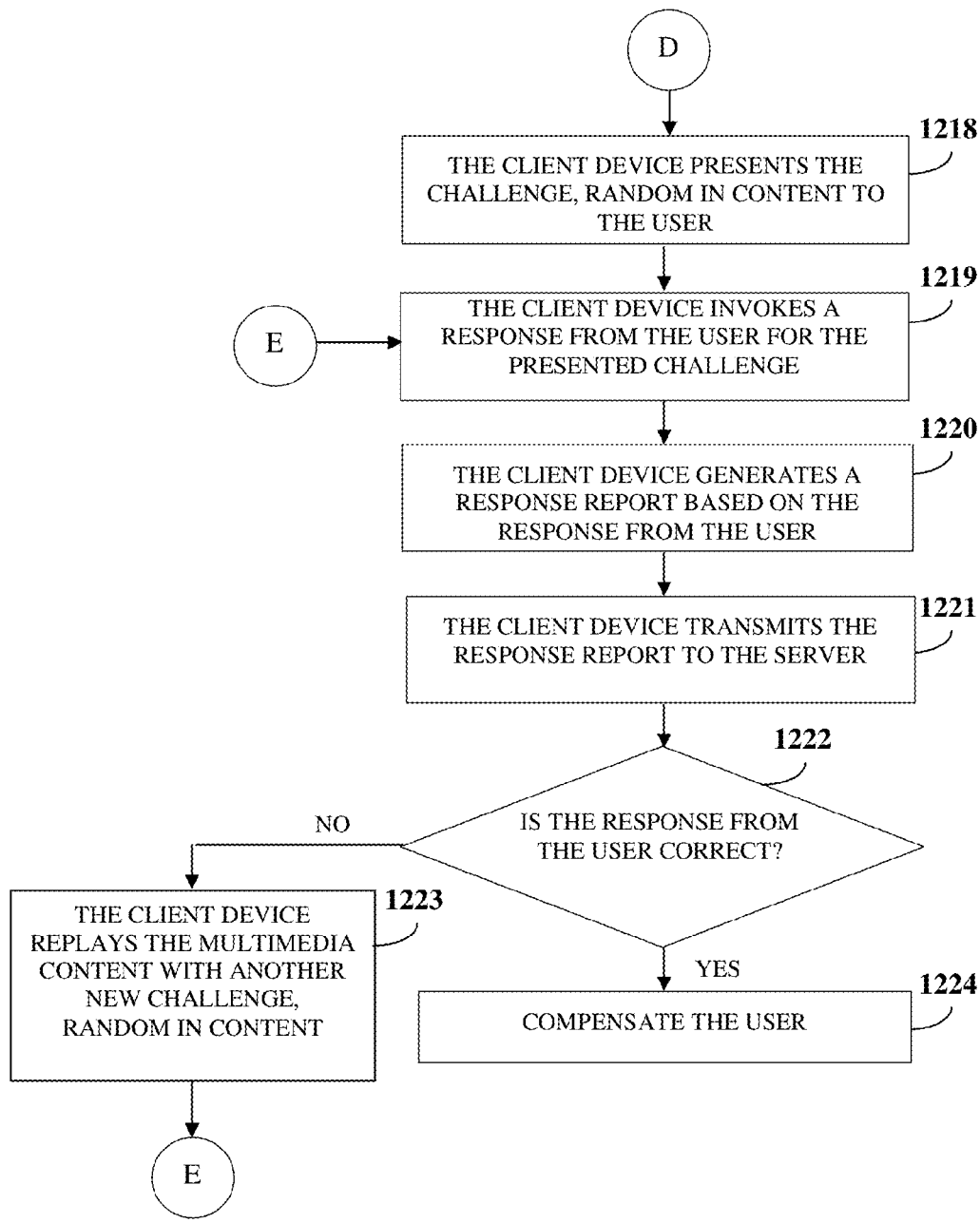

FIGS. 12A-12C exemplarily illustrates a flowchart comprising the steps for dynamically profiling users for incentivized targeting of multimedia content to the users in a networked environment 200. Consider an example where a user visits 1201 a publisher website 203. It is checked 1202 whether the publisher website 203 is a member website 203a. If the publisher website 203 is a non-member website 203b, it is checked 1203 whether the non-member website 203b is associated with the server 201 via a third party advertiser network 205. If the non-member website 203b is not associated with the server 201 via a third party advertiser network 205, the non-member website 203b directly targets 1210 an advertisement to the user. If the non-member website 203b is associated with the server 201 via a third party advertiser network 205, it is checked 1204 whether the user is a member of the user network 204 created by the server 201. If the user is not a member of the user network 204, the non-member website 203b directly targets 1210 an advertisement to the user. If the user is a member of the user network 204, the third party advertiser network 205 connects 1205 with the server 201 via the communication link 1302 exemplarily illustrated in FIG. 13, and proceeds to the steps 1213 to 1224 exemplarily illustrated in FIGS. 12B-12C. If the publisher website 203 is a member website 203a, it is checked 1206 whether the user is a member of the user network 204. If the user is not a member of the user network 204, the user is recruited 1207 to the user network 204 of the server 201 via the member website 203a. If the user is a member of the user network 204, the member website 203a connects 1208 with the server 201 via the communication link 1302. In an embodiment, the member website 203a retrieves 1209 the user's dynamic user profile from the server 201. The member website 203a monitors activities of the user, detects interactions of the user, and acquires 1211 marketing data from the user. The member website 203a then updates 1212 the user's dynamic user profile and transmits 1212 the updated dynamic user profile to the server 201.

The server 201 matches 1213 the user's updated dynamic user profile with each of the advertiser profiles of the advertisers in the advertiser network 202. The server 201 generates 1214 a ranking score for each of the advertisers in the advertiser network 202 based on the matching. The server 201 targets 1215 the multimedia content to the user from the advertiser with the highest ranking score. The challenge generator 1301c on the user's client device 1301 exemplarily illustrated in FIG. 13, generates 1216 a challenge stream. The challenge generator 1301c integrates 1217, that is, combines the challenge stream and the targeted multimedia content in real time to generate a challenge, random in content, in real time for each multimedia content play. The challenge-response module 1301d of the view confirmation module 1301b exemplarily illustrated in FIG. 13, on the client device 1301 presents 1218 the challenge, random in content, to the user, for example, by displaying the challenge, random in content, as an overlay on the multimedia content. The challenge-response module 1301d invokes 1219 a response from the user for the presented challenge. The report generation module 1301e, exemplarily illustrated in FIG. 13, of the view confirmation module 1301b on the client device 1301 generates 1220 a response report based on the response from the user. The client device 1301 transmits 1221 the generated response report to the server 201 confirming that the multimedia content was viewed by the user. The server 201 checks 1222 whether the response from the user to the presented challenge is correct. If the response from the user to the presented challenge is incorrect, the client device 1301 replays 1223 the multimedia content which presents another new challenge, random in content and steps 1219 to 1222 are repeated. If the response from the user to the presented challenge is correct, the server 201 compensates 1224 the user with one or more items of value.

In an embodiment, the users can rate the offers from multiple advertisers, regardless of their purchase behavior. In another embodiment, the advertisers can rate the users that are targeted for their products and services. These ratings then can form a feedback loop for better profiling for both the advertisers and the users. When a user is targeted an advertisement, the user can rate the matching accuracy and desirability of the offer defined in the advertisement. This feedback is useful for dynamically profiling the users and can be used to update the targeting criteria associated with an advertiser. The advertiser can similarly rate the users that are matched to their products and services.

The server 201 acquires ratings from the advertisers in the advertiser network 202 via the communication link 1302 for each match of the created dynamic user profile with the created advertiser profile found during the matching of the created dynamic user profile of each of the users with the created advertiser profile of each of the advertisers. The server 201 determines common characteristics among the users in the user network 204 based on the ratings and updates the targeting criteria using the ratings and the common characteristics for enhanced targeting of the multimedia content to the users in the user network 204. In an example, the server 201 presents an advertiser with an interactive interface 201e, exemplarily illustrated in FIG. 13, that displays, for example, 12 users that have been matched to their product. The server 201 displays the created dynamic user profile of each matched user along with a degree of match. The degree of match is, for example, a numerical value from 0 to 100, where the server 201 considers 100 to be a perfect match. The advertiser may then rate each match, for example, on a scale of 1 to 5 on the interactive interface 201e, where 5 is an excellent match and 1 is a poor match. The server 201 allows the advertiser to rate as many matches as they desire on the interactive interface 201e. The server 201 then utilizes the advertiser's rating of each matched user to adjust the matching degree and therefore the targeting criteria for enhancing future targeting of advertisements to the users.

During registration with the advertiser network 202, the advertiser submits targeting criteria, for example, age, income, location, previous purchases of similar products, etc., for their product or service to the server 201. In an embodiment, the advertiser may also submit an indication of the degree of confidence interval for a match that they deem to be acceptable to the server 201. For example, an advertiser may indicate that they only want matches that are at least 80%—a degree of 80. A higher degree provides better matching but may miss some potential targets, while a lower degree will target the advertisement to more users, but will likely get a lower conversion yield. The server 201 matches the targeting criteria including the degree of confidence interval for a match with the dynamic user profiles stored in the information database 201w and generates a matched set of users. The server 201 renders the dynamic user profiles of the matched set of users to the advertiser for viewing. The advertiser can view specific matching data for an arbitrary number of users and provide a rating based on the rendered matched set of users. The server 201 may then adjust the targeting criteria based on characteristics of the highly rated users and the low rated users specified by the advertiser. Since the targeting criteria submitted by an advertiser is typically a small subset of the total available data for a user, the advertiser ratings enable the server 201 to derive other common characteristics of high and low rated users, not provided in the submitted targeting criteria to further focus the degree ratings for users. The advertiser's ratings therefore enhance the matching and future targeting of advertisements to the users.

In an embodiment, the advertiser also allows the server 201 to rate users based on their behavior and feedback that information into real time targeting. For example, the advertiser indicates that any user who converts a coupon offer is automatically rated as a "5" during submission of targeting criteria to the server 201. The server 201 then determines, for example, through a Bayesian analysis the common characteristics of all the users rated "5", and re-adjusts the targeting criteria based on who was actually converted, compared to who was originally targeted.

FIG. 13 illustrates a computer implemented system 1300 for dynamically profiling users for incentivized targeting of multimedia content to the users in a networked environment 200. The computer implemented system 1300 disclosed herein comprises a server 201 that communicates with a client device 1301 of each of the users, publisher websites 203, and one or more third party advertiser networks 205 via a communication link 1302. The server 201 manages the dynamic profiling of the users and the incentivized targeting of the multimedia content to the users in the networked environment 200. The client device 1301 is in communication with the server 201 via the communication link 1302. The client device 1301 of the user is, for example, a desktop computer, a notebook computer, a tablet computer such as an iPhone® or an iPad® of Apple Inc., a mobile phone device, a personal digital assistant, etc. In an embodiment, the server 201 is, for example, a single server, a hierarchy of servers, a network of servers, etc. The client device 1301 comprises a display screen 1301a, an input means (not shown), a transceiver 1304, a timer 1301f, and a storage module 1301g.

The server 201 comprises at least one processor configured to execute modules 201a, 201b, 201c, 201d, 201e, 201f, 201g, 201h, 201i, 201j, 201k, 201l, 201m, 201n, 201o, 201p, 201q, 201r, 201s, 201t, 201u, 201v, 201w, 1301b, etc., of the server 201. The modules of the server 201 comprises an account creation module 201h, an upload module 201f, a content management module 201k, a network interface 201m, a report receiving module 201a, a media aggregator 201c, a search module 201l, a promotional segment creation module 201j, a random generator 201g, a media database 201d, an advertiser network creation module 201n, a user network creation module 201o, a targeting module 201p, a user profile creation module 201q, an advertiser profile creation module 201r, a payment module 201b, a matching module 201s, a content modification module 201t, a bidding module 201u, a rank generation module 201v, and an information database 201w. The computer implemented system 1300 disclosed herein further comprises a view confirmation module 1301b provided on the client device 1301 and/or the server 201. The publisher websites 203 hosts a user detection module 203c, one or more recommendation engines 203d, the user profile creation module 201q, and the content modification module 201t.

The advertiser network creation module 201n creates an advertiser network 202 comprising multiple advertisers and multiple member websites 203a exemplarily illustrated in FIG. 2. The advertiser network creation module 201n receives the multimedia content, advertising information, and targeting criteria submitted to the server 201 by each of the advertisers via the communication link 1302. The advertiser network creation module 201n provides access to the multimedia content for incentivized targeting across multiple publisher websites 203 in the networked environment 200 exemplarily illustrated in FIG. 2. In an embodiment, the advertiser network creation module 201n associates the non-member websites 203b among the publisher websites 203 with the server 201 via one or more third party advertiser networks 205 associated with the server 201. The third party advertiser networks 205 source the multimedia content from the server 201 into the non-member websites 203b via the communication link 1302 for targeting of the multimedia content to the users in the user network 204.

The user network creation module 201o of the server 201 creates a user network 204 comprising multiple users that are registered on the server 201 and/or recruited from one or more of the publisher websites 203 in the networked environment 200. In an embodiment, the user network creation module 201o automatically recruits a non-member user into the user network 204 when the non-member user registers with one or more of the publisher websites 203. The user network creation module 201o of the server 201 stores a user identifier associated with each of the users in the user network 204 on the client device 1301 of each of the users in the user network 204 for determining whether a user is a member of the user network 204. The user identifier is detectable by the publisher websites 203 and the third party advertiser networks 205 via the communication link 1302 for retrieving a corresponding dynamic user profile of the user for targeting the multimedia content to the user. In an embodiment, the user network creation module 201o of the server 201 registers a user identifier associated with the client device 1301 of each of the users in the user network 204 in the information database 201w. The user identifier is detectable and retrievable by the user detection module 203c of the publisher websites 203 and the third party advertiser networks 205 via the communication link 1302 for determining whether a user is a member of the user network 204.

The user profile creation module 201q, executable by at least one processor, disposed on the server 201 and the publisher websites 203 acquires marketing data from the users in the user network 204 via the communication link 1302 for creating dynamic user profiles for the users in the user network 204. The targeting module 201p targets the multimedia content to the users in the user network 204 via the communication link 1302 based on dynamic user profiles of the users in the user network 204 created by the user profile creation module 201q disposed on the server 201 and/or the publisher websites 203. The multimedia content is sourced from the server 201 to the users in the user network 204 via one or more of the publisher websites 203.

In an embodiment, the user profile creation module 201q monitors activities and detects interactions of the users in the user network 204 across the publisher websites 203 in the networked environment 200 for creation of the dynamic user profiles for the users in the user network 204. The user profile creation module 201q on the publisher websites 203 monitors activities and detects interactions of the users in the user network 204 across the publisher websites 203 in the networked environment 200 for updating the dynamic user profiles of the users in the user network 204 stored in the information database 201w of the server 201 via the communication link 1302. In an embodiment, the user profile creation module 201q integrates the marketing data acquired from the users in the user network 204 into one or more recommendation engines 203d employed by the publisher websites 203 and third party advertiser networks 205 for generating recommendations related to one or more of the products and/or the services of the publisher websites 203 and the third party advertiser networks 205. The advertiser profile creation module 201r creates an advertiser profile for each of the advertisers in the advertiser network 202 based on the multimedia content, the advertising information, and the targeting criteria submitted to the server 201 by each of the advertisers. The information database 201w stores, for example, the advertiser profiles of each of the advertisers in the advertiser network 202, the dynamic user profiles of the users in the user network 204, the user identifier associated with each of the users in the user network 204, the advertising information, the targeting criteria, ratings acquired from the advertisers and the users, etc.

The matching module 201s matches the created advertiser profile of each of the advertisers with the created dynamic user profiles of the users for enabling the targeting module 201p to target the multimedia content to the users in the user network 204 based on the matching. The rank generation module 201v generates a ranking score for each match of the created dynamic user profile with the created advertiser profile found during the matching of the created dynamic user profile of each of the users with the created advertiser profile of each of the advertisers. The targeting module 201p targets the multimedia content to one or more of the users based on the ranking score. The bidding module 201u facilitates bidding among the advertisers in the advertiser network 202 for enabling the targeting module 201p to target the multimedia content of one of the advertisers to one or more of the users in the user network 204. The content modification module 201t executable by at least one processor, disposed on the server 201 and the publisher websites 203 modifies the content displayed on the publisher websites 203 for each of the users in the user network 204 based on the marketing data acquired from each of the users in the user network 204.

In an embodiment, the advertiser profile creation module 201r acquires ratings from the advertisers in the advertiser network 202 via the communication link 1302 for each match of a created dynamic user profile with a created advertiser profile found during the matching of the created dynamic user profile of each of the users with the created advertiser profile for each of the advertisers. The advertiser profile creation module 201r determines common characteristics among the users in the user network 204 based on the ratings and updates the targeting criteria using the ratings and the common characteristics for enhanced targeting of the multimedia content to the users in the user network 204.

The account creation module 201h creates a viewer account for each of the users in the user network 204 for generating viewer credentials. The upload module 201f uploads multimedia content provided by the advertisers on the server 201. The content management module 201k transmits a list of the targeted multimedia content and viewing parameters to the client device 1301 of each of the users in the user network 204 for selection by the user. The viewing parameters comprise a schedule and/or an order of playing the selected multimedia content. The computer implemented system 1300 disclosed herein further comprises an interactive interface 201e for enabling the users to select the viewing parameters and one or more of the multimedia content from the list of multimedia content. The server 201 hosts the interactive interface 201e and provides the interactive interface 201e to each of the users in the user network 204 on the display screen 1301a of the client device 1301 via the communication link 1302. The users enter the selections on the interactive interface 201e using the input means on the client device 1301.

The content management module 201k acquires selections of one or more of the viewing parameters and one or more of the targeted multimedia content from the list of the targeted multimedia content from the users. The content management module 201k transmits the selected multimedia content to each of the users in the user network 204 based on the selected viewing parameters. The selected multimedia content is received and played on the client device 1301 of each of the users based on the selected viewing parameters.

The client device 1301 connects to the server 201 via the communication link 1302 for receiving the multimedia content from the server 201. The storage module 1301g of the client device 1301 stores the selected multimedia content for later viewing or for viewing at a time selected by the users. The multimedia content is played on the display screen 1301a of the client device 1301. The view confirmation module 1301b disposed on the client device 1301 of each of the users in the user network 204 and/or on the server 201, and executable by one or more processors, confirms whether the users in the user network 204 viewed the targeted multimedia content on the server 201 and/or across the publisher web sites 203 in the networked environment 200 using a challenge, random in content. The view confirmation module 1301b comprises a challenge generator 1301c, a challenge-response module 1301d, and a report generation module 1301e. In an embodiment, the challenge generator 1301c generates a challenge, random in content, that is one or more of unrelated to the multimedia content, presented at random times during and/or after the play of the multimedia content, and presented at random physical locations on the multimedia content on the display screen 1301a of the client device 1301. In an embodiment, the challenge generator 1301c also generates a challenge, pseudorandom in content.

In an embodiment, the challenge-response module 1301d presents the generated challenge, random in content, to each of the users on the display screen 1301a of the client device 1301 by overlaying the generated challenge, random in content, on the multimedia content. In another embodiment, the challenge-response module 1301d presents one or more challenges, random in content, to the users on the display screen 1301a of the client device 1301 by interrupting the play of the selected multimedia content and inserting the generated challenge, random in content, in and/or around the selected multimedia content. The challenge-response module 1301d presents one or more challenges, random in content, at one or more times during and/or after the multimedia content are played. The timer 1301f counts an interrupt time period for interrupting the playing of the multimedia content and presenting the challenge, random in content, where the interrupt time period is less than duration of the multimedia content. The random generator 201g generates the interrupt time period for interrupting the playing of the selected multimedia content and presenting the challenge, random in content.

In an embodiment, the challenge-response module 1301d invokes a response from each of the users for the presented challenge, random in content. Each user enters the response to the presented challenge, random in content using the input means on the client device 1301. The timer 1301f ensures that each of the users provide the response to the challenge, random in content, within the predetermined period of time after the challenge, random in content, is presented. The challenge-response module 1301d determines whether the users entered a response for the presented challenge, random in content. The response confirms that the multimedia content was viewed by the users. In an embodiment, the challenge-response module 1301d in the client device 1301 determines whether the response entered by the users to the presented challenge, random in content, is correct. In another embodiment, the response entered by the users is relayed to the view confirmation module 1301b on the server 201 over the communication link 1302, which determines whether the response provided is correct. A correct response confirms that the multimedia content was viewed by the users. The report generation module 1301e generates a response report based on the response from the users and transmits the response report to the server 201. The view confirmation module 1301b on the server 201 may also generate the response report in the online mode.

In an embodiment, the challenge generator 1301c generates a challenge stream comprising multiple challenges. The content of each challenge in the challenge stream is random. The challenge-response module 1301d integrates the challenge stream and a stream of targeted multimedia content in real time to generate the challenge, random in content, in real time for the targeted multimedia content. The challenge is random in content each time the same multimedia content is played on the client device 1301 of each of the users. The challenge-response module 1301*d* presents the challenge, random in content to the users, for example, by overlaying the challenge, random in content, on the targeted multimedia content or by interrupting the play of the targeted multimedia content after an interrupt time period to confirm that the users viewed the multimedia content played on the display screen 1301*a* of each client device 1301. The interrupt time period is less than duration of the targeted multimedia content. The challenge-response module 1301*d* invokes a response from each of the users for the presented challenge, random in content. The challenge-response module 1301*d* determines whether the response is entered by each of the users for the presented challenge, random in content, to confirm viewing of the targeted multimedia content by each of the users. The report generation module 1301*e* generates a response report based on the response from each of the users.

In an embodiment, the challenge-response module 1301*d* in the view confirmation module 1301*b* presents a challenge, random in content, by briefly overlaying the challenge, random in content, on the multimedia content being played. The challenge-response module 1301*d* invokes a response from each of the users for the challenge, random in content. In an embodiment, the server 201 comprises the view confirmation module 1301*b* either in addition to or as a substitute for the challenge-response module 1301*d* on the client device 1301. The report receiving module 201*a* receives the response report transmitted by the client device 1301. The payment module 201*b* in communication with the report receiving module 201*a* generates and maintains a monetary credit for the users based on the response report.

The challenge-response module 1301*d* presents one or more challenges, random in content, at one or more times during and/or after play of the targeted multimedia content. The challenge-response module 1301*d* transfers a response to each challenge, random in content, from each of the users to one or more random locations on the display screen 1301*a* of the client device 1301 or on a multimedia player frame 2002, exemplarily illustrated in FIG. 20, within the display screen 1301*a* of the client device 1301 during the play of the targeted multimedia content. The challenge-response module 1301*d* automatically registers each transferred response of each of the users on the display screen 1301*a* or the multimedia player frame 2002 at the end of play of the targeted multimedia content as disclosed in the detailed description of FIG. 10. The timer 1301*f* counts an interrupt time period for interrupting the playing of the multimedia content and presenting the challenge, random in content, where the interrupt time period is less than the duration of the multimedia content.

The client device 1301 may also download a client software module, for example, a view confirmation module 1301*b* over the communication link 1302 for making service requests to the server 201, while the server 201 addresses the service requests. The client device 1301 comprises a transceiver 1304 that connects the client device 1301 to the server 201 via the communication link 1302. In the case of a cellular client device 1301, the transceiver 1304 communicates with the server 201 via a cellular communication network 1303. The input means of the client device 1301 accepts a selection of the multimedia content and the viewing parameters from the users. The client device 1301 is capable of downloading, storing, and rendering multimedia content of one or more formats obtained from the server 201. The multimedia content, incorporating the challenge-response mechanism, may also be transmitted through the communication link 1302 and rendered on a web browser in an internet enabled client device 1301 or mobile phone as streaming multimedia content. The multimedia content may also be distributed to televisions via integrated receivers/decoders or set top boxes and viewed through interactive television. In an example, the multimedia content is made available in an interactive group setting or multi-viewer environment, such as a focus group, for viewing the multimedia content, discussing, testing, or any other purposes.

In an embodiment, the same multimedia content is broadcasted simultaneously to multiple client devices 1301 over the communication link 1302, for example, a television network or a cellular communication network 1303 using a general packet radio service (GPRS), etc. Each of the client devices 1301 receiving the broadcasted multimedia content autonomously integrates a challenge, random in content from the challenge stream generated locally by the challenge generator 1301*c* in the client device 1301 in real time, and renders the multimedia content along with the challenge overlay. Consider an example where multimedia content is broadcast to multiple client devices 1301. In this example, even if the same multimedia content is displayed on two or more different client devices 1301, different challenges, wherein each challenge is random in content, are presented on the client devices 1301 along with multimedia content, because the challenges, random in content are generated locally by the challenge generator 1301*c* in each of the client devices 1301. Accordingly, each of the users receiving the broadcasted multimedia content experiences a challenge-response interaction different from the other users of the same multimedia content.

The search module 201*l* on the server 201 enables the users to search for the multimedia content on the server 201. In an embodiment, the client device 1301 downloads the multimedia content when the client device 1301 is connected to the server 201. If eventually the users launch the view confirmation module 1301*b* when the connection to the server 201 is inactive, the client device 1301 renders the downloaded multimedia content in an off-line mode, performs a challenge-response interaction with the users, and generates and stores the response report. The off-line mode is triggered when the connection to the server 201 is inactive. When a connection to the server 201 is established, for example, via satellite, a mobile wireless connection, the communication link 1302, etc., the response report is transmitted to the server 201 over the connection. In another embodiment, the client device 1301 renders the multimedia content transmitted by the server 201 as streaming multimedia content. If the users launch the view confirmation module 1301*b* when the connection to the server 201 is active, the client device 1301 renders the multimedia content in an online mode. In an embodiment, the challenge-response interaction with each of the users is performed by the view confirmation module 1301*b* on the server 201. The response report generated after completing the challenge-response interaction is transmitted to the server 201 over the active connection. The view confirmation module 1301*b* on the server 201 also generates the response report in the online mode.

The payment module 201*b* compensates the users in the user network 204 by crediting the users in the user network 204 with one or more items of value based on confirmation of viewing of the targeted multimedia content by the users. In an embodiment, the payment module 201*b* is disposed on the publisher websites 203 for compensating the users in the user network 204 by crediting the users in the user network 204 with one or more items of value based on confirmation of viewing of the multimedia content. In an embodiment, the payment module 201*b* routes the items of value to predetermined organizations specified by the users via the communication link 1302. In another embodiment, the payment module 201b enables redemption of the items of value across the server 201, the advertiser network 202, and external websites in the networked environment 200.

In an embodiment, the payment module 201b credits the users with the items of value and debits a fee from the multimedia content owner, for example, the advertiser, if the response report confirms that the multimedia content was viewed by each of the users. In an embodiment, the payment module 201b compensates each of the users by allowing premium multimedia content to play, if the response report confirms that the multimedia content was viewed by each of the users. In another embodiment, the payment module 201b credits each of the users with the items of value and debits a fee from the multimedia content owner for each correct response that each of the users provide to one or more of the presented challenges, random in content. In another embodiment, the payment module 201b distributes revenues generated from fees obtained from the multimedia content owners, registration fees, etc., to the users as items of value.

In an embodiment, the account creation module 201h also creates an e-wallet 201i associated with the viewer account for accruing the items of value over a period of time. The payment module 201b deposits the item of values into the e-wallet 201i and debits a fee from a multimedia content owner, if the response report confirms the targeted multimedia content was viewed by the users.

The promotional segment creation module 201j creates and inserts an interactive promotional segment within the selected multimedia content. The interactive promotional segment directs each of the users in the user network 204 to an e-commerce platform where the users can purchase products and services associated with or not related to the selected multimedia content.

The server 201 transmits multimedia content to each of the users in the user network 204 either on request or automatically. The media database 201d stores several multimedia content files in different formats, and is updated after every cycle of production of the multimedia content. The multimedia content stored in the media database 201d comprises audio, video, internet web pages, interactive games and applications, and other playable formats. The media aggregator 201c queries the media database 201d and prepares a list of multimedia content available for distribution over the communication link 1302. The network interface 201m connects the server 201 to the communication link 1302, for example, the internet, a wireless network, or a wired network. The server 201 also comprises media encoders for encoding the multimedia content for storing and on-demand streaming. The information database 201w stores information of each of the users, the viewer credentials, preferences of the users, locations of the multimedia content, the viewing parameters, etc.

In another embodiment, the server 201 stores information regarding viewing behavior of the users in the information database 201w. The server 201 extracts data regarding the viewing behavior of the users from the stored information and determines the list of multimedia content that a user is likely to view. The server 201 then transmits the determined list of multimedia content to each of the users and one or more viewing parameters for selection.

The server 201 may periodically notify the users of the available multimedia content, for example, advertisements, including the amount payable to the users for viewing each advertisement. The server 201 also notifies the users of the available advertisements upon request of the users. For example, the server 201 periodically transmits short message service (SMS) messages to the client device 1301, for example, a cellular phone of a user. In another example, the server 201 may notify the users by broadcasting unstructured supplementary service data (USSD) messages. Upon the request of the users, the server 201 may transmit an updated list of multimedia content to the client device 1301 for selection and viewing by the users.

In an embodiment, the server 201 further comprises a registration facility whereby a user, that is, a potential viewer registers the client device 1301 for the media service. During the registration process, the user is requested to submit the unique identifier of the client device 1301, an identity of the user, and optionally a password or a personal identification number (PIN) for authentication, and a credit account number. After completing the registration process, a user identifier (ID) and suitable software module, for example, the view confirmation module 1301b is supplied to the client device 1301 of the user. The view confirmation module 1301b is executed for programming the client device 1301 of the user, whereby the client device 1301 is rendered capable of establishing a client-server relationship with the server 201.

In an example, the users request the server 201 to access the service through the client device 1301. The server 201 verifies whether the users are authenticated to access the service by requesting the user identifier supplied during registration, and transmits multimedia content to the client device 1301 for selection. If the server 201 fails to authenticate the users, the server 201 prompts the users to undergo the registration process. The users may choose to continue with the registration process or terminate the connection to the server 201. After the users are authenticated, the client device 1301 receives the multimedia content. The client device 1301 launches the view confirmation module 1301b and the display screen 1301a presents a menu with options for displaying the list of multimedia content including the monetary amount payable to the users for viewing each multimedia content item in the list. Each of the users select a desired multimedia content item using the menu, and the selected multimedia content item is played to each of the users. The challenge-response module 1301d presents the challenge, random in content, and invokes a response during or after the multimedia content is played.

The report generation module 1301e generates a response report with report details based on the response received from the users. The client device 1301 verifies whether the connection to the server 201 is active, and transmits the response report to the server 201. The report receiving module 201a receives the response report and instructs the payment module 201b to credit the users' e-wallet 201i associated with the user account, for example, with a designated amount of money, points or other items of value. If the connection to the server 201 is temporarily unavailable, the response report is temporarily stored in the storage module 1301g of the client device 1301, and transmitted when the connection is available again. The recently viewed multimedia content is deleted from the list, and the list of available multimedia content is updated and displayed again on the client device 1301 for repeating the steps described above. Alternatively, each of the users may choose to terminate the view confirmation module 1301b at this point by selecting an exit option from the menu.

Figure 14:
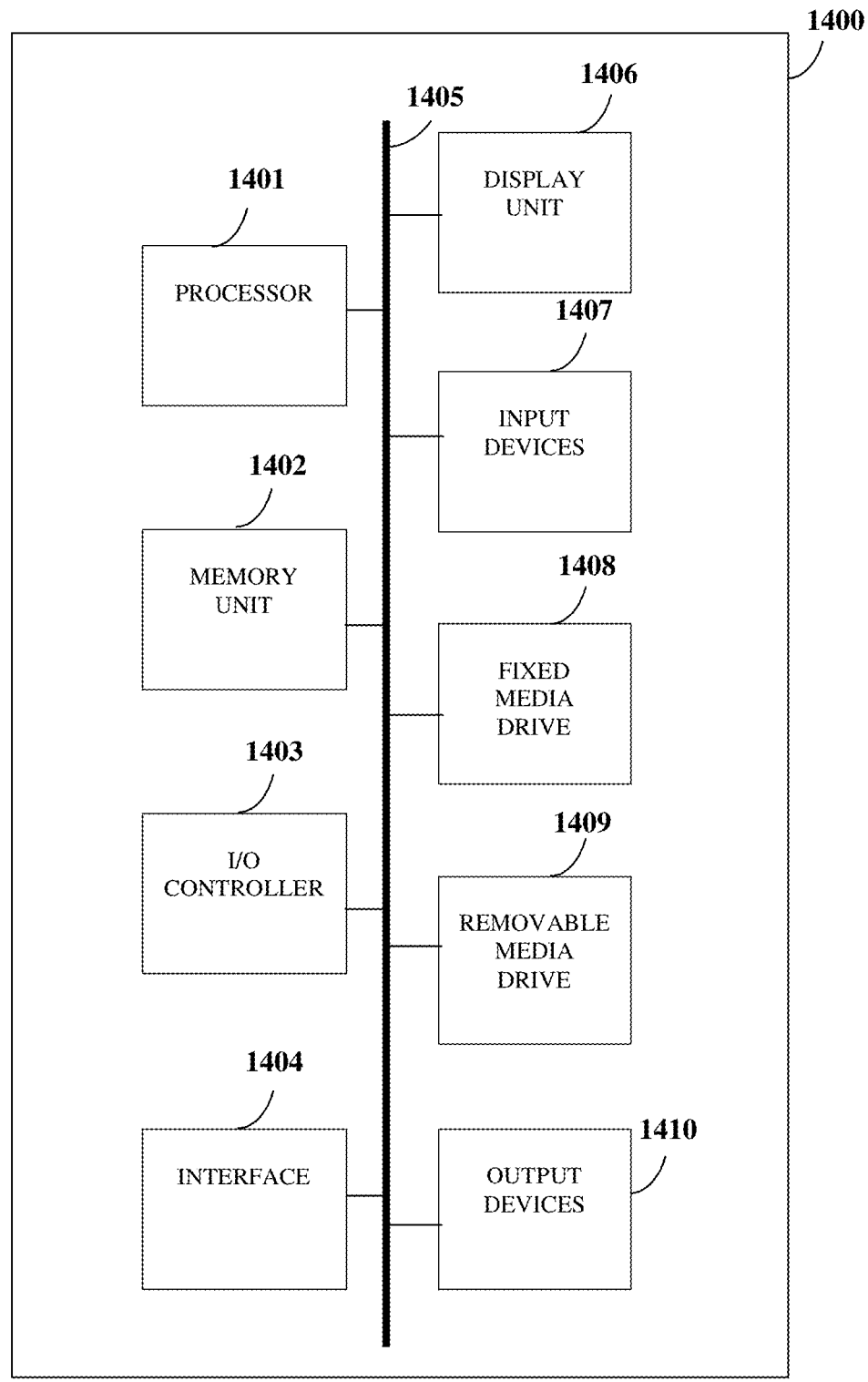
FIG. 14 exemplarily illustrates the architecture of a computer system employed on each of a client device and the server for dynamically profiling users for incentivized targeting of multimedia content to the users in a networked environment.
Figure 15A:
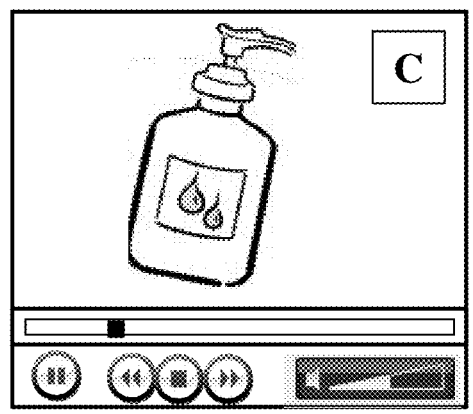
FIGS. 15A-15D exemplarily illustrate screenshots for a video advertisement campaign.
Figure 15B:
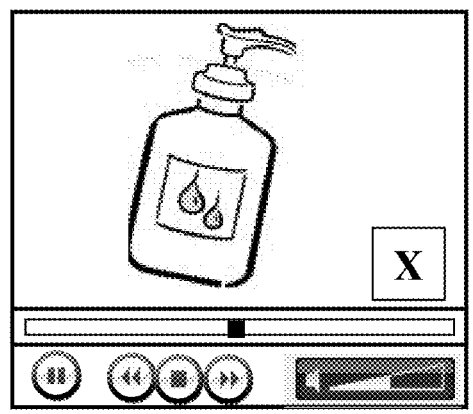
Figure 15C:
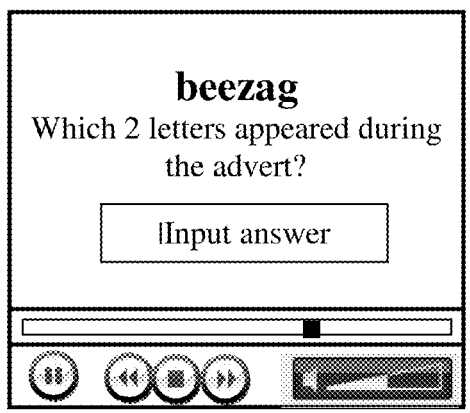
Figure 15D:
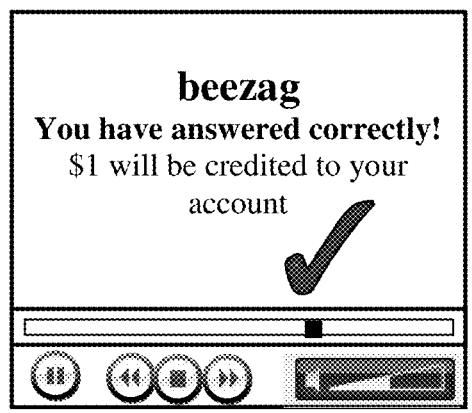
Figure 16A:
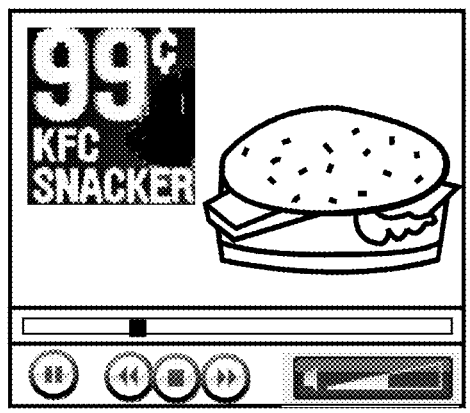
FIGS. 16A-16D exemplarily illustrate screenshots for a video advertisement campaign.
Figure 16B:
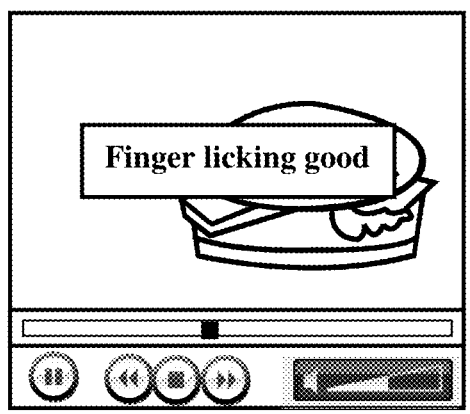
Figure 16C:
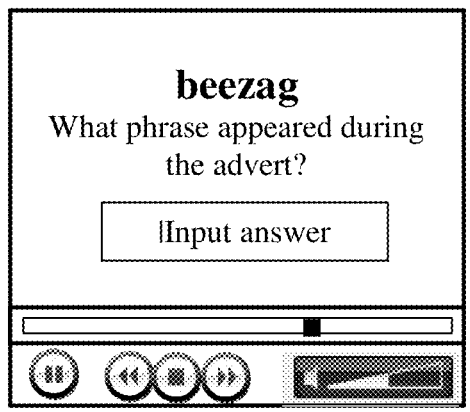
Figure 16D:
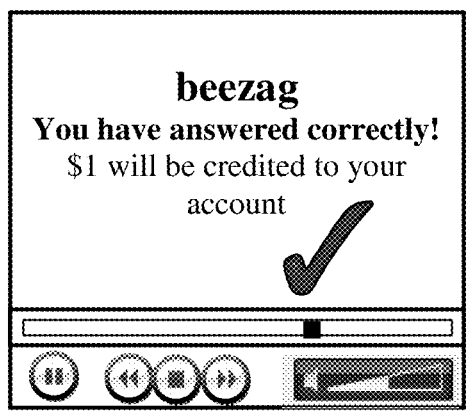
Figure 17A:
FIGS. 17A-17D exemplarily illustrate screenshots of a training video for managers.
Figure 17B:
Figure 17C:
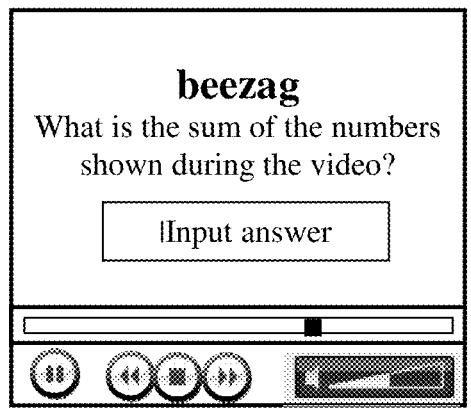
Figure 17D:
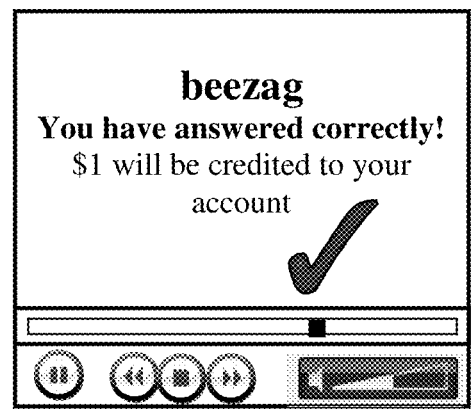
Figure 18A:
FIGS. 18A-18D exemplarily illustrate screenshots for an iPhone® application and a coupon offer.
Figure 18B:
Figure 18C:
Figure 18D:
Figure 19A:
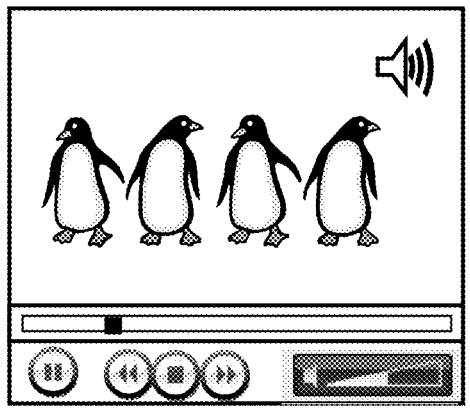
FIGS. 19A-19D exemplarily illustrate screenshots for a video advertisement campaign.
Figure 19B:
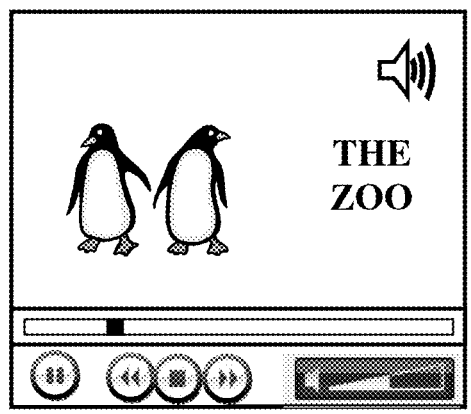
Figure 19C:
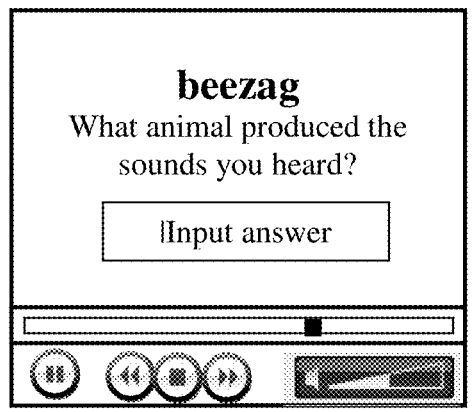
Figure 19D:
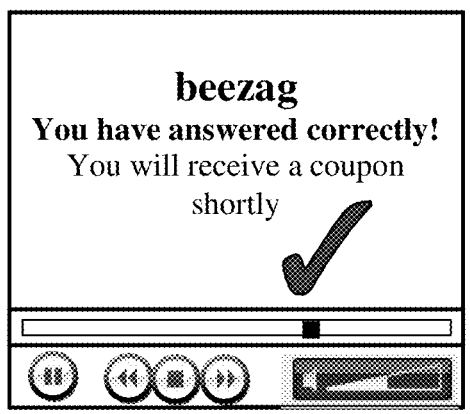

FIG. 14 exemplarily illustrates the architecture of a computer system 1400 employed each of the client device 1301 and the server 201 for dynamically profiling users for incentivized targeting multimedia content to the users in the networked environment 200. The client device 1301, the server 201, and the publisher websites 203 of the computer implemented system 1300 exemplarily illustrated in FIG. 13 employ the architecture of the computer system 1400 exemplarily illustrated in FIG. 14. The computer system 1400 comprises, for example, a processor 1401, a memory unit 1402 for storing programs and data, an input/output (I/O) controller 1403, an interface 1404, a data bus 1405, a display unit 1406, input devices 1407, a fixed media drive 1408, a removable media drive 1409 for receiving removable media, output devices 1410, etc.

The processor 1401 is an electronic circuit that executes computer programs. The memory unit 1402 stores programs, applications, and data. For example, the report receiving module 201a, the payment module 201b, the upload module 201f, the random generator 201g, the account creation module 201h, the promotional segment creation module 201j, the content management module 201k, the search module 201l, the advertiser network creation module 201n, the user network creation module 201o, the targeting module 201p, the user profile creation module 201q, the advertiser profile creation module 201r, the matching module 201s, the content modification module 201t, the bidding module 201u, and the rank generation module 201v of the server 201 are stored in the memory unit 1402 of the computer system 1400. Moreover, the view confirmation module 1301b is stored in the memory unit 1402 of the computer system 1400 of the server 201 and the client device 1301. Furthermore, the user detection module 203c, the user profile creation module 201q, and the content modification module 201t of the publisher websites 203 are stored in the memory unit 1402 of the computer system 1400 of the publisher websites 203. The memory unit 1402 is, for example, a random access memory (RAM) or another type of dynamic storage device that stores information and instructions for execution by the processor 1401. The memory unit 1402 also stores temporary variables and other intermediate information used during execution of the instructions by the processor 1401. The computer system 1400 further comprises a read only memory (ROM) or another type of static storage device that stores static information and instructions for the processor 1401. The computer system 1400 executes the view confirmation module 1301b.

The interface 1404 or 201m enables connection of the computer system 1400 to the communication link 1302. The interface 1404 or 201m comprises, for example, an infrared (IR) interface, an interface that implements Wi-Fi® of the Wireless Ethernet Compatibility Alliance, Inc., a universal serial bus (USB) interface, a local area network (LAN) interface, a wide area network (WAN) interface, etc. The I/O controller 1403 controls the input and output actions performed by the computer system 1400. The data bus 1405 permits communication between the modules, for example, 201a, 201b, 201c, 201d, 201e, 201f, 201g, 201h, 201i, 201j, 201k, 201l, 201m, 201n, 201o, 201p, 201q, 201r, 201s, 201t, 201u, 201v, 201w, etc., of the server 201, between the modules, for example, 201q, 201t, 203c, 203d, etc., of the publisher websites 203, and between the modules 1301b, 1301g, etc., of the client device 1301.

The display unit 1406 displays, via the display screen 1301a, the multimedia content, the challenges random in content, etc., and other results computed by the client device 1301, the server 201, and the publisher websites 203 to the users. The input devices 1407 are used for inputting data into the computer system 1400. The computer system 1400 further comprises one or more input devices 1407, for example, a keyboard such as an alphanumeric keyboard, a joystick, a computer mouse, a touch pad, a light pen, a digital pen, a microphone, a digital camera, etc. The output devices 1410 output the results of operations performed by the server 201.

Computer applications and programs are used for operating the computer system 1400. The programs are loaded onto the fixed media drive 1408 and into the memory unit 1402 of the computer system 1400 via the removable media drive 1409. In an embodiment, the computer applications and programs may be loaded directly via the communication link 1302. Applications are executed by double clicking a related icon or menu displayed on the display unit 1406 using the computer mouse or through other input devices 1407. For example, a user initiates the execution of the view confirmation module 1301b by double clicking on the icon for the view confirmation module 1301b on the display unit 1406 or the execution of the view confirmation module 1301b is automatically initiated on transmitting multimedia content to the view confirmation module 1301b.

The computer system 1400 employs an operating system for performing multiple tasks. The operating system is responsible for the management and coordination of activities and the sharing of the resources of the computer system 1400. The operating system further manages security of the computer system 1400, peripheral devices connected to the computer system 1400, and network connections. The operating system employed on the computer system 1400 recognizes, for example, inputs provided by a user or administrator of the server 201 using one of the input devices 1407, the output display, files, and directories stored locally on the fixed media drive 1408, for example, a hard drive. Different programs, for example, a web browser, an electronic mail (email) application, etc., initiated by the users are executed by the operating system with the help of the processor 1401. The operating system monitors the use of the processor 1401. The operating system on the computer system 1400 executes different modules initiated by the client device 1301 and the server 201 using the processor 1401. The operating system on the computer system 1400 executes different programs using the processor 1401.

The processor 1401 retrieves the instructions for executing the modules, for example, 201a, 201b, 201c, 201d, 201e, 201f, 201g, 201h, 201i, 201j, 201k, 201l, 201m, 201n, 201o, 201p, 201q, 201r, 201s, 201t, 201u, 201v, 201w, 1301b, etc., of the server 201, the modules, for example, 201q, 201t, 203c, etc., of the publisher websites 203, and the modules 1301b, 1301g, etc., of the client device 1301. A program counter determines the location of the instructions in the memory unit 1402. The program counter stores a number that identifies the current position in the program of the modules, for example, 201a, 201b, 201c, 201d, 201e, 201f, 201g, 201h, 201i, 201j, 201k, 201l, 201m, 201n, 201o, 201p, 201q, 201r, 201s, 201t, 201u, 201v, 201w, 1301b, etc., of the server 201, the modules, for example, 201q, 201t, 203c, etc., of the publisher websites 203, and the modules 1301b, 1301g, etc., of the client device 1301.

The instructions fetched by the processor 1401 from the memory unit 1402 after being processed are decoded. The instructions are placed in an instruction register in the processor 1401. After processing and decoding, the processor 1401 executes the instructions. For example, the account creation module 201h defines instructions for creating the user account for generating viewer credentials. The account creation module 201h further defines instructions for creating the e-wallet 201i associated with the viewer account, that accrues one or more items of value over a period of time. The upload module 201f defines instructions for uploading the multimedia content on the server 201.

The advertiser network creation module 201n defines instructions for creating an advertiser network 202 comprising multiple advertisers and multiple member websites 203a. The advertiser network creation module 201n also defines instructions for receiving the multimedia content, advertising information, and targeting criteria submitted to the server 201 by each of the advertisers via the communication link 1302. The advertiser network creation module 201n also defines instructions for providing access to the multimedia content for incentivized targeting across multiple publisher websites 203 in the networked environment 200. The advertiser network creation module 201n also defines instructions for associating the non-member websites 203b among the publisher websites 203 with the server 201 via one or more third party advertiser networks 205 associated with the server 201.

The user network creation module 201o defines instructions for creating a user network 204 comprising multiple users that are registered on the server 201 and/or recruited from one or more of the publisher websites 203 in the networked environment 200. The user network creation module 201o further defines instructions for automatically recruiting a non-member user into the created user network 204 when the non-member user registers with one or more of the publisher websites 203. The user network creation module 201o of the server 201 defines instructions for storing a user identifier associated with each of the users in the user network 204 on the client device 1301 of each of the users in the user network 204 for determining whether a user is a member of the user network 204. The user identifier is detectable by the publisher websites 203 and one or more third party advertiser networks 205 via the communication link 1302 for retrieving a corresponding dynamic user profile of the user for targeting the multimedia content to the user. The user network creation module 201o of the server 201 further defines instructions for registering a user identifier associated with the client device 1301 of each of the users in the user network 204 in the information database 201w. The user identifier is detectable and retrievable by the user detection module 203c of the publisher websites 203 and the third party advertiser networks 205 via the communication link 1302 for determining whether a user is a member of the user network 204.

The user profile creation module 201q defines instructions for acquiring marketing data from the users in the user network 204 via the communication link 1302 for creating dynamic user profiles for the users in the user network 204. The user profile creation module 201q also defines instructions for monitoring activities and detecting interactions of the users in the user network 204 across the publisher websites 203 in the networked environment 200 for the creation of the dynamic profiles for the users in the user network 204. The user profile creation module 201q also defines instructions for integrating the marketing data acquired from the users in the user network 204 into one or more recommendation engines 203d employed by the publisher websites 203 and one or more third party advertiser networks 205 for generating recommendations related to one or more products and/or services of the publisher websites 203 and the third party advertiser networks 205. The advertiser profile creation module 201r defines instructions for creating an advertiser profile for each of the advertisers in the advertiser network 202 based on the multimedia content, the advertising information, and the targeting criteria submitted to the server 201 by each of the advertisers. The matching module 201s defines instructions for matching the created advertiser profile of each of the advertisers with the created dynamic user profiles of the users for enabling the targeting module 201p to target of the multimedia content to the users in the user network 204 based on the matching. The rank generation module 201v defines instructions for generating a ranking score for each match of the created dynamic user profile with the created advertiser profile found during the matching of the created dynamic user profile of each of the users with the created advertiser profile of each of the advertisers, where the targeting module 201p defines instructions for targeting the multimedia content to one or more of the users based on the ranking score. The targeting module 201p defines instructions for targeting the multimedia content to the users in the user network 204 via the communication link 1302 based on dynamic user profiles of the users in the user network 204 created by a user profile creation module 201q disposed on the server 201 and/or one or more of the publisher web sites 203.

In an embodiment, the advertiser profile creation module 201r defines instructions for acquiring ratings from the advertisers in the advertiser network 202 via the communication link 1302 for each match of a created dynamic user profile with a created advertiser profile found during the matching of the created dynamic user profile of each of the users with the created advertiser profile for each of the advertisers. The advertiser profile creation module 201r defines instructions for determining common characteristics among the users in the user network 204 based on the ratings and for updating the targeting criteria using the ratings and the common characteristics for enhanced targeting of the multimedia content to the users in the user network 204.

The media aggregator 201c defines instructions for querying the media database 201d and preparing a list of multimedia content available for distribution over the communication link 1302. The content management module 201k defines instructions for transmitting a list of multimedia content and viewing parameters to the client device 1301 of each of the users in the user network 204 for selection. The content management module 201k defines instructions for acquiring selections of one or more of the viewing parameters and one or more of the targeted multimedia content from the list of targeted multimedia content from the users. The content management module 201k defines instructions for streaming or transmitting the selected multimedia content to the client device 1301 based on the selected viewing parameters. The content modification module 201t defines instructions for modifying content displayed on the publisher websites 203 for each of the users in the user network 204 based on the marketing data acquired from each of the users in the user network 204. The search module 201l defines instructions for searching for the multimedia content on the server 201. The storage module 1301g on the client device 1301 defines instructions for storing the selected multimedia content for later viewing. The promotional segment creation module 201j defines instructions for creating and inserting an interactive promotional segment within the multimedia content. The bidding module 201u defines instructions for facilitating bidding among the advertisers in the advertiser network 202 for enabling the targeting module 201p to target the multimedia content of one of the advertisers to one or more of the users in the user network 204.

The view confirmation module 1301b disposed on the server 201 and/or the client device 1301 defines instructions for the challenge generator 1301c, the challenge-response module 1301d, and the report generation module 1301e. The multimedia content is transferred from the media database 201d to the view confirmation module 1301b through the interface 201m or 1404 and via the communication link 1302. The view confirmation module 1301b defines instructions for confirming whether the users in the user network 204 viewed the multimedia content on the server 201 and/or across the publisher websites 203 in the networked environment 200 using a challenge, random in content. The challenge generator 1301c defines instructions for generating a challenge, random in content, that is one or more of unrelated to the targeted multimedia content, presented at random times during and/or after the play of the targeted multimedia content, and presented at random physical locations on the targeted multimedia content.

The random generator 201g defines instructions for generating the interrupt time period for interrupting the playing of the selected multimedia content and presenting the challenge, random in content. The challenge-response module 1301d defines instructions for presenting the generated challenge, random in content, to each of the users on the display screen 1301a of the client device 1301 by overlaying the generated challenge, random in content, on the multimedia content or inserting the generated challenge, random in content, on interruption of the play of the selected multimedia content. The challenge-response module 1301d defines instructions for presenting one or more challenges, random in content, at one or more times during and/or after the playing of multimedia content and for invoking a response from each of the users for the presented challenge, random in content. The challenge-response module 1301d further defines instructions for determining whether each of the users entered a response for the presented challenge, random in content, to confirm that the users have viewed the selected multimedia content.

The challenge generator 1301c also defines instructions for generating a challenge stream comprising multiple challenges, where the content of each challenge in the challenge stream is random. The challenge-response module 1301d defines instructions for integrating the challenge stream and a stream of the targeted multimedia content in real time to generate the challenge, random in content, in real time for the targeted multimedia content, where the challenge is random in content each time the same multimedia content is played on the client device 1301. The challenge-response module 1301d also defines instructions for presenting the challenge, random in content, to each of the users by displaying the challenge, random in content, as an overlay on the targeted multimedia content. The challenge-response module 1301d also defines instructions for presenting the challenge, random in content, to the users to confirm that the users viewed the targeted multimedia content played on the display screen 1301a of the client device 1301, by overlaying the challenge, random in content, on the targeted multimedia content or interrupting the play of the targeted multimedia content after an interrupt time period. The challenge-response module 1301d also defines instructions for invoking a response from each of the users for the presented challenge, random in content, and for determining whether the response is entered by each of the users for the presented challenge, random in content, to confirm the viewing of the targeted multimedia content by each of the users. The report generation module 1301e defines instructions for generating a response report based on the response from the users. In an embodiment, the report receiving module 201a of the server 201 defines instructions for receiving the response report from the client device 301 via the communication link 1302.

The challenge-response module 1301d also defines instructions for presenting one or more challenges, random in content, at one or more times during and/or after play of the targeted multimedia content. The challenge-response module 1301d also defines instructions for transferring a response to each of the challenges, random in content, from each of the users to one or more random locations on the display screen 1301a of the client device 1301 or on a multimedia player frame 2002 within the display screen 1301a of the client device 1301 exemplarily illustrated in FIG. 20, during the play of the targeted multimedia content, and for automatically registering each response of each of the users on the display screen 1301a or the multimedia player frame 2002 within the display screen 1301a of the client device 1301 at the end of play of the targeted multimedia content.

The payment module 201b by itself, or in an embodiment, in communication with the report receiving module 201a defines instructions for compensating the users by crediting the users in the user network 204 with one or more items of value based on confirmation of viewing of the multimedia content by each of the users. The payment module 201b of the server 201 defines instructions for crediting the users with items of value and debiting a fee from the multimedia content owner, if the response report confirms the multimedia content was viewed by the users. The payment module 201b also defines instructions for routing the items of value to predetermined organizations specified by the users via the communication link 1302 and for enabling redemption of the items of value across the server 201, the advertiser network 202, and external websites in the networked environment 200. The media database 201d defines instructions for the multimedia content. The information database 201w defines instructions for storing information of the users, the viewer credentials, preferences of the users, locations of the multimedia content, the viewing parameters, the advertiser profiles of each of the advertisers in the advertiser network 202, the dynamic user profiles of the users in the user network 204, the user identifier associated with each of the users in the user network 204, etc.

The defined instructions are stored in the memory unit 1402 or received from a remote server. The processor 1401 of the computer system 1400 employed by the client device 1301 retrieves the instructions defined by the challenge generator 1301c, the challenge-response module 1301d, and the report generation module 1301e in the view confirmation module 1301b, and the storage module 1301g and executes the instructions. The processor 1401 of the computer system 1400 employed by the server 201 retrieves the instructions defined by the report receiving module 201a, the payment module 201b, the media aggregator 201c, the media database 201d, the upload module 201f, the random generator 201g, the account creation module 201h, the promotional segment creation module 201j, the content management module 201k, the search module 201l, the advertiser network creation module 201n, the user network creation module 201o, the targeting module 201p, the user profile creation module 201q, the advertiser profile creation module 201r, the matching module 201s, the content modification module 201t, the bidding module 201u, the rank generation module 201v, the information database 201w, and the modules 1301c, 1301d, and 1301e of the view confirmation module 1301b, and executes the instructions. The processor 1401 of the computer system 1400 employed by the publisher websites 203 retrieves the instructions defined by the user detection module 203c, the user profile creation module 201q, and the content modification module 201t, and executes the instructions.

At the time of execution, the instructions stored in the instruction register are examined to determine the operations to be performed. The processor 1401 then performs the specified operations. The operations comprise arithmetic operations and logic operations. The operating system performs multiple routines for performing a number of tasks required to assign input devices 1407, the output devices 1410, and the memory unit 1402 for execution of the modules 201a, 201b, 201c, 201d, 201e, 201f, 201g, 201h, 201i, 201j, 201k, 201l, 201m, 201n, 201o, 201p, 201q, 201r, 201s, 201t, 201u, 201v, 201w, 1301b, etc., of the server 201, the modules 201q, 201t, 203c, etc., of the publisher websites 203, and the modules 1301b, 1301g, etc., of the client device 1301 and executes the instructions. The tasks performed by the operating system comprise, for example, assigning memory to the modules, for example, 201a, 201b, 201c, 201d, 201e, 201f, 201g, 201h, 201i, 201j, 201k, 201l, 201m, 201n, 201o, 201p, 201q, 201r, 201s, 201t, 201u, 201v, 201w, 1301b, etc., of the server 201, the modules, 201q, 201t, 203c, etc., of the publisher websites 203, and the modules 1301b, 1301g, etc., of the client device 1301, and to data used by the computer system 1400, moving data between the memory unit 1402 and disk units, and handling input/output operations. The operating system performs the tasks on request by the operations and after performing the tasks, the operating system transfers the execution control back to the processor 1401. The processor 1401 continues the execution to obtain one or more outputs. The outputs of the execution of the modules, for example, 201a, 201b, 201c, 201d, 201e, 201f, 201g, 201h, 201i, 201j, 201k, 201l, 201m, 201n, 201o, 201p, 201q, 201r, 201s, 201t, 201u, 201v, 201w, 1301b, etc., of the server 201, the modules, 201q, 201t, 203c, etc., of the publisher websites 203, and the modules 1301b, 1301g, etc., of the client device 1301 are displayed to the user on the display unit 1406.

A server 201 setup as exemplary illustrated in FIG. 13 comprises the media database 201d for storing multimedia content of commercial, educational, and entertaining in nature. For example, multimedia content such as advertisement media clips are obtained in suitable formats from advertisement agencies or media representatives of product and service companies, and uploaded to the media database 201d. In another example, the advertisement agencies or the media representatives undertaking extensive campaigning may add new advertisement media clips, and update or modify existing advertisement media clips by accessing the media database 201d. The media aggregator 201c recognizes changes made to the contents of the media database 201d, including metadata changes, for example, changes in the duration of the advertisement media clips, the names of the advertisement media clips, etc., and prepares and updates the list of multimedia content.

The server 201 may allow controlled access to the server 201 and the resources therein, such as the media database 201d, through a web front-end. An example of such a web front-end is a website, for example, http://www.beezag.com. The advertisement agencies or the media representatives are required to setup an account for themselves by registering as an approved advertiser through the web front-end before submitting their advertisement clips. The approval workflow for registering advertiser accounts and uploading advertisement clips may be assigned to process owners or administrators on a regional basis. Furthermore, the approval workflow may include different stages of approval such as account-level approval, financial approval, and publishing approval. After the advertiser registers an account, the advertiser may upload advertisement clips and other multimedia content into the media database 201d for distribution to targeted users. The advertiser may be charged designated amounts for each confirmed view and non-confirmed view response report received by the server 201.

The advertisement multimedia clips comprise, for example, audio clips, video clips, animations, still images, text attachments, or suitable combinations of these. The advertisement clips also comprise promotional segments such as universal resource locators (URLs) directing the users to the web front-end or other proprietary websites of the product and service companies. The promotional segments may also include digital coupons or vouchers redeemable for special discounts on advertised products and services, questionnaire for sharing additional information, etc. The coupons and vouchers may also be distributed to targeted users via short message service (SMS) messages.

In an embodiment, the users are prompted to share the viewed multimedia content, such as advertisement clips through the view confirmation module 1301b on the client device 1301 or the server 201. The users may share the advertisement clips by syndicating or micro-blogging the advertisement clips on social networking websites such as Twitter™, Facebook™, Myspace™, etc., or by forwarding the advertising clips through email services, instant messages, SMS, MMS, etc.

Disclosed herein is also a computer program product comprising a non-transitory computer readable storage medium that stores computer program codes comprising instructions executable by at least one processor 1401 of the computer system 1400 for dynamically profiling users for incentivized targeting of the multimedia content to the users in the networked environment 200. As used herein, the term "non-transitory computer readable storage medium" refers to all computer readable media, for example, non-volatile media such as optical disks or magnetic disks, volatile media such as a register memory, a processor cache, etc., and transmission media such as wires that constitute a system bus coupled to the processor 1401, except for a transitory, propagating signal.

The computer program product disclosed herein comprises a first computer program code for creating an advertiser network 202 comprising multiple advertisers and multiple member websites 203a; a second computer program code for creating an advertiser profile for each of the advertisers in the advertiser network 202 based on multimedia content, advertising information, and targeting criteria submitted by each of the advertisers via the communication link 1302 to the server 201; a third computer program code for creating a user network 204 comprising multiple users that are registered on the server 201 and/or recruited from one or more of multiple publisher websites 203 in the networked environment 200; a fourth computer program code for acquiring marketing data from each of the users in the user network 204 via the communication link 1302 for creating a dynamic user profile for each of the users in the user network 204; a fifth computer program code for matching the created dynamic user profile of each of the users with the created advertiser profile of each of the advertisers; a sixth computer program code for targeting the multimedia content to the users in the user network 204 via the communication link 1302 based on the matching of the created dynamic user profile of each of the users with the created advertiser profile of each of the advertisers; a seventh computer program code for confirming whether the users in the user network 204 viewed the targeted multimedia content on the server 201 and/or across the publisher websites 203 in the networked environment 200 using a challenge, random in content; and an eighth computer program code for compensating the users in the user network 204 by crediting the users in the user network 204 with one or more items of value based on the confirmation of the viewing of the targeted multimedia content.

The computer program product disclosed herein further comprises a ninth computer program code for receiving multimedia content from the server 201 and playing the multimedia content on the display screen 1301a of the client device 1301, a tenth computer program code for generating a challenge stream comprising multiple challenges, wherein each challenge in the challenge stream is random in content, an eleventh computer program code for integrating the challenge stream and the stream of multimedia content, in real time, to generate a challenge, random in content, in real time for the multimedia content, a twelfth computer program code for presenting the challenge, random in content, to the user to confirm that the user viewed the multimedia content played on the display screen 1301*a* of the client device 1301, a thirteenth computer program code for invoking a response from the user for the presented challenge, a fourteenth computer program code for confirming that the multimedia content was viewed by the user if a response is entered by the user in the client device 1301 for the presented challenge, a fifteenth computer program code for generating a response report based on the response from the user, and a sixteenth computer program code for crediting the user with an item of value, if the response report confirms the multimedia content was viewed by the user. The computer program product disclosed herein further comprises additional computer program codes for performing additional steps that may be required and contemplated for dynamically profiling the users for incentivized targeting of the multimedia content to the users in the networked environment 200 and for confirming that a user viewed multimedia content on the client device 1301.

The computer program codes comprising the computer executable instructions are embodied on the non-transitory computer readable storage medium. The processor 1401 of the computer system 1400 retrieves these computer executable instructions and executes them. When the computer executable instructions are executed by the processor 1401, the computer executable instructions cause the processor 1401 to perform the method steps for dynamically profiling the users for incentivized targeting of the multimedia content to the users in the networked environment 200. In an embodiment, a single piece of computer program code comprising computer executable instructions performs one or more steps of the computer implemented method disclosed herein for dynamically profiling the users for the incentivized targeting of the multimedia content to the users in the networked environment 200.

Enumerated herein are examples of the computer implemented method and system 1300 disclosed herein, categorized by the challenge content and the invoked response. In an example, the challenge content and the invoked response comprise visual and mentally-solvable challenge-responses. Consider an example where the company Pfizer Inc. creates a video advertisement for Purell® hand sanitizer targeted for mothers of children between the ages of 5 to 21. A video advertisement campaign is created and uploaded into the media database 201*d* using the upload module 201*f,* via the web front-end of the media service provider, for delivery to the target demographic membership selected in the web front-end. FIGS. 15A-15D exemplarily illustrate screenshots for a video advertisement campaign for the hand sanitizer. An alphanumeric-based challenge comprising random letters is presented to the viewer during the play of the video advertisement. A first letter "C" occurs at 10 seconds into the video advertisement and is placed in the top right corner of the display screen 1301*a* as exemplarily illustrated in FIG. 15A. A second letter "X" occurs 5 seconds before the end of the video advertisement and is placed in the bottom right corner of the display screen 1301*a* as exemplarily illustrated in FIG. 15B. When the video advertisement ends, the viewer is presented with a question, for example, "Which two letters appeared during the advert?" as exemplarily illustrated in FIG. 15C. If the viewer answers the question correctly, viewing of the video advertisement by the viewer is confirmed. The view confirmation module 1301*b* sends a message, for example, "You have answered correctly!" as exemplarily illustrated in FIG. 15D and instructs the payment module 201*b* to credit an item of value, for example, $1, to the viewer account or the viewer's e-wallet 201*i*. The view confirmation module 1301*b* enables control of challenge, random in content, variables, for example, the number of alphanumeric characters presented during the advertisement play, the timing of the appearance and disappearance of the alphanumeric characters, a threshold accuracy of the viewer's response to the challenge to register a positive response, the time-out period for the response, etc.

In another example, Kentucky Fried Chicken (KFC®) Corporation creates a video advertisement for their new chicken snacker targeted for men and women between the ages 18 to 55 in northeast United States. A video advertisement campaign is created and uploaded into the web front-end for delivery to the target demographics. FIGS. 16A-16D exemplarily illustrate screenshots for a video advertisement campaign for KFC's chicken snacker. A keywords and phrases based challenge comprising a random word or phrase is presented to the viewer during the play of the video advertisement. During the play of the video advertisement as exemplarily illustrated in FIG. 16A, the phrase "Finger Licking Good!" is presented in a child window as exemplarily illustrated in FIG. 16B. When the video advertisement ends, the viewer is presented with a question about the words or phrases presented during the video advertisement as exemplarily illustrated in FIG. 16C. If the viewer answers the question correctly, the viewer confirms viewing of the video advertisement as exemplarily illustrated in FIG. 16D. The view confirmation module 1301*b* instructs the payment module 201*b* to credit an item of value, for example, $1, to the viewer account or the viewer's e-wallet 201*i* on confirming that the viewer viewed the video advertisement. Among the challenge, random in content, variables, a variable in this example is the description of the keywords and phrases in a predefined set for random selection. The phrases in the predefined set comprise, for example, "Think KFC", "Finger Licking Good", "We do chicken right", "There's Fast Food, Then There's KFC", etc.

In another example, a human resource consultancy creates a sexual harassment training video for managers of employees in the state of California. The video is delivered online in discreet video chapters. FIGS. 17A-17D exemplarily illustrate screenshots of a training video for managers. A mathematical equation based challenge is selected by the consultancy, comprising a random equation, for example, 3+4=?, or random numbers such as "6" and "2" as exemplarily illustrated in FIGS. 17A-17B. This mathematical equation based challenge is presented to the viewer during the video chapter. When the video chapter ends, the viewer is presented with an opportunity to submit a solution to the mathematical equation, such as, "What is the sum of the numbers shown during the video?" as exemplarily illustrated in FIG. 17C. If the viewer answers the question correctly, the viewer confirms viewing of the video chapter as exemplarily illustrated in FIG. 17D. The view confirmation module 1301*b* instructs the payment module 201*b* to credit an item of value, for example, $1, to the viewer account or the viewer's e-wallet 201*i* on confirming that the viewer viewed the video advertisement. Among the challenge, random in content, variables, a variable in this example is the degree of difficulty of the random equations depending on the operators in the equation.

In another example category, the challenge content and the invoked response comprise visual and motor based challenge-responses. Johnson & Son, Inc. creates an iPhone® application and a coupon offer for Off!® Insect Repellants targeted for iPhone users herein referred to as "viewers". FIGS. 18A-18D exemplarily illustrate the screenshots for an iPhone application and a coupon offer. The iPhone application randomly overlays and removes images of mosquitoes and other bugs during the play of a video advertisement, as exemplarily illustrated in FIG. 18B-18C, and requests the viewer to, for example, "Squash all the insects while viewing the advertisement" as exemplarily illustrated in FIG. 18A. In responding to the challenge in real time, the viewer touches the iPhone screen for simulating squashing of the random bugs that appear during the video. When the video ends, the viewer is presented with a score reflecting the viewer's performance. If the score is sufficient, the viewer is presented with a digital coupon as exemplarily illustrated in FIG. 18D. If the score is insufficient, the viewer has the opportunity to replay. The challenge, random in content, variables, for example, the number of bug images presented during the video play, the timing of the appearance and disappearance of the bug images, a threshold score for earning a coupon, etc., is implemented in the iPhone application.

In another example, Johnson & Son, Inc. creates a web-based gaming application and a coupon offer for "Off! Insect Repellants" targeted for males and females of ages 18 to 55 and above in the southeast of the United States. The web-based gaming application randomly overlays and removes images of mosquitoes and other bugs during the play of a video. In responding to the challenge in real time, the viewer right-clicks over as many bug images as possible on a computer monitor screen, for simulating squashing of the random bugs, before the video ends. When the video ends, the viewer is presented with a score reflecting the viewer's performance. If the score is sufficient, the viewer is presented with a digital coupon to print or forward to a mobile client device 1301. If the score is insufficient, the viewer has the opportunity to replay.

In another example, the challenge content and the invoked response comprise audio based challenge-responses. For example, the San Diego zoo creates a video advertisement for the summer season targeting mothers in southern California. A video advertisement campaign is created and uploaded into the web front-end for delivery to the target demographics. FIGS. 19A-19D exemplarily illustrate the screenshots for a video advertisement campaign. A hear and type challenge is presented to the viewer with a question about the audio elements randomly inserted and overlaid onto the audio content of the video advertisement as exemplarily illustrated in FIGS. 19A-19B. The random audio elements comprise, for example, animal sounds, bird sounds, etc. The question is, for example, "What animal produced the sounds you heard?" as exemplarily illustrated in FIG. 19C. If the viewer answers the question correctly, the viewer confirms viewing of the video advertisement as exemplarily illustrated in FIG. 19D and provides the viewer with a coupon. Among the challenge, random in content, variables, a variable in this example is the type of audio elements in the predefined set for random selection and overlaying.

In another example, the San Diego zoo creates a mobile phone based marketing campaign for the summer season targeted at mothers in southern California. The marketing campaign involves a chance to win a 10% discount on adult entry ticket prices. The mobile phone based marketing campaign is created for delivery to the target demographics, and a hear and speak challenge-response is selected by the advertiser. A mobile phone user is notified of the marketing campaign through print advertisements or USSD broadcast messages directing the mobile phone user to call a phone number, listen to the summer events at the zoo, and win a 10% discount on the entry ticket price. When the mobile phone user calls, the mobile phone user is greeted with a recorded voice that lists the upcoming zoo events and attractions. The recorded voice is randomly interrupted, for example, by the sounds of animals and birds, etc. At the end of the call, the recorded voice presents the mobile phone user with a question about the audio elements randomly inserted and overlaid onto the recorded voice. The mobile phone user is then prompted to answer with a voice prompt, for example, "Speak your answer at the tone". The speech recognition software in the mobile phone or the server 201 processes the speech utterance representing the answer from the mobile phone user. If the mobile phone user answers the question correctly, the mobile phone user confirms that the mobile phone user has listened to the voice recording, and obtains a coupon by, for example, SMS. Among the challenge, random in content, variables, a variable in this example is the accuracy in recognizing the speech utterance that qualifies the mobile phone user to type in the answer using a keypad for a positive response.

Consider an example where the viewer creates a viewer account on the server 201 and generates a username and a password for accessing the server 201. The viewer uses, for example, a Java™ enabled mobile device herein referred to as a "mobile device" to create the viewer account via a front-end of the server 201. Subsequently, the viewer logs in to the viewer account using the mobile device and starts using the services offered on the front-end. During the login session, the viewer's mobile device receives a list of advertisement clips available for viewing. The viewer selects one or more advertisement clips for on-demand streaming. The viewer also selects the schedule for the on-demand streaming and the order of playing of the selected multimedia content. For instance, the viewer selects to initiate the on-demand streaming during the present login session. The selected advertisement clips are streamed to the mobile device in the order selected by the viewer. For example, a first advertisement clip begins to play on the mobile device in real time. A challenge-response interaction takes place during and/or after the first multimedia content is played. A response report is generated when a response is entered by the viewer for the challenge presented during the challenge-response interaction. A second advertisement clip begins playing on the mobile device in real time, and the viewer undergoes another challenge-response interaction while viewing the second advertisement clip, and so on. The viewer accrues compensation in the form of items of value for confirming viewing of the selected advertisement clip based on the generated response reports. The accrued compensation, in aggregate, may equal the value of, for example, premium multimedia content, and when the premium multimedia content value is reached, the viewer is notified that the premium multimedia content can be played in its entirety. The accrued compensation is reflected by the e-wallet 201i associated with the viewer account.

In another example, the viewer uses a computer with a web browser to create the viewer account via a front-end of the server 201. Subsequently, the viewer logs in to the viewer account using an interactive television supported by a set top box connected to a viewer's television set. During the login session, a graphical user interface (GUI) element, such as a panel on the interactive television lists the multimedia content available for viewing. The viewer uses a remote control device to select one or more multimedia content for on-demand streaming via an interactive television network. The remote control device is, for example, a mobile phone, a network enabled personal digital assistant, etc. The viewer also selects the schedule for the on-demand streaming and the order of playing of the selected multimedia content. For instance, the viewer selects to begin the on-demand streaming at a selected schedule in future.

The viewer tunes in to the interactive television at the selected schedule and logs in to the viewer account, either manually or automatically. In an embodiment, the viewer logs in prior to the selected schedule, views multimedia content and confirms the viewing to accrue items of value. The accrued items of value can be debited later in order to unlock premium multimedia content. The selected multimedia content begins streaming through the set top box in the order selected by the viewer. For instance, a first multimedia content begins to play on the television set in real time. A challenge-response interaction takes place during and/or after the first multimedia content is played. The viewer completes the challenge-response interaction by interacting with the GUI elements via the remote control. A response report is generated when the viewer enters a response for the challenge presented during the challenge-response interaction. A second multimedia content begins playing on the television set in real time, and the viewer undergoes another challenge-response interaction while viewing the second multimedia content, and so on. The viewer accrues compensation for confirming that the viewer has viewed the selected multimedia content based on the generated response reports. The e-wallet 201i associated with the viewer account reflects the accrued compensation. The accrued compensation, in aggregate, may equal the value of premium multimedia content, and when the premium multimedia content value is reached, the viewer is notified that the premium multimedia content can be played in its entirety.

In another example, the viewer uses a computer with a web browser to create the viewer account via a front-end of the server 201. Subsequently, the viewer is presented a search engine style interface, wherein the viewer can search by product name or other metadata to discover available multimedia content. The viewer selects one or more of the discovered multimedia content for on-demand streaming. The selected multimedia content is streamed through the web browser based on the viewing parameters selected by the viewer. The viewer undergoes a challenge-response interaction while viewing the selected multimedia content. A response report is generated when the viewer enters a response for a presented challenge. The viewer accrues compensation for confirming that the viewer has viewed the selected multimedia content based on the generated response report. The e-wallet 201i associated with the viewer account reflects the accrued compensation. The accrued compensation, in aggregate, may equal the value of premium multimedia content, and when the premium multimedia content value is reached, the viewer is notified that the premium multimedia content can be played in its entirety. The viewer may also purchase products and services on an e-commerce platform by redeeming the accrued compensation. FIG. 20 exemplarily illustrates a screenshot for a scrolling challenge, random in content.

Figure 21A:
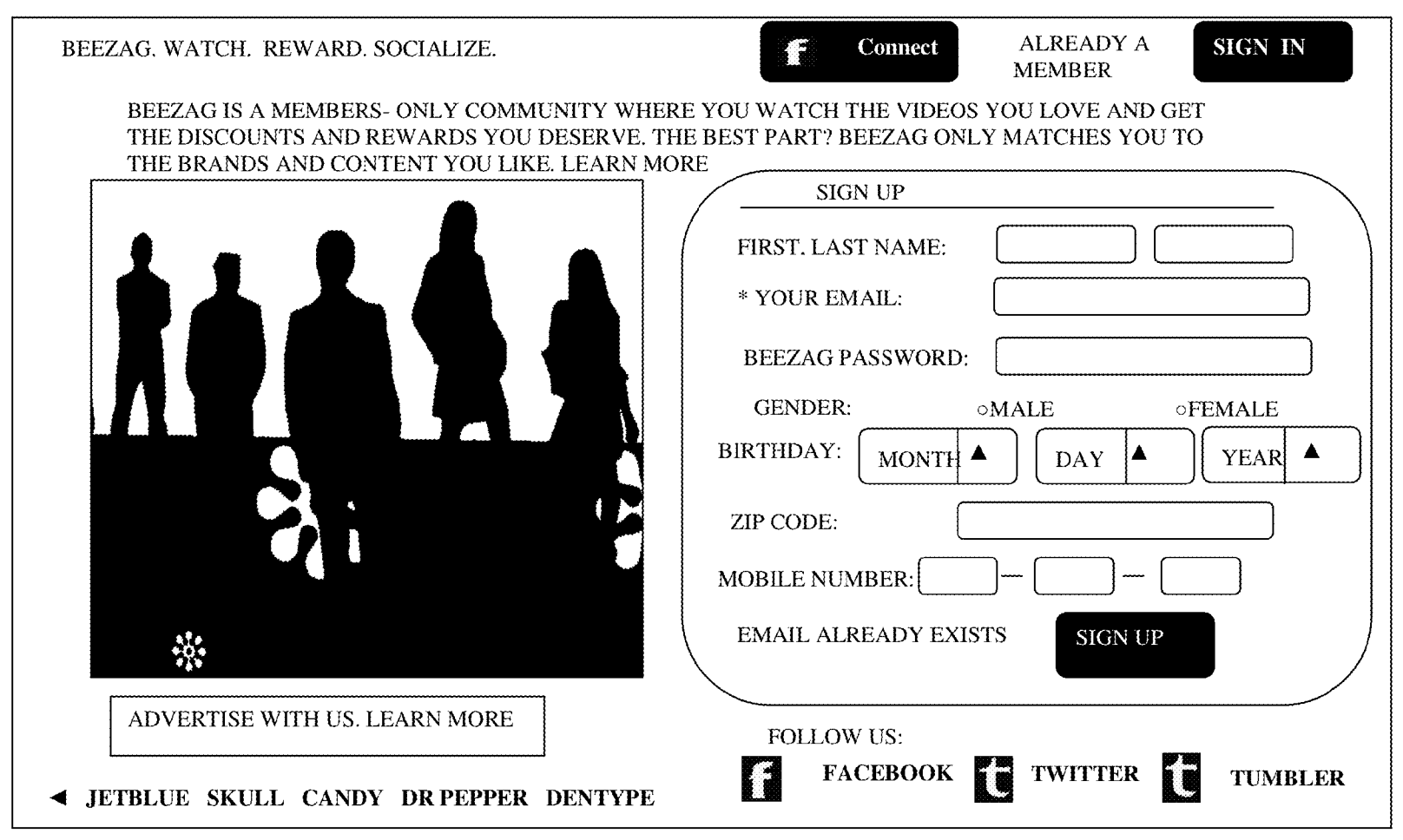
Figure 21B:
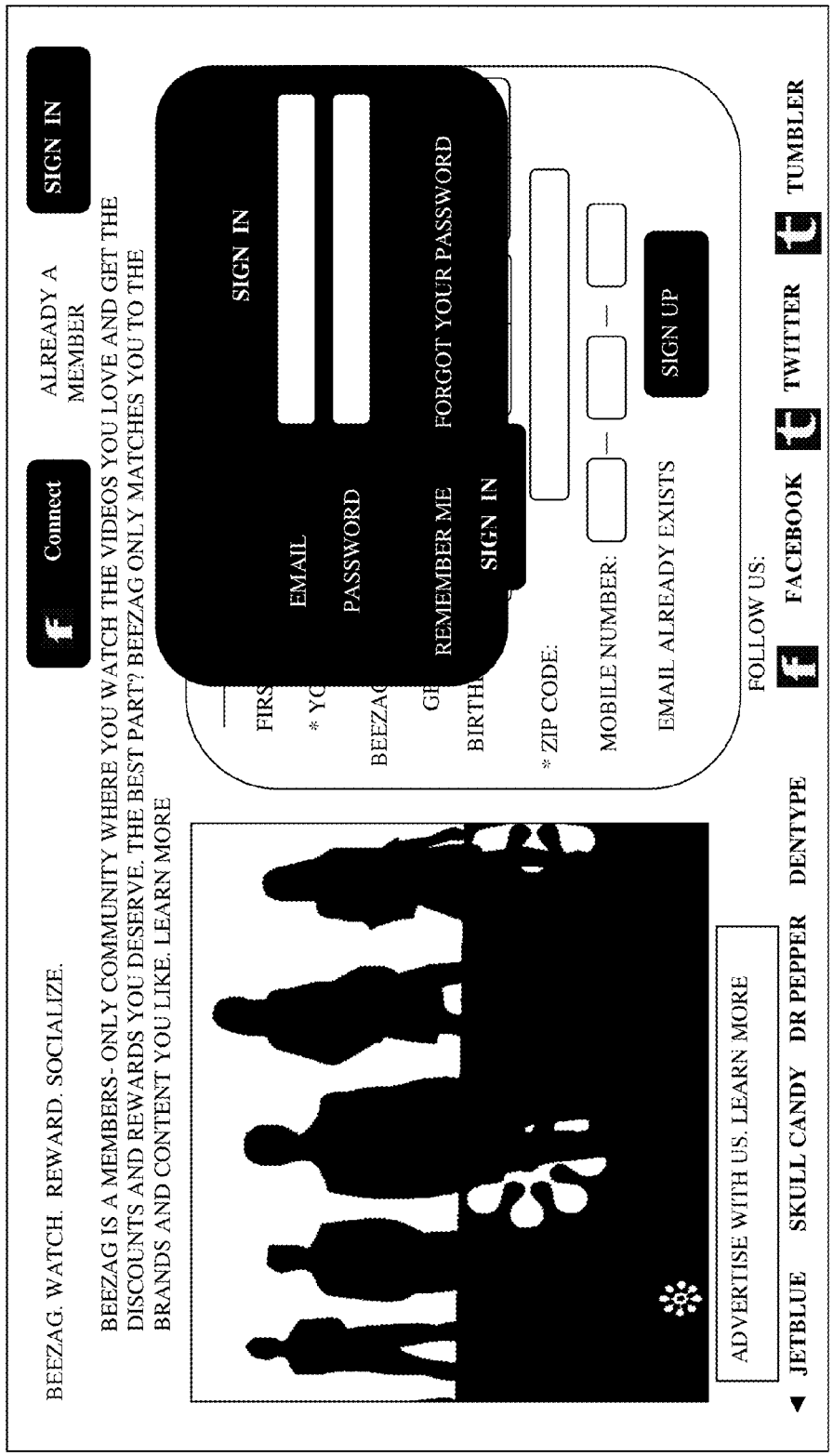
Figure 21C:
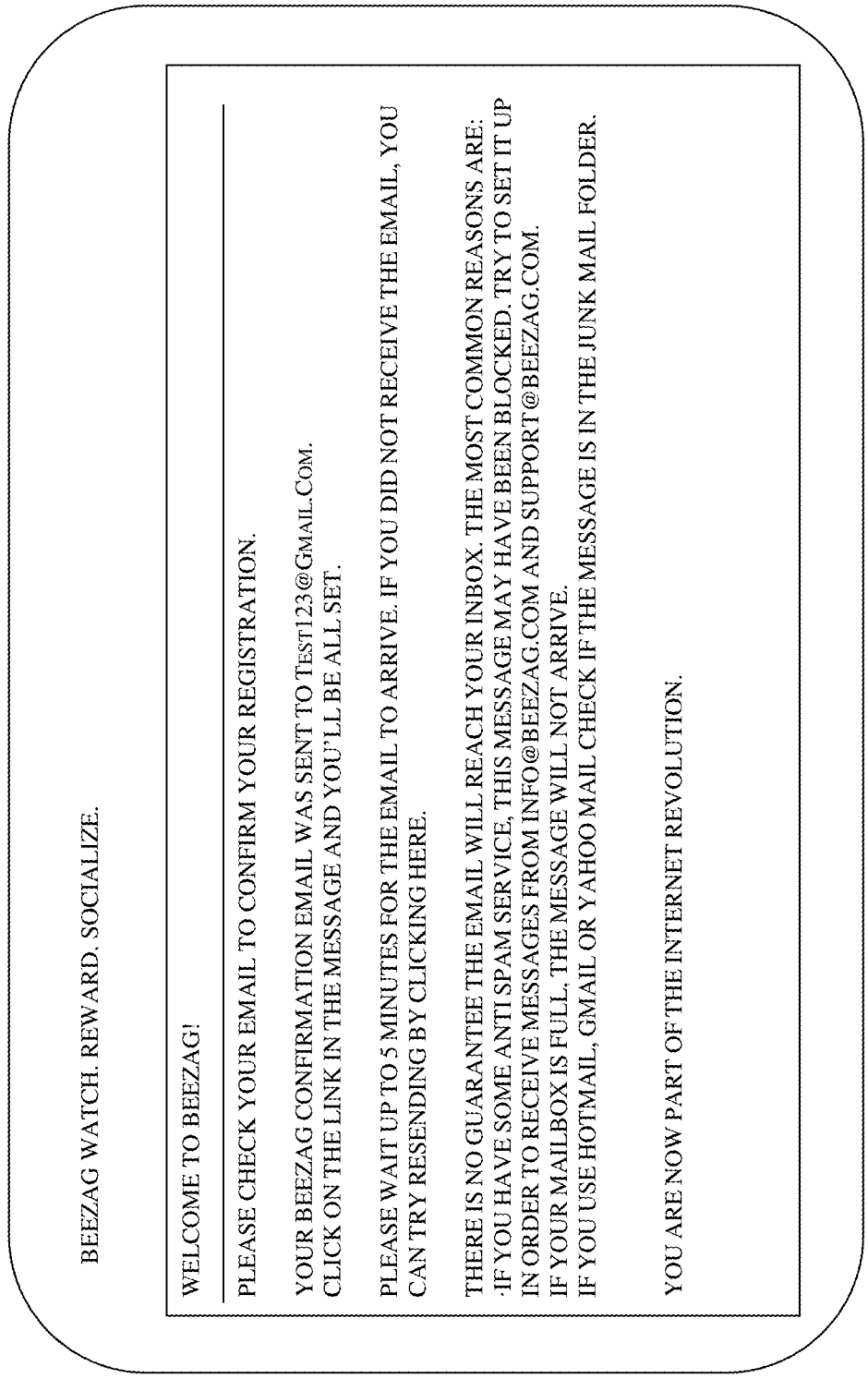
Figure 21D:
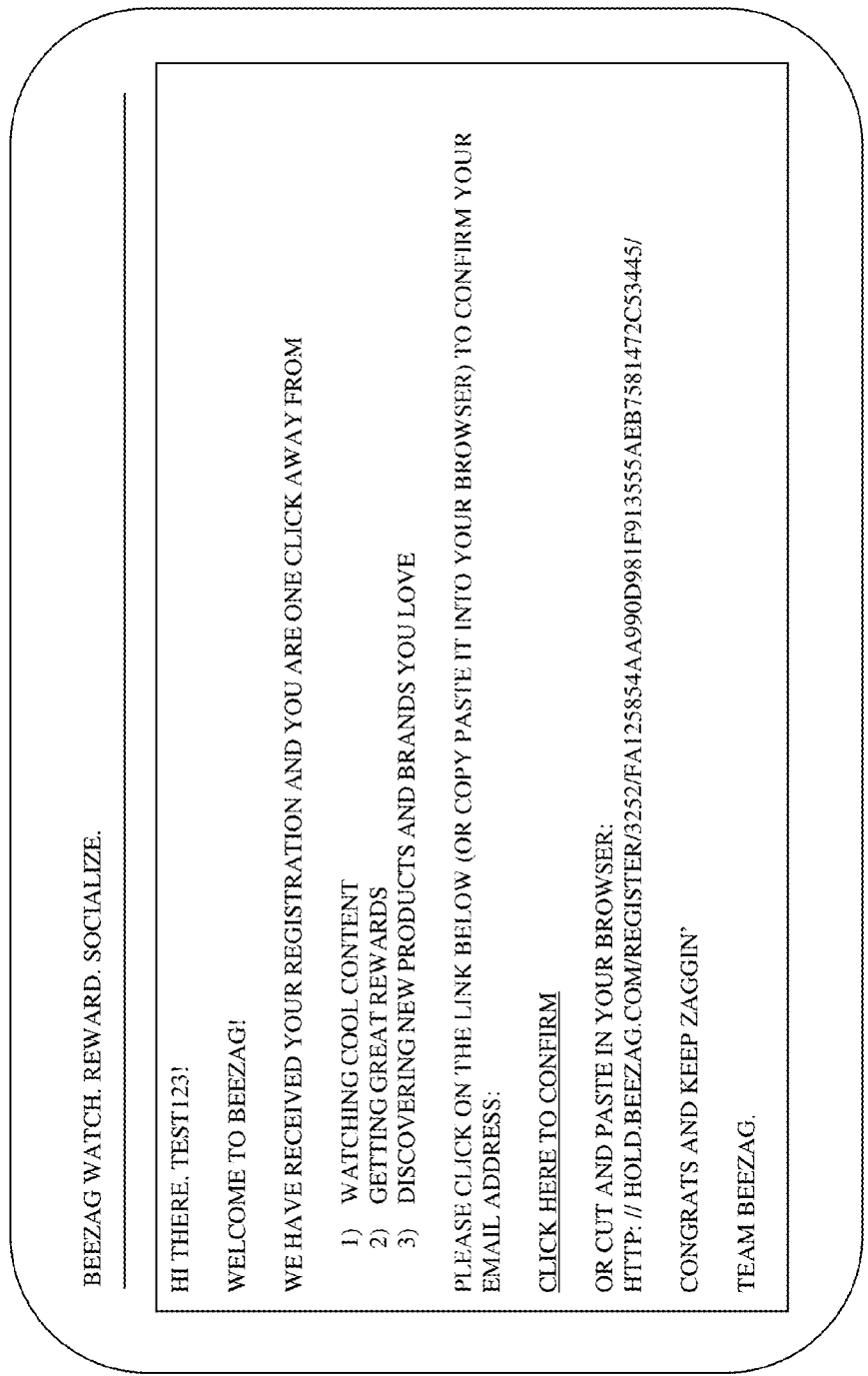
Figure 21E:
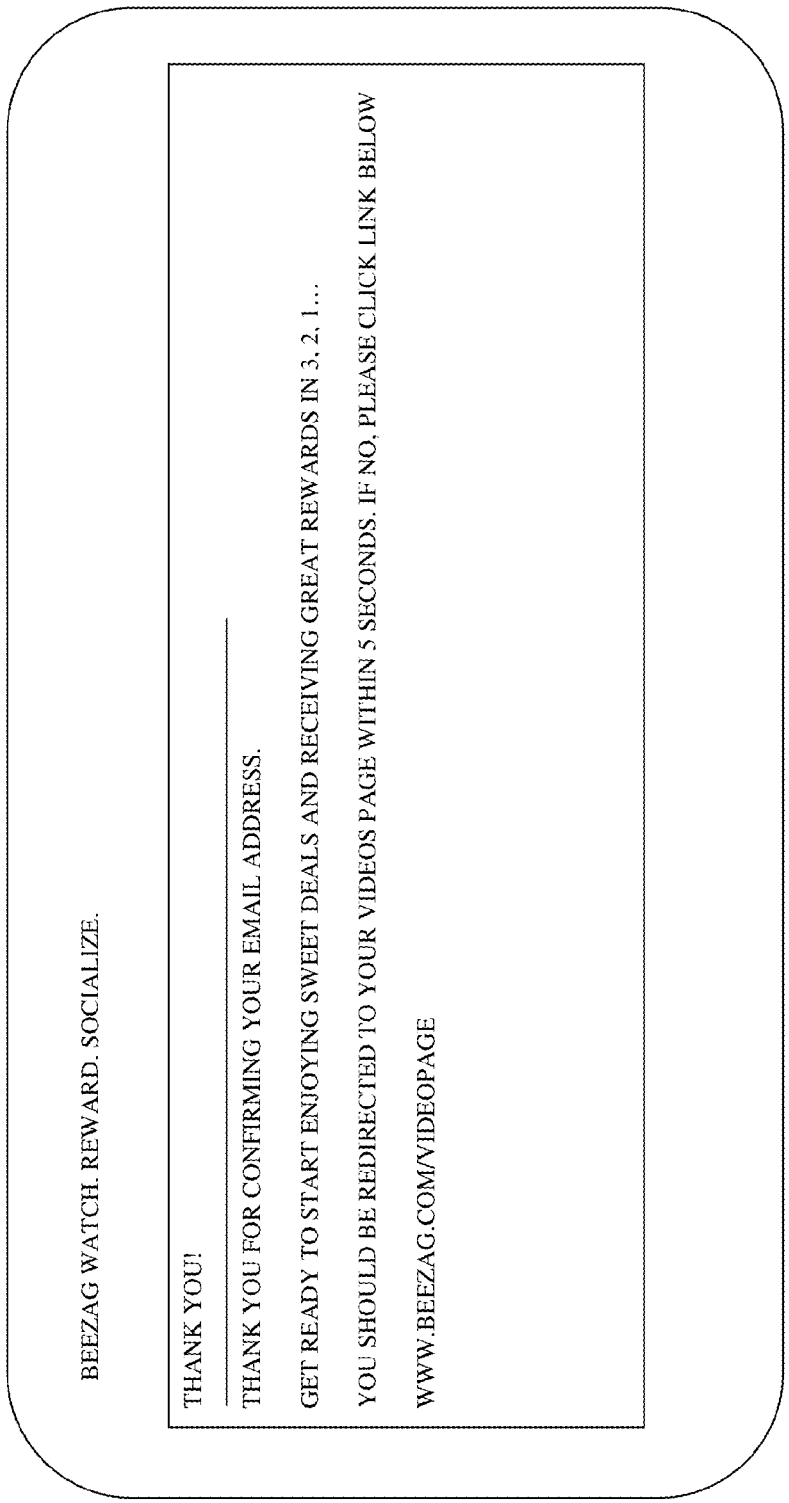

Consider another example where the viewer accesses the server 201 for the first time through a web front-end, for example, a web site, via the client device 1301 of the viewer. When the viewer accesses the website hosted by the server 201, the viewer is presented with a login web page as exemplarily illustrated in FIG. 21A. The server 201 prompts the viewer to provide viewer credentials as exemplarily illustrated in FIG. 21B to access the server 201. The viewer may supply an electronic mail (email) address to the server 201. The server 201 verifies whether the viewer is accessing the server 201 for the first time using the email address provided by the viewer. If the viewer is accessing the server 201 for the first time, the server 201 prompts the viewer to register with the server 201 by transmitting a first confirmation link to the email address provided by the viewer as exemplarily illustrated in FIG. 21C. If the viewer clicks on the first confirmation link transmitted by the server 201, the first confirmation link redirects the viewer to a webpage that prompts the viewer to click on a second confirmation link for confirming the registration of the viewer with the server 201 as exemplarily illustrated in FIG. 21D. When the viewer clicks on the second confirmation link, the server 201 sends a notification message to the viewer to confirm the viewer's registration with the server 201 as exemplarily illustrated in FIG. 21E.

Figure 22A:
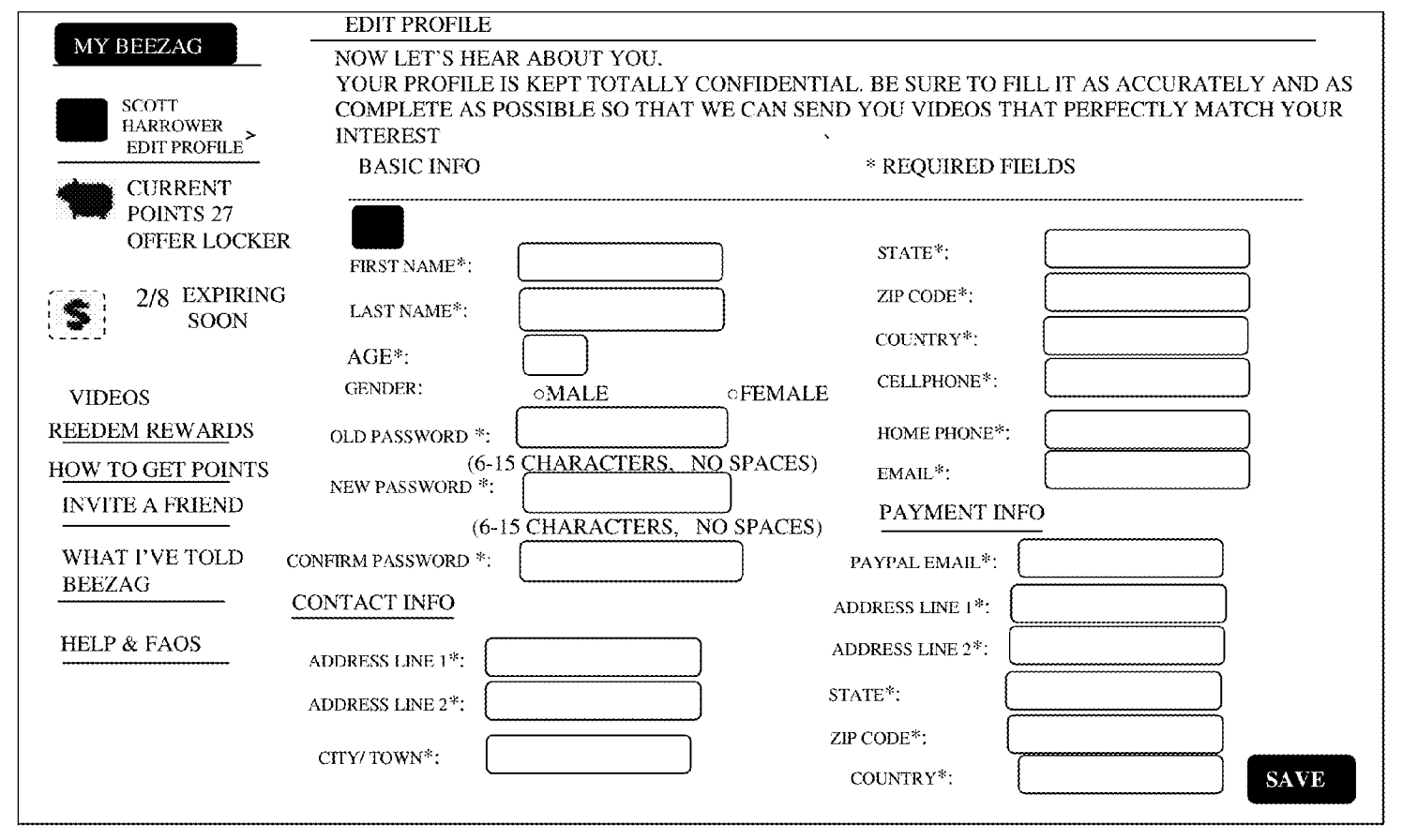
Figure 22B:
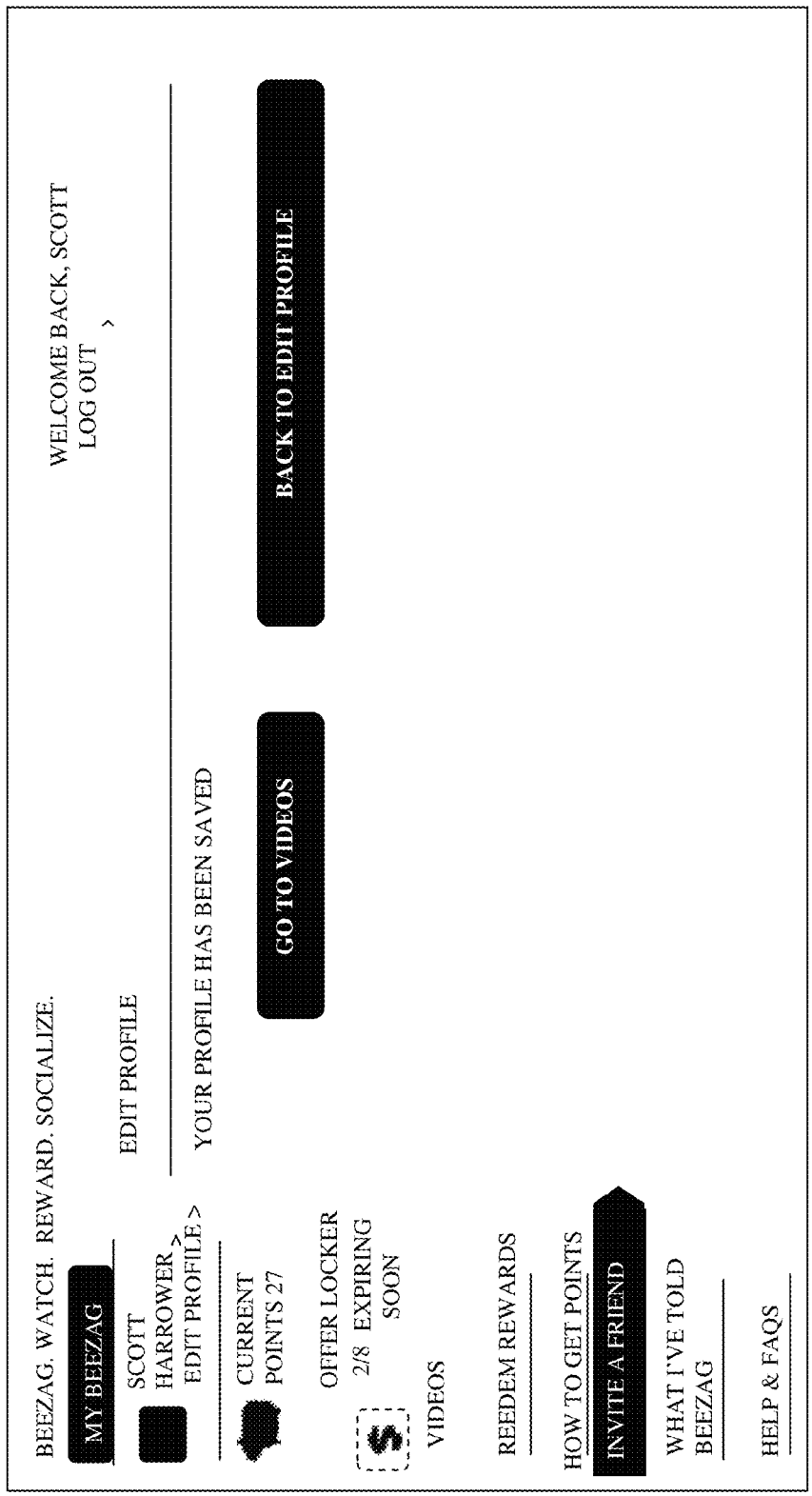

When registration of the viewer with the server 201 is complete, the server 201 enables the viewer to create a profile by submitting information such as personal information, marketing data, etc., as exemplarily illustrated in FIG. 22A. When the viewer edits and updates the information, the server 201 confirms the updating and saving of the information of the viewer as exemplarily illustrated in FIG. 22B.

The viewer receives a list of videos on the client device 1301 from the server 201 for selection. The viewer selects a popular music video for viewing in real time. The server 201 plays the selected music video on the viewer's client device 1301 as exemplarily illustrated in FIG. 23A. The server 201 presents a challenge, random in content, on the selected music video and invokes a response from the viewer for confirming viewing of the selected music video as exemplarily illustrated in FIG. 23B. The server 201 verifies the correctness of the response to confirm viewing of the selected music video and provides the viewer with an offer. The server 201 inserts an interactive promotional segment, for example, a clickable coupon, within the selected multimedia content as exemplarily illustrated in FIG. 23C. The clickable coupon directs the viewer to an e-commerce platform for enabling the viewer to purchase products, for example, digital versatile discs (DVDs) and services associated with the selected multimedia content on the e-commerce platform.

Figure 25:
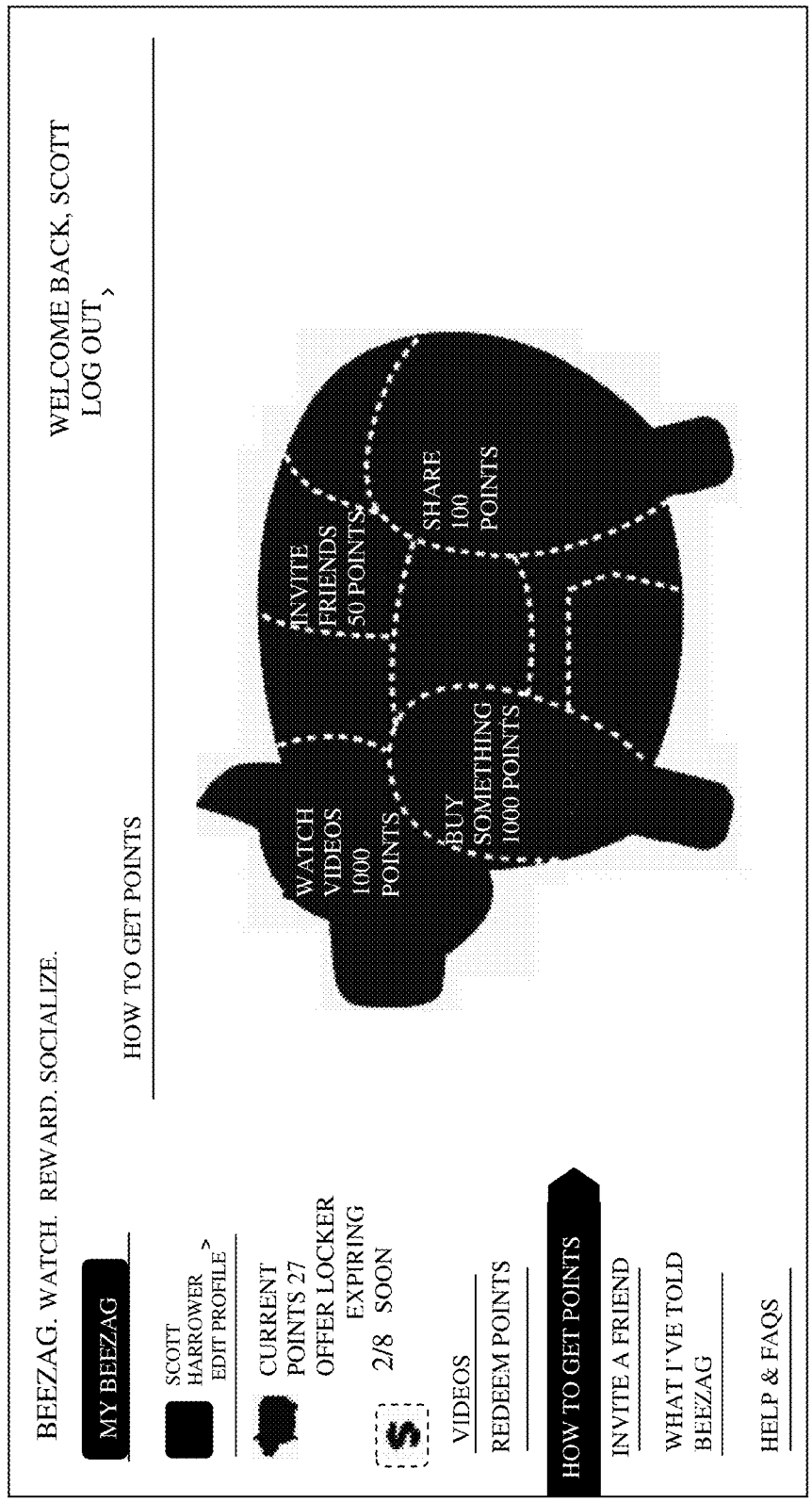
FIG. 25 exemplarily illustrates a screenshot showing methods of accruing items of value by the viewer.

FIGS. 24A-24E exemplarily illustrate screenshots of compensations accumulated and redeemed by the viewer. The server 201 credits the viewer with items of value such as points in the viewer's account or e-wallet 201i based on the viewing of the videos by the viewer as exemplarily illustrated in FIG. 24A. The server 201 may convert the items of value accrued in the viewer's e-wallet 201i to, for example, cash for redemption as exemplarily illustrated in FIGS. 24B-24C. The server 201 also provides options, for example, payment options, donations to charity, etc., for redeeming the accrued items of value. The server 201 enables the viewer to redeem the compensation via a method selected by the viewer as exemplarily illustrated in FIG. 24D. The server 201 provides the viewer with an overall summary of the accrued compensation after the redemption as exemplarily illustrated in FIG. 24E. The server 201 may further provide recommendations or methods for accruing additional compensation or items of value by the viewer as exemplarily illustrated in FIG. 25.

Figure 26:
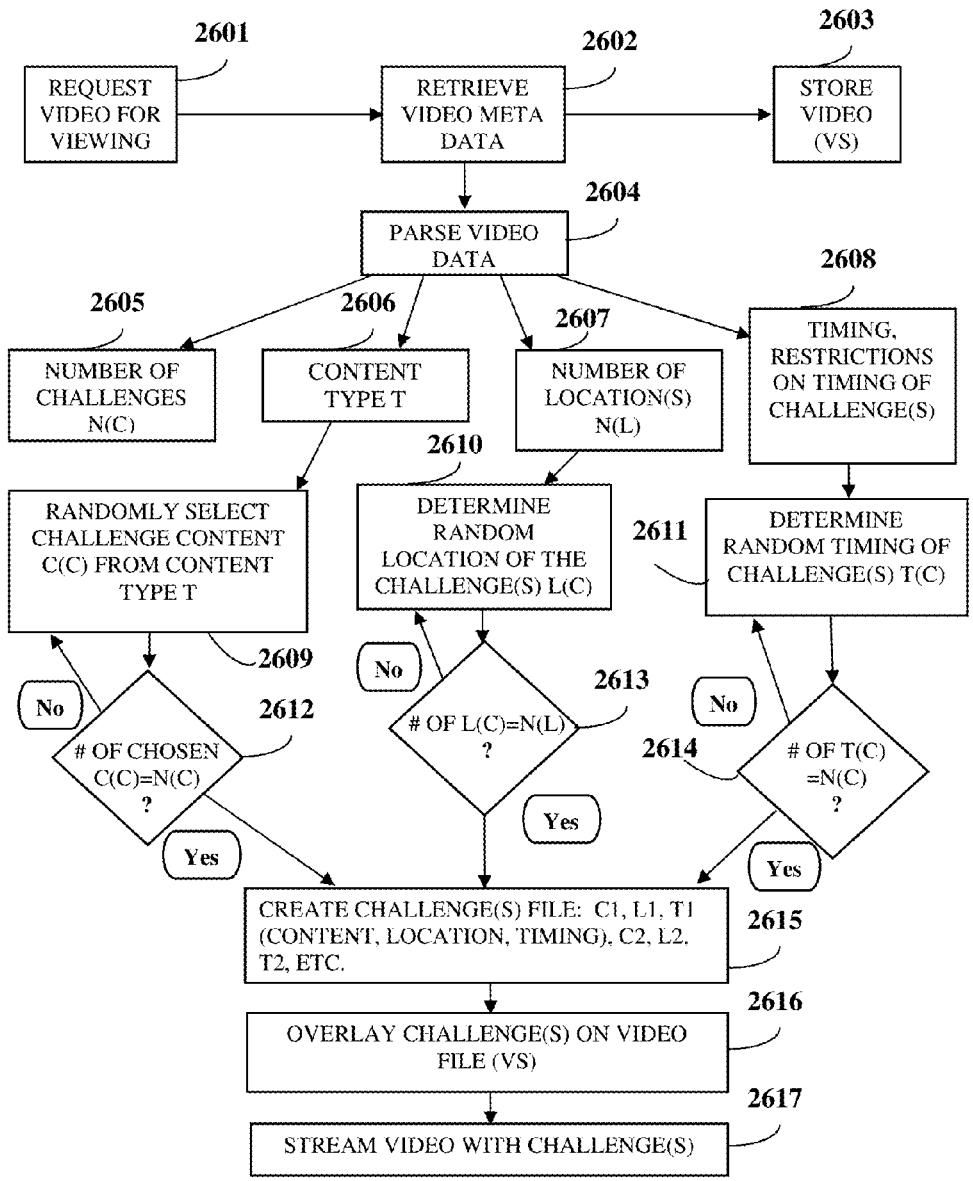
FIG. 26 exemplarily illustrates a flow diagram for generating and presenting challenges, random in content, on multimedia content.

FIG. 26 exemplarily illustrates a flow diagram for generating and presenting challenges, random in content, on multimedia content. The viewer requests 2601 a video for viewing from the server 201. The client device 1301 receives the requested video and also retrieves 2602 the metadata associated with the video. The video is stored 2603 in the client device 1301. The metadata of the video is parsed 2604 to determine, for example, the duration of the video. The challenge parameters, for example, the number of challenges 2605, the type of content 2606, the number of locations 2607 within predefined limits, the timing 2608 of the challenges including restrictions on the timing of the challenges are invoked based on the metadata of the video. One or more of the challenge, random in content, content is randomly selected 2609 from the available content types. The random locations and timing of the challenges are also determined 2610 and 2611. The selected content is verified to determine whether the challenge content is within the limits of the invoked parameters, such as the number of challenges 2612, number of locations 2613, timing restrictions 2614, etc. The challenge files are created 2615 with the selected challenge content, locations, and timing. The challenge content in the challenge files created are overlaid 2616 on the stored video. The video with the incorporated challenge content is streamed 2617 or played to the viewer.

FIGS. 27A-27G exemplarily illustrate a C++ implementation of the challenge generator 1301c using Microsoft® Visual Studio® of Microsoft Inc. In the C++ code listing including the header files of FIGS. 27A-27G, two test cases are established for the challenge generator 1301c. The two test cases are defined in the C++ code listing of FIG. 27A. The first test case generates a sequence of challenges for a 30 second video until the end of the video. The second test case generates a challenge within every 10 second segment of a video clip. The implementation exemplarily comprises two classes, namely, "Class bzChallengeGenerator" and "Class bzChallenge". The code for implementing the "Class bzChallengeGenerator" is exemplarily illustrated in FIGS. 27B-27C. The code for implementing the "Class bzChallenge" is exemplarily illustrated in FIG. 27F. FIGS. 27D-27E and FIG. 27G illustrate example header file definitions of "bzChallengeGenerator.h" and "bzChallenge.h". "Class bzChallengeGenerator" is used to specify the necessary parameters and generate a challenge within an optional sub-segment of the video. The static members of "Class bzChallengeGenerator" comprise the following:

"static const char*s_content[ ]" is an array of arrays of character instances comprising numbers, letters, or symbols. This implementation assumes that the challenge content data type is, for example, a single byte character, however the content's data type has alternate definitions in other implementations.

"static const unsigned int s_contentDuration" is the duration of the display of the content. For example, this value is kept constant at 3 seconds in this implementation, but may vary in other implementations.

Class bzChallengeGenerator also defines an enumerated data type as follows:

"enum ContentTypeEnum {NUMBERS=0, LETTERS=1, SYMBOLS=2}" identifies the character set to be used.

Class bzChallengeGenerator also defines the following data members:

"ContentTypeEnum m_contentType" defines the type of characters to be displayed in the video as a challenge.

"unsigned int m_contentDisplaySize" defines the size of the content's display area (square), in pixels, within a video display frame.

"unsigned int m_videoDisplayWidth" is the width of the video display frame, in pixels.

"unsigned int m_videoDisplayHeight" is the height of the video display frame, in pixels.

"unsigned int m_videoDuration" is the total play time of the video.

The following methods are defined in the Class bzChallengeGenerator:

"static int RangedRand(int from, int to)"—this class method returns a random integer in the closed interval [from, to].

"bzChallenge Generate(int begin=−1, int end=−1) const"—this method generates a challenge, random in content, with the specified properties. The caller optionally specifies the end points of a segment within the entire video in order to satisfy timing constraints of the application, for example, to ensure that a challenge is displayed in the last 20% or 10 seconds of the video's play time. An object of type bzChallenge is returned with the necessary attributes.

Class bzChallenge represents a result of the challenge generator 1301c in the form of a challenge object. Class bzChallenge defines the following data members:

"char m_content"—selection of challenge content to display.

"unsigned int m_contentDisplaySize"—content display area in pixels (square).

"unsigned int m_offset"—offset in seconds from the beginning and the end of the video when the challenge content is displayed.

"unsigned int m_duration"—the duration of the display of challenge content.

"unsigned int m_xPosition"—the pixel position along the width of the display area where the challenge content is displayed.

"unsigned int m_yPosition"—the pixel position along the height of the display area where the challenge content is displayed.

This implementation randomly selects a position for the challenge content's display area within the specified dimensions of the video display frame. Alternatively, the implementation uses an external location map that defines discrete placements of the challenge content on the video display frame. In the alternative case, the challenge generator 1301c randomly selects an index into the location map. FIG. 28 exemplarily illustrates sample output after executing the two test cases twice, referred to as "Run #1" and "Run #2". In an example of the first test case, the challenge generator 1301c generates "3" as the challenge content that will be presented after 19 seconds from the start of the multimedia content for a duration of 3 seconds. The challenge generator 1301c then generates "2" as the challenge content that will be presented after 26 seconds from the start of the multimedia content for a duration of 3 seconds. The challenge generator 1301c also generates the coordinates (233, 8) and (29, 134) as the locations for presenting the challenge content "3" and "2" respectively, wherein the coordinates are selected within the video display frame. In an example of the second test case, the challenge generator 1301c generates "7" as the challenge content that will be presented within the first 10 second segment, then generates "2" as the challenge content that will be presented within the second 10 second segment, and generates "9" as the challenge content that will be presented within the third 10 second segment. The challenge generator 1301c also generates the coordinates (89, 16), (58, 171), and (151, 109) as the locations for presenting the challenge content "7", "2", and "9" respectively, wherein the coordinates are selected within the video display frame.

For the purposes of illustration, the detailed description refers to a single client device 1301; however the scope of the computer implemented method and system 1300 disclosed herein is not limited to the client device 1301 but may be extended to include multiple client devices 1301 and multiple levels of client devices 1301.

For purposes of illustration, the detailed description refers to the server 201 being run locally on a computer system 1400; however the scope of the computer implemented method and system 1300 disclosed herein is not limited to the server 201 being run locally on a computer system 1400 via the operating system and the processor 1401 but may be extended to run remotely over the communication link 1302 by employing a web browser and remote server, mobile phone, or other electronic devices.

The server 201 for confirming viewing of multimedia content by the viewer may also be implemented on operating systems for mobile devices, for example, Windows Mobile®, Symbian, Google™ Android, or iPhone® of Apple Inc. Mobile implementation uses similar algorithms but may involve different hardware interfaces. For example, selection of the list of multimedia content and viewing parameters by the viewer may be performed via a touch screen or voice recognition, and messages may be created using an on-screen keypad or slide-out keyboard, communicating with client software on the mobile device or in a mobile browser. Message transmission then occurs using the mobile device's internet capabilities via a communication link 1302, for example, a WiFi network, a satellite network, a cellular communication network 1303, etc. The server 201 may also be implemented on two different devices, for example, a desktop and a mobile device, to facilitate communication between them.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, a hard disk, magnetic tape, any other magnetic medium, a compact disc-read only memory (CD-ROM), a digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as object code. The computer program product disclosed herein comprises computer executable instructions embodied in a non-transitory computer readable storage medium, wherein the computer program product comprises computer program codes for implementing the processes of various embodiments.

Where databases are described such as the media database 201*d* and the information database 201*w*, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment including a computer that is in communication with one or more devices via a communication network. The computer may communicate with the devices directly or indirectly, via a wired medium or a wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A computer implemented method for dynamically profiling users for incentivized targeting of multimedia content to said users in a networked environment, comprising: providing a server comprising at least one processor configured to manage said dynamic profiling of said users and said incentivized targeting of said multimedia content to said users; creating an advertiser network comprising a plurality of advertisers and a plurality of member websites by said server, wherein said server receives said multimedia content, advertising information, and targeting criteria submitted to said server by each of said advertisers via a communication link, and wherein said server provides access to said multimedia content for said incentivized targeting across a plurality of publisher websites in said networked environment; creating a user network comprising a plurality of users that are one or more of registered on said server and recruited from one or more of said publisher websites in said networked environment by said server; acquiring marketing data from said users in said user network by said server and one or more of said publisher websites via said communication link for creating dynamic user profiles for said users in said user network; targeting said multimedia content to said users in said user network via said communication link based on said created dynamic user profiles of said users in said user network, wherein said multimedia content is sourced from said server to said users in said user network via one or more of said publisher websites;
   confirming whether said users in said user network viewed said targeted multimedia content on one or more of said server and across said publisher websites in said networked environment, by one or more of said server and a client device of each of corresponding said users using a challenge, random in content, wherein said challenge, random in content, is of:
   unrelated to said targeted multimedia content;
   presented at random times comprising one of during play of said targeted multimedia content, after said play of said targeted multimedia content, and a combination thereof; and presented at random physical locations on said targeted multimedia content;
   and compensating said users in said user network by crediting said users in said user network with one or more items of value by one or more of said server and said publisher websites based on said confirmation of said viewing of said targeted multimedia content.

2. The computer implemented method of claim 1, wherein said publisher websites comprise said member websites and a plurality of non-member websites.

3. The computer implemented method of claim 2, wherein said non-member websites among said publisher websites are associated with said server via one or more third party advertiser networks associated with said server, wherein said one or more third party advertiser networks source said multimedia content from said server into said non-member websites via said communication link for said targeting of said multimedia content to said users in said user network.

4. The computer implemented method of claim 3, further comprising:
   detecting a user identifier stored on said client device of said each of corresponding said users in said user network by one or more of said server and said member websites via said communication link, by said one or more third party advertiser networks associated with said non-member websites; and
   establishing a connection with said server by said one or more third party advertiser networks associated with said non-member websites via said communication link for sourcing said multimedia content from said server to said users on said non-member websites via said one or more third party advertiser networks using said detected user identifier.

5. The computer implemented method of claim 1, further comprising monitoring activities and detecting interactions of said users in said user network across said publisher websites in said networked environment by one or more of said server and said publisher websites for said creation of said dynamic user profiles for said users in said user network.

6. The computer implemented method of claim 1, further comprising one or more of:
   routing said one or more items of value to predetermined organizations specified by said users via said communication link; and
   enabling redemption of said one or more items of value across said server, said advertiser network, and external websites in said networked environment.

7. The computer implemented method of claim 1, further comprising modifying content displayed on said publisher websites for each of said users in said user network based on said marketing data acquired from said each of said users in said user network.

8. The computer implemented method of claim 1, further comprising integrating said marketing data acquired from said users in said user network by said server into one or more recommendation engines employed by said publisher websites and one or more third party advertiser networks for generating recommendations related to one or more of products and services of said publisher websites and said one or more third party advertiser networks.

9. The computer implemented method of claim 1, further comprising storing a user identifier associated with each of said users in said user network on said client device of said each of said users in said user network by said server for determining whether a user is a member of said user network, wherein said user identifier is detectable by said publisher websites and one or more third party advertiser networks via said communication link for retrieving a corresponding one of said created dynamic user profiles of said user for said targeting of said multimedia content to said user.

10. The computer implemented method of claim 1, further comprising registering a user identifier associated with said client device of said each of said corresponding said users in said user network by said server in an information database, wherein said user identifier is detectable and retrievable by said publisher websites and one or more third party advertiser networks via said communication link for determining whether a user is a member of said user network.

11. The computer implemented method of claim 10, further comprising retrieving a corresponding one of said created dynamic user profiles of said user from said server by said publisher websites and said one or more third party advertiser networks using said user identifier for said targeting of said multimedia content to said user.

12. The computer implemented method of claim 1, further comprising automatically recruiting a non-member user into said user network by said server when said non-member user registers with one or more of said publisher websites.

13. The computer implemented method of claim 1, further comprising creating an advertiser profile for each of said advertisers in said advertiser network by said server based on said multimedia content, said advertising information, and said targeting criteria submitted to said server by said each of said advertisers and matching said created advertiser profile of said each of said advertisers with said created dynamic user profiles of said users by said server for said targeting of said multimedia content to said users in said user network based on said matching.

14. The computer implemented method of claim 1, wherein said confirmation of whether said users in said user network viewed said targeted multimedia content on said one or more of said server and across said publisher websites in said networked environment, comprises:

presenting said challenge, random in content, to said users by one of overlaying said challenge, random in content, on said targeted multimedia content, and interrupting said play of said targeted multimedia content after an interrupt time period; and invoking a response from each of said users for said presented challenge, random in content, wherein said response determines whether said each of said users have viewed said targeted multimedia content.

15. The computer implemented method of claim 1, wherein said confirmation of whether said users in said user network viewed said targeted multimedia content on one or more of said server and across said publisher websites in said networked environment, comprises:

generating a challenge stream by a challenge generator, said challenge stream comprising a plurality of challenges, wherein content of each of said challenges in said challenge stream is random;

integrating said challenge stream and a stream of said targeted multimedia content in real time to generate said challenge, random in content, in real time for said targeted multimedia content, wherein said challenge is random in content each time same said targeted multimedia content is played on said client device of said each of said corresponding said users;

presenting said challenge, random in content, to said users to confirm that said users viewed said targeted multimedia content played on a display screen of each said client device, by displaying said challenge, random in content, as an overlay on said targeted multimedia content;

invoking a response from said each of said corresponding said users for said presented challenge, random in content; and confirming viewing of said targeted multimedia content by said each of said corresponding said users if said response entered by said each of said corresponding said users in said client device for said presented challenge, random in content, indicates a correct response.

16. The computer implemented method of claim 1, wherein said confirmation of whether said users in said user network viewed said targeted multimedia content on one or more of said server and across said publisher websites in said networked environment, comprises:

generating a challenge stream by a challenge generator, said challenge stream comprising a plurality of challenges, wherein content of each of said challenges in said challenge stream is random;

integrating said challenge stream and a stream of said targeted multimedia content in real time to generate said challenge, random in content, in real time for said targeted multimedia content, wherein said challenge is random in content each time same said targeted multimedia content is played on said client device of said each of said corresponding said users;

interrupting said play of said targeted multimedia content after an interrupt time period for presenting said challenge, random in content, to said users, wherein said interrupt time period is less than duration of said targeted multimedia content;

invoking a response from said each of said corresponding said users for said presented challenge, random in content; and confirming viewing of said targeted multimedia content by said each of said corresponding said users if said response is entered by said each of said corresponding said users in said client device for said presented challenge, random in content.

17. The computer implemented method of claim 1, further comprising:

presenting one or more challenges, random in content, at one or more times during and/or after said play of said targeted multimedia content; and transferring a response to each of said one or more challenges, random in content, from each of said users to one or more random locations on one of a display screen of said client device of said each of said corresponding said users and a multimedia player frame within said display screen of said client device, during said play of said targeted multimedia content, wherein each said response of said each of said users is automatically registered on said one of said display screen of said client device and said multimedia player frame within said display screen of said client device at the end of said play of said targeted multimedia content.

18. The computer implemented method of claim 1, further comprising integrating one or more social networking platforms with said server via said communication link for said targeting of said multimedia content to said users in said user network via said one or more social networking platforms.

19. The computer implemented method of claim 1, further comprising:

transmitting a list of said targeted multimedia content and viewing parameters to said client device of said each of said corresponding said users in said user network by said server for selection, wherein said viewing parameters comprise one or more of a schedule and an order of playing said targeted multimedia content selected by said each of said corresponding said users;

acquiring selections of one or more of said viewing parameters and one or more of said targeted multimedia content from said list of said targeted multimedia content from said users by said server; and receiving and playing said selected multimedia content on said client device of said each of said corresponding said users based on said selected one or more viewing parameters.

20. A computer implemented method for dynamically profiling users for incentivized targeting of multimedia content to said users in a networked environment, comprising: providing a server comprising at least one processor configured to manage said dynamic profiling of said users and said incentivized targeting of said multimedia content to said users; creating an advertiser network comprising a plurality of advertisers and a plurality of member websites by said server, wherein said server creates an advertiser 128 profile for each of said advertisers in said advertiser network based on said multimedia content, advertising information, and targeting criteria submitted to said server by said each of said advertisers via a communication link, and wherein said server provides access to said multimedia content for said incentivized targeting across a plurality of publisher websites in said networked environment; creating a user network comprising a plurality of users that are one or more of registered on said server and recruited from one or more of said publisher websites in said networked environment by said server; acquiring marketing data from each of said users in said user network by said server and one or more of said publisher websites via said communication link for creating a dynamic user profile for said each of said users in said user network; matching said created dynamic user profile of said each of said users with said created advertiser profile of said each of said advertisers by said server; targeting said multimedia content to said users in said user network via said communication link based on said matching of said created dynamic user profile of said each of said users with said created advertiser profile of said each of said advertisers, wherein said multimedia content is sourced from said server to said users in said user network via one or more of said publisher websites; confirming whether said users in said user network viewed said targeted multimedia content on one or more of said server and across said publisher websites in said networked environment, by one or more of said server and a client device of each of said corresponding said users using a challenge, random in content, wherein said challenge, random in content, is of:

unrelated to said targeted multimedia content;

presented at random times comprising one of during play of said targeted multimedia content, after said play of said targeted multimedia content, and a combination thereof; and presented at random physical locations on said targeted multimedia content;

and compensating said users in said user network by crediting said users in said user network with one or more items of value by one or more of said server and said publisher websites based on said confirmation of said viewing of said targeted multimedia content.

21. The computer implemented method of claim 20, further comprising generating a ranking score by said server for each match of said created dynamic user profile with said created advertiser profile found during said matching of said created dynamic user profile of said each of said users with said created advertiser profile of said each of said advertisers, wherein said multimedia content is targeted to one or more of said users based on said ranking score.

22. The computer implemented method of claim 20, further comprising acquiring ratings from said advertisers in said advertiser network by said server via said communication link for each match of said created dynamic user profile with said created advertiser profile found during said matching of said created dynamic user profile of said each of said users with said created advertiser profile of said each of said advertisers, wherein said server determines common characteristics among said users in said user network based on said ratings and updates said targeting criteria using said ratings and said common characteristics for enhanced targeting of said multimedia content to said users in said user network.

23. The computer implemented method of claim 20, wherein said confirmation of whether said users in said user network viewed said targeted multimedia content on one or more of said server and across said publisher websites in said networked environment, comprises:

generating a challenge stream by a challenge generator, said challenge stream comprising a plurality of challenges, wherein content of each of said challenges in said challenge stream is random;

integrating said challenge stream and a stream of said targeted multimedia content in real time to generate said challenge, random in content, in real time for said targeted multimedia content, wherein said challenge is random in content each time same said targeted multimedia content is played on said client device of said each of said corresponding said users;

presenting said challenge, random in content, to said users by one of overlaying said challenge, random in content, on said targeted multimedia content and interrupting said play of said targeted multimedia content after an interrupt time period, wherein said interrupt time period is less than duration of said targeted multimedia content;

invoking a response from said each of said corresponding said users for said presented challenge, random in content; and confirming viewing of said targeted multimedia content by said each of said corresponding said users if said response is entered by said each of said corresponding said users in said client device for said presented challenge, random in content.

24. The computer implemented method of claim 20, further comprising facilitating bidding among said advertisers in said advertiser network for said targeting of said multimedia content of one of said advertisers to one or more of said users in said user network.

25. A computer implemented system for dynamically profiling users for incentivized targeting of multimedia content to said users in a networked environment, comprising: a server that manages said dynamic profiling of said users and said incentivized targeting of said multimedia content to said users, said server comprising at least one processor configured to execute modules of said server, said modules of said server comprising: an advertiser network creation module that creates an advertiser network comprising a plurality of advertisers and a plurality of member websites; wherein said advertiser network creation module receives said multimedia content, advertising information, and targeting criteria submitted to said server by each of said advertisers via a communication link, and wherein said advertiser network creation module provides access to said multimedia content for said incentivized targeting across a plurality of publisher websites in said networked environment; a user network creation module that creates a user network comprising a plurality of users that are one or more of registered on said server and recruited from one or more of said publisher websites in said networked environment; a targeting module that targets said multimedia content to said users in said user network via said communication link based on dynamic user profiles of said users in said user network created by a user profile creation module disposed on one or more of said server and one or more of said publisher websites, wherein said multimedia content is sourced from said server to said users in said user network via one or more of said publisher websites; and a payment module that compensates said users in said user network by crediting said users in said user network with one or more items of value based on confirmation of viewing of said targeted multimedia content by said users; said user profile creation module executable by at least one processor, wherein said user profile creation module acquires marketing data from said users in said user network via said communication link for creating dynamic user profiles for said users in said user network; and a view confirmation module disposed on one or more of said server and a client device of each of corresponding said users in said user network and executable by at least one processor, wherein said view confirmation module confirms whether said users in said user network viewed said targeted multimedia content on one or more of said server and across said publisher websites in said networked environment using a challenge, random in content, wherein said challenge, random in content, is of:

unrelated to said targeted multimedia content;

presented at random times comprising one of during play of said targeted multimedia content, after said play of said targeted multimedia content, and a combination thereof;

and presented at random physical locations on said targeted multimedia content.

26. The computer implemented system of claim 25, wherein said publisher websites comprise said member websites and a plurality of non-member websites, and wherein said advertiser network creation module associates said non-member websites among said publisher websites with said server via one or more third party advertiser networks associated with said server, wherein said one or more third party advertiser networks source said multimedia content from said server into said non-member websites via said communication link for said targeting of said multimedia content to said users in said user network.

27. The computer implemented system of claim 25, wherein said user profile creation module monitors activities and detects interactions of said users in said user network across said publisher websites in said networked environment for said creation of said dynamic user profiles for said users in said user network.

28. The computer implemented system of claim 25, wherein said payment module is configured to one of route said one or more items of value to predetermined organizations specified by said users via said communication link and enable redemption of said one or more items of value across said server, said advertiser network, and external websites in said networked environment.

29. The computer implemented system of claim 25, further comprising a content modification module executable by at least one processor that modifies content displayed on said publisher websites for each of said users in said user network based on said marketing data acquired from said each of said users in said user network.

30. The computer implemented system of claim 25, wherein said user profile creation module integrates said marketing data acquired from said users in said user network into one or more recommendation engines employed by said publisher websites and one or more third party advertiser networks for generating recommendations related to one or more of products and services of said publisher websites and said one or more third party advertiser networks.

31. The computer implemented system of claim 25, wherein said user network creation module of said server stores a user identifier associated with each of said users in said user network on said client device of said each of said users in said user network for determining whether a user is a member of said user network, wherein said user identifier is detectable by said publisher websites and one or more third party advertiser networks via said communication link for retrieving a corresponding one of said created dynamic user profiles of said user for said targeting of said multimedia content to said user.

32. The computer implemented system of claim 25, wherein said user network creation module of said server registers a user identifier associated with said client device of said each of said corresponding said users in said user network in an information database, wherein said user identifier is detectable and retrievable by said publisher websites and one or more third party advertiser networks via said communication link for determining whether a user is a member of said user network.

33. The computer implemented system of claim 25, wherein said user network creation module of said server automatically recruits a non-member user into said user network when said non-member user registers with one or more of said publisher websites.

34. The computer implemented system of claim 25, wherein said view confirmation module comprises:

a challenge generator that generates a challenge stream, said challenge stream comprising a plurality of challenges, wherein content of each of said challenges in said challenge stream is random;

a challenge-response module that performs one or more of:

integrating said challenge stream and a stream of targeted multimedia content in real time to generate said challenge, random in content, in real time for said targeted multimedia content, wherein said challenge is random in content each time same said targeted multimedia content is played on said client device of said each of said corresponding said users;

presenting said challenge, random in content, to said users by one of overlaying said challenge, random in content, on said targeted multimedia content and interrupting said play of said targeted multimedia content after an interrupt time period, wherein said interrupt time period is less than duration of said targeted multimedia content;

invoking a response from said each of said corresponding said users for said presented challenge, random in content; and determining whether said response is entered by said each of said corresponding said users for said presented challenge, random in content, to confirm said viewing of said targeted multimedia content by said each of said corresponding said users; and a report generation module that generates a response report based on said response from said each of said corresponding said users.

35. The computer implemented system of claim 34, wherein said challenge-response module is configured to perform:

presenting one or more challenges, random in content, at one or more times during and/or after said play of said targeted multimedia content; and transferring said response to each of said one or more challenges, random in content, from said each of said users to one or more random locations on one of a display screen of said client device of said each of said corresponding said users and a multimedia player frame within said display screen of said client device, during said play of said targeted multimedia content, wherein said challenge-response module automatically registers each said response of said each of said users on said one of said display screen of said client device and said multimedia player frame within said display screen of said client device at the end of said play of said targeted multimedia content.

36. The computer implemented system of claim 25, wherein said modules of said server further comprise a content management module that performs:

transmitting a list of said targeted multimedia content and viewing parameters to said client device of said each of said corresponding said users in said user network for selection, wherein said viewing parameters comprise one or more of a schedule and an order of playing said targeted multimedia content selected by said each of said corresponding said users; and acquiring selections of one or more of said viewing parameters and one or more of said targeted multimedia content from said list of said targeted multimedia content from said users, wherein said selected multimedia content is received and played on said client device of said each of said corresponding said users based on said selected one or more viewing parameters.

37. The computer implemented system of claim 25, wherein said modules of said server further comprise an advertiser profile creation module that creates an advertiser profile for each of said advertisers in said advertiser network based on said multimedia content, said advertising information, and said targeting criteria submitted to said server by said each of said advertisers.

38. The computer implemented system of claim 37, wherein said modules of said server further comprise:
- a matching module that matches said advertiser profile of said each of said advertisers created by said advertiser profile creation module with said created dynamic user profiles of said users for enabling said targeting module to target said multimedia content to said users in said user network based on said matching; and
- a rank generation module that generates a ranking score for each match of said created dynamic user profile with said created advertiser profile found during said matching of said created dynamic user profile of said each of said users with said created advertiser profile of said each of said advertisers, wherein said targeting module targets said multimedia content to one or more of said users based on said ranking score.

39. The computer implemented system of claim 38, wherein said advertiser profile creation module acquires ratings from said advertisers in said advertiser network via said communication link for each match of said created dynamic user profile with said created advertiser profile found during said matching of said created dynamic user profile of said each of said users with said created advertiser profile of said each of said advertisers, wherein said advertiser profile creation module determines common characteristics among said users in said user network based on said ratings and updates said targeting criteria using said ratings and said common characteristics for enhanced targeting of said multimedia content to said users in said user network.

40. The computer implemented system of claim 25, wherein said modules of said server further comprise a bidding module that facilitates bidding among said advertisers in said advertiser network for enabling said targeting module to target said multimedia content of one of said advertisers to one or more of said users in said user network.

41. A computer program product comprising a non-transitory computer readable storage medium, said non-transitory computer readable storage medium storing computer program codes that comprise instructions executable by at least one processor, said computer program codes comprising:
a first computer program code for creating an advertiser network comprising a plurality of advertisers and a plurality of member websites; a second computer program code for creating an advertiser profile for each of said advertisers in said advertiser network based on multimedia content, advertising information, and targeting criteria submitted by said each of said advertisers via a communication link to a server configured to manage dynamic profiling for incentivized targeting of multimedia content to users; a third computer program code for creating a user network comprising a plurality of said users that are one or more of registered on said server, and recruited from one or more of a plurality of publisher websites in a networked environment; a fourth computer program code for acquiring marketing data from each of said users in said user network via said communication link for creating a dynamic user profile for each of said users in said user network; a fifth computer program code for matching said created dynamic user profile of said each of said users with said created advertiser profile of said each of said advertisers; a sixth computer program code for targeting said multimedia content to said users in said user network via said communication link based on said matching of said created dynamic user profile of said each of said users with said created advertiser profile of said each of said advertisers, wherein said multimedia content is sourced from said server to said users in said user network via one or more of said publisher websites; a seventh computer program code for confirming whether said users in said user network viewed said targeted multimedia content on one or more of said server and across said publisher websites in said networked environment, using a challenge, random in content, wherein said challenge, random in content, is of:

unrelated to said targeted multimedia content;

presented at random times comprising one of during play of said targeted multimedia content, after said play of said targeted multimedia content, and a combination thereof;

and presented at random physical locations on said targeted multimedia content; and an eighth computer program code for compensating said users in said user network by crediting said users in said user network with one or more items of value based on said confirmation of said viewing of said targeted multimedia content.

* * * * *